US011974097B2

(12) United States Patent
Zhang et al.

(10) Patent No.: US 11,974,097 B2
(45) Date of Patent: Apr. 30, 2024

(54) SYSTEMS AND METHODS FOR SUPPRESSING SOUND LEAKAGE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 520 days.

(21) Appl. No.: 17/219,849

(22) Filed: Mar. 31, 2021

(65) Prior Publication Data

US 2021/0219068 A1 Jul. 15, 2021

Related U.S. Application Data

(63) Continuation-in-part of application No. 17/074,762, filed on Oct. 20, 2020, now Pat. No. 11,197,106,
(Continued)

(30) Foreign Application Priority Data

Jan. 6, 2014 (CN) ......................... 201410005804.0
Apr. 30, 2019 (CN) ......................... 201910364346.2
(Continued)

(51) Int. Cl.
*H04R 25/00* (2006.01)
*G10K 9/13* (2006.01)
(Continued)

(52) U.S. Cl.
CPC ............. *H04R 25/505* (2013.01); *G10K 9/13* (2013.01); *G10K 9/22* (2013.01); *G10K 11/175* (2013.01);
(Continued)

(58) Field of Classification Search
CPC ........ H04R 1/105; H04R 1/1075; H04R 1/20; H04R 1/26; H04R 1/32; H04R 1/323; H04R 1/34; H04R 1/345; H04R 1/347
See application file for complete search history.

(56) References Cited

U.S. PATENT DOCUMENTS 2,327,320 A 8/1943 Shapiro
4,987,597 A 1/1991 Haertl
(Continued)

FOREIGN PATENT DOCUMENTS

CN 201616895 U 10/2010
CN 201690580 U 12/2010
(Continued)

OTHER PUBLICATIONS

Notice of Preliminary Rejection in Korean Application No. 10-2022-7010046 dated Jun. 20, 2022, 15 pages.
(Continued)

*Primary Examiner* — Kile O Blair
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in
(Continued)

a target region. The interference at a specific frequency relates to a distance between the at least one sound guiding hole and the portion of the housing.

20 Claims, 36 Drawing Sheets

Related U.S. Application Data which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, application No. 17/219,849 is a continuation-in-part of application No. 17/142,191, filed on Jan. 5, 2021, now Pat. No. 11,516,572, which is a continuation of application No. PCT/CN2019/130944, filed on Dec. 31, 2019.

(30) Foreign Application Priority Data

Sep. 19, 2019 (CN) ......................... 201910888067.6
Sep. 19, 2019 (CN) ......................... 201910888762.2

(51) Int. Cl.

*G10K 9/22* (2006.01)
*G10K 11/175* (2006.01)
*G10K 11/178* (2006.01)
*G10K 11/26* (2006.01)
*H04R 1/28* (2006.01)
*H04R 9/06* (2006.01)
*H04R 17/00* (2006.01)

(52) U.S. Cl.

CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(56) References Cited

U.S. PATENT DOCUMENTS 5,430,803 A 7/1995 Kimura et al.
5,692,059 A 11/1997 Kruger
5,757,935 A 5/1998 Kang et al.
5,790,684 A 8/1998 Niino et al.
6,850,138 B1 2/2005 Sakai
8,141,678 B2 3/2012 Ikeyama et al.
9,226,075 B2 12/2015 Lee
9,729,978 B2 8/2017 Qi et al.
10,149,071 B2 12/2018 Qi et al.
10,334,372 B2 6/2019 Qi et al.
10,631,075 B1 4/2020 Patil et al.
10,897,677 B2 1/2021 Walraevens et al.
11,197,106 B2 12/2021 Qi et al.
2003/0048913 A1 3/2003 Lee et al.
2004/0131219 A1 7/2004 Polk, Jr.
2005/0251952 A1 11/2005 Johnson
2006/0098829 A1 5/2006 Kobayashi
2007/0041595 A1 2/2007 Carazo et al.
2007/0237341 A1 10/2007 Laroche
2009/0095613 A1 4/2009 Lin
2009/0141920 A1 6/2009 Suyama
2009/0190781 A1 7/2009 Fukuda
2009/0208031 A1 8/2009 Abolfathi
2009/0285417 A1 11/2009 Shin et al.
2009/0290730 A1 11/2009 Fukuda et al.
2010/0054492 A1 3/2010 Eaton et al.
2010/0322454 A1 12/2010 Ambrose et al.
2011/0150262 A1 6/2011 Nakama et al.
2012/0020501 A1 1/2012 Lee
2012/0070022 A1 3/2012 Saiki
2012/0177206 A1 7/2012 Yamagishi et al.
2013/0329919 A1 12/2013 He
2014/0009008 A1 1/2014 Li et al.
2014/0064533 A1 3/2014 Kasic, II
2014/0185822 A1 7/2014 Kunimoto et al.
2014/0185837 A1 7/2014 Kunimoto et al.
2014/0274229 A1 9/2014 Fukuda
2014/0355777 A1 12/2014 Nabata et al.
2015/0030189 A1 1/2015 Nabata et al.
2015/0256656 A1 9/2015 Horii
2015/0264473 A1 9/2015 Fukuda
2015/0326967 A1 11/2015 Otani
2016/0037243 A1 2/2016 Lippert et al.
2016/0150337 A1 5/2016 Nandy
2016/0165357 A1 6/2016 Morishita et al.
2016/0295328 A1 10/2016 Park
2016/0329041 A1 11/2016 Qi et al.
2017/0201823 A1 7/2017 Shetye et al.
2017/0223445 A1 8/2017 Bullen et al.
2017/0238096 A1 8/2017 Nakagawa et al.
2017/0347192 A1 11/2017 Seo et al.
2017/0353793 A1 12/2017 Sun et al.
2018/0167710 A1 6/2018 Silver et al.
2018/0182370 A1 6/2018 Hyde et al.
2018/0227660 A1 8/2018 Azmi et al.
2019/0052954 A1 2/2019 Rusconi Clerici Beltrami et al.
2019/0238971 A1 8/2019 Wakeland et al.
2019/0320258 A1 10/2019 Ohura
2020/0367008 A1 11/2020 Walsh et al.
2021/0099027 A1 4/2021 Larsson et al.
2021/0219059 A1 7/2021 Qi et al.

FOREIGN PATENT DOCUMENTS

CN 102014328 A 4/2011
CN 102421043 A 4/2012
CN 202435600 U 9/2012
CN 103167390 A 6/2013
CN 103347235 A 10/2013
CN 204206450 U 3/2015
CN 204377095 U 6/2015
EP 2011367 B1 12/2014
JP 2006332715 A 12/2006
JP 2007251358 A 9/2007
KR 20050030183 A 3/2005
KR 20090082999 A 8/2009
WO 0225990 A1 3/2002
WO 2004095878 A2 11/2004

OTHER PUBLICATIONS

International Search Report in PCT/CN2014/094065 dated Mar. 17, 2015, 5 pages.
Written Opinion in PCT/CN2014/094065 dated Mar. 17, 2015, 10 pages.
First Office Action in Chinese Application No. 201410005804.0 dated Dec. 7, 2015, 9 pages.
Notice of Reasons for Refusal in Japanese Application No. 2016545828 dated Jun. 20, 2017, 10 pages.
The Extended European Search Report in European Application No. 14877111.6 dated Mar. 17, 2017, 6 pages.
First Examination Report in Indian Application No. 201617026062 dated Nov. 13, 2020, 6 pages.
International Search Report in PCT/CN2019/130944 dated Mar. 26, 2020, 5 pages.

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 17/074,762 filed on Oct. 20, 2020, which is a continuation-in-part of U.S. patent application Ser. No. 16/813,915 (now U.S. Pat. No. 10,848,878) filed on Mar. 10, 2020, which is a continuation of U.S. patent application Ser. No. 16/419,049 (now U.S. Pat. No. 10,616, 696) filed on May 22, 2019, which is a continuation of U.S. patent application Ser. No. 16/180,020 (now U.S. Pat. No. 10,334,372) filed on Nov. 5, 2018, which is a continuation of U.S. patent application Ser. No. 15/650,909 (now U.S. Pat. No. 10,149,071) filed on Jul. 16, 2017, which is a continuation of U.S. patent application Ser. No. 15/109,831 (now U.S. Pat. No. 9,729,978) filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; the present application is also a continuation-in-part of U.S. patent application Ser. No. 17/142,191 filed on Jan. 5, 2021, which is a continuation of International Patent Application No. PCT/CN2019/130944, filed on Dec. 31, 2019, which claims priority of Chinese Patent Application No. 201910364346.2 filed on Apr. 30, 2019, Chinese Patent Application No. 201910888762.2 filed on Sep. 19, 2019, and Chinese Patent Application No. 201910888067.6 filed on Sep. 19, 2019, the entire contents of each of which are incorporated herein by reference. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including: providing a bone conduction speaker including a vibration board fitting human skin and passing vibrations, a transducer, and a housing, wherein at least one sound guiding hole is located in at least one portion of the housing; the transducer drives the vibration board to vibrate; the housing vibrates, along with the vibrations of the transducer, and pushes air, forming a leaked sound wave transmitted in the air; the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein: the transducer is configured to generate vibrations and is located inside the housing; the vibration board is configured to be in contact with skin and pass vibrations; at least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 3:
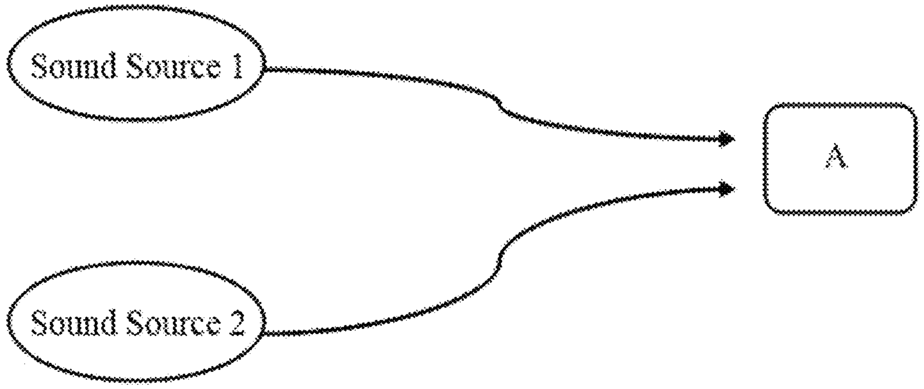
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
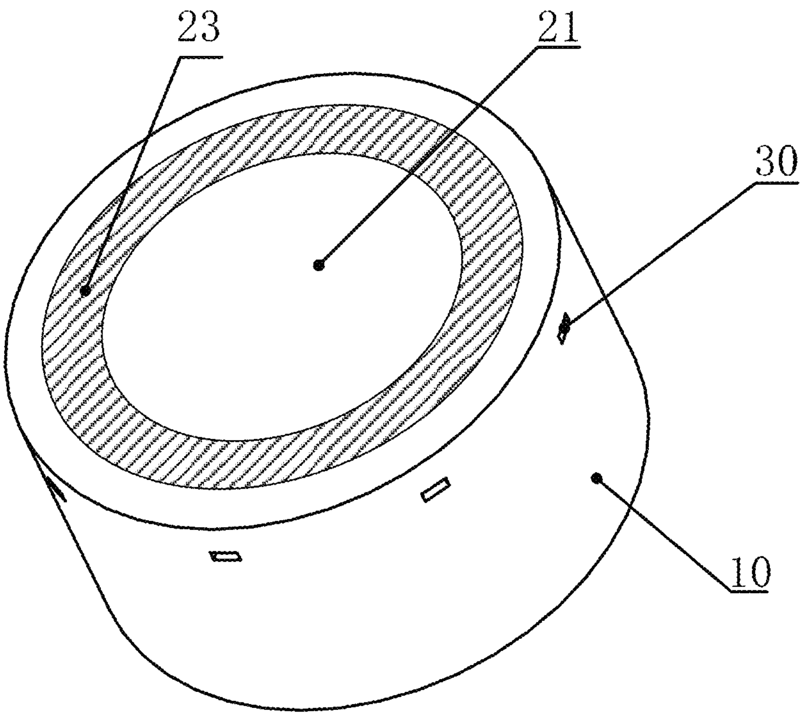
FIGS. 4A and 4B are schematic structures of an exemplary bone conduction speaker according to some embodiments of the present disclosure.
Figure 4B:
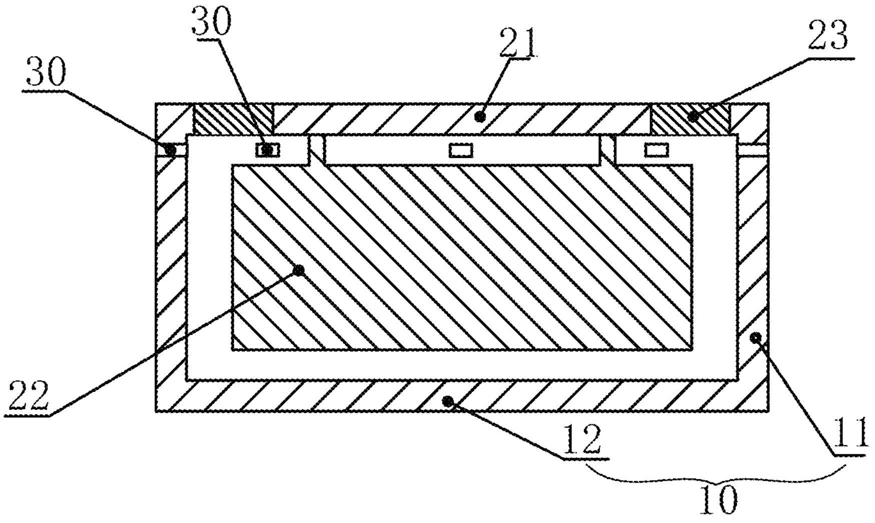

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received. It should be noted that only one transducer is provided herein for illustration purposes. In some embodiments, the bone conduction speaker includes two or more transducers. In some embodiments, a transducer (e.g., the transducer 22) may also be referred to as an acoustic driver.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
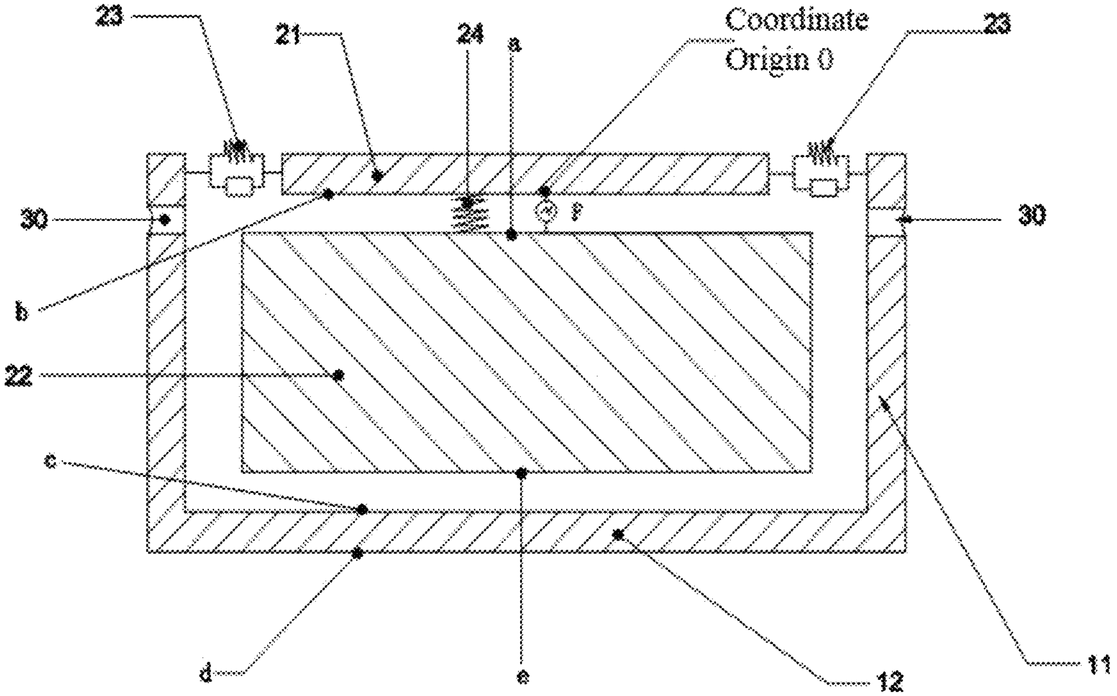
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$(\iint_{s_{hole}} P ds - \iint_{s_{housng}} P_d ds), \quad (1)$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P=P_a+P_b+P_c+P_e, \quad (2)$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \int\int_{S_a} W_a(x_a', y_a') \cdot \frac{e^{jkR(x_a',y_a')}}{4\pi R(x_a', y_a')} dx_a', dy_a' - P_{aR}, \quad (3)$$

$$P_b(x, y, z) = -j\omega\rho_0 \int\int_{S_b} W_b(x', y') \cdot \frac{e^{jkR(x',y')}}{4\pi R(x', y')} dx', dy' - P_{bR}, \quad (4)$$

$$P_c(x, y, z) = -j\omega\rho_0 \int\int_{S_c} W_c(x_c', y_c') \cdot \frac{e^{jkR(x_c',y_c')}}{4\pi R(x_c', y_c')} dx_c', dy_c' - P_{cR}, \quad (5)$$

$$P_e(x, y, z) = -j\omega\rho_0 \int\int_{S_e} W_e(x_e', y_e') \cdot \frac{e^{jkR(x_e',y_e')}}{4\pi R(x_e', y_e')} dx_e', dy_e' - P_{eR}, \quad (6)$$

wherein $$R(x', y') = \sqrt{(x-x')^2 + (y-y')^2 + z^2}$$

is the distance between an observation point (x, y, z) and a point on side b (x', y', 0); $S_a$, $S_b$, $S_c$ and $S_e$ are the areas of side a, side b, side c and side e, respectively;

$$R(x_a', y_a') = \sqrt{(x-x_a')^2 + (y-y_a')^2 + (z-z_a)^2}$$

is the distance between the observation point (x, y, z) and a point on side a ($x_a'$, $y_a'$, $z_a$);

$$R(x_c', y_c') = \sqrt{(x-x_c')^2 + (y-y_c')^2 + (z-z_c)^2}$$

is the distance between the observation point (x, y, z) and a point on side c ($x_c'$, $y_c'$, $z_c$);

$$R(x_e', y_e') = \sqrt{(x-x_e')^2 + (y-y_e')^2 + (z-z_e)^2}$$

is the distance between the observation point (x, y, z) and a point on side e ($x_e'$, $y_e'$, $z_e$);

k=ω/u (u is the velocity of sound) is wave number, $\rho_0$ is an air density, ω is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \quad (7)$$

$$P_{bR} = A \cdot \frac{z_b \cdot r + j\omega \cdot z_b \cdot r'}{\varphi} + \delta, \quad (8)$$

$$P_{cR} = A \cdot \frac{z_c \cdot r + j\omega \cdot z_c \cdot r'}{\varphi} + \delta, \quad (9)$$

$$P_{eR} = A \cdot \frac{z_e \cdot r + j\omega \cdot z_e \cdot r'}{\varphi} + \delta, \quad (10)$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e=F_a=F-k_1 \cos \omega t - \iint_{s_a} W_a(x,y)dxdy - \iint_{s_e} W_e(x,y)dxdy - f$$

$$F_b=-F+k_1 \cos \omega t + \iint_{s_b} W_b(x,y)dxdy - \iint_{s_e} W_e(x,y)dxdy - L$$

$$F_c=F_d=F_b-k_2 \cos \omega t - \iint_{s_c} W_c(x,y)dxdy - f - \gamma$$

$$F_d=F_b-k_2 \cos \omega t - \iint_{s_d} W_d(x,y)dxdy \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and f=ηΔs(dv/dy).

L is the equivalent load on human face when the vibration board acts on the human face, γ is the energy dissipated on elastic element 24, $k_1$ and $k_2$ are the elastic coefficients of elastic element 23 and elastic element 24 respectively, η is the fluid viscosity coefficient, dv/dy is the velocity gradient of fluid, Δs is the cross-section area of a subject (board), A is the amplitude, φ is the region of the sound field, and δ is a high order minimum (which is generated by the incompletely symmetrical shape of the housing).

The sound pressure of an arbitrary point outside the housing, generated by the vibration of the housing 10 is expressed as:

$$P_d = -j\omega\rho_0 \int\int W_d(x_d', y_d') \cdot \frac{e^{jkR(x_d',y_d')}}{4\pi R(x_d', y_d')} dx_d' dy_d' \quad (12)$$

wherein $$R(x_d', y_d') = (x - x_d')^2 + (y - y_d')^2 + (z - z_d)^2$$

is the distance between the observation point (x, y, z) and a point on side d ($x_d'$, $y_d'$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}}$ Pds.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}}$, Pds and $\iint_{S_{housing}} P_d ds$ have the same value but opposite directions, and the sound leakage may be reduced. In some embodiments, $\iint_{S_{hole}}$ Pds may be adjusted to reduce the sound leakage. Since $\iint_{S_{hole}}$ Pds corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
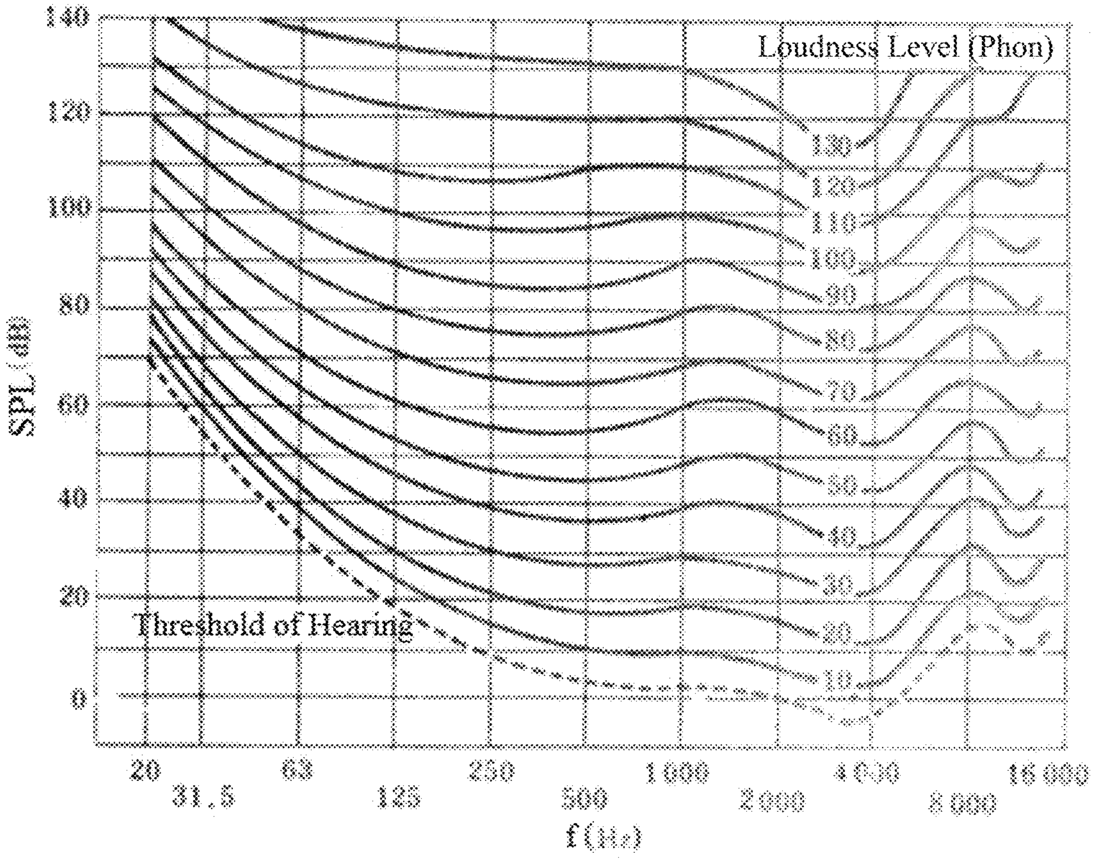
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
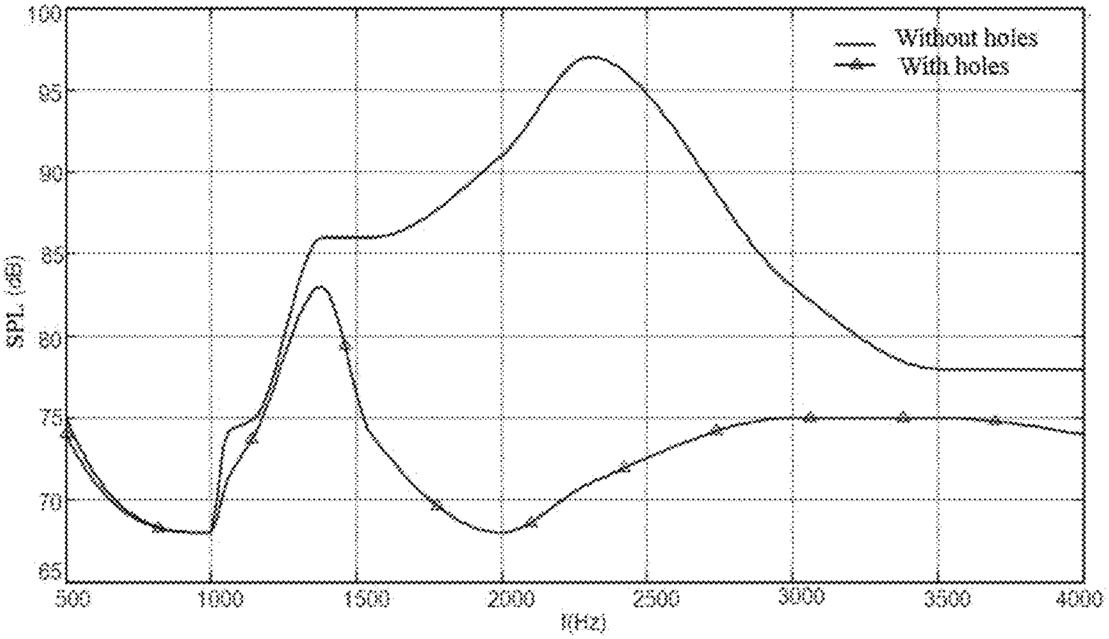
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 150 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
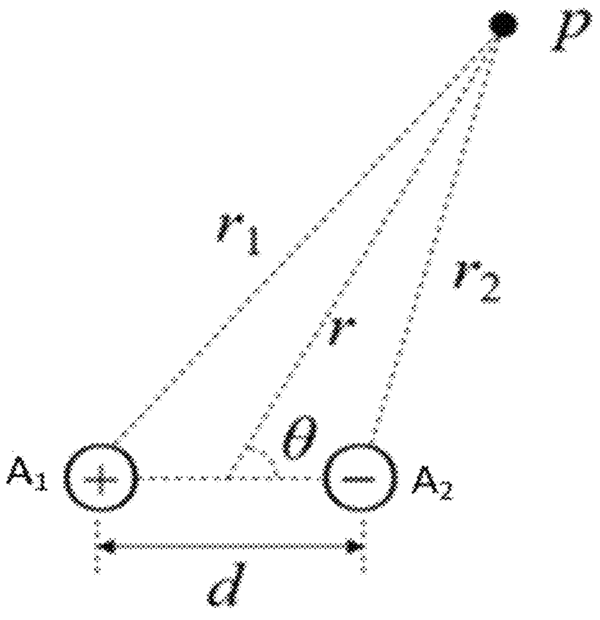
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \ \exp\ j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
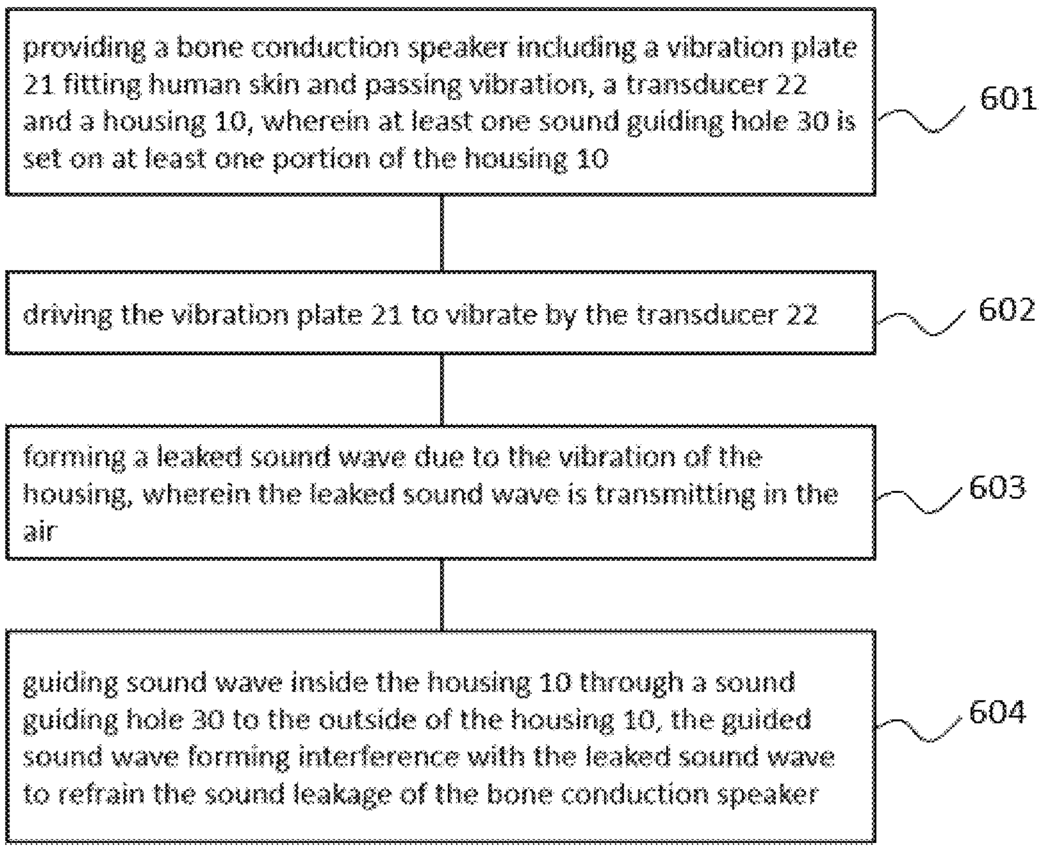
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
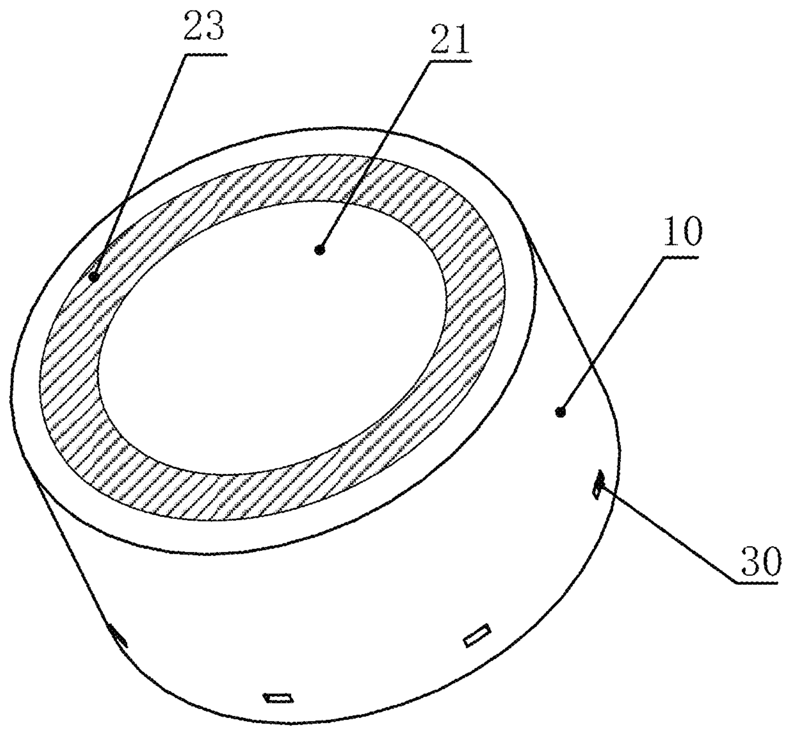
FIGS. 7A and 7B are schematic structures of an exemplary bone conduction speaker according to some embodiments of the present disclosure.
Figure 7B:
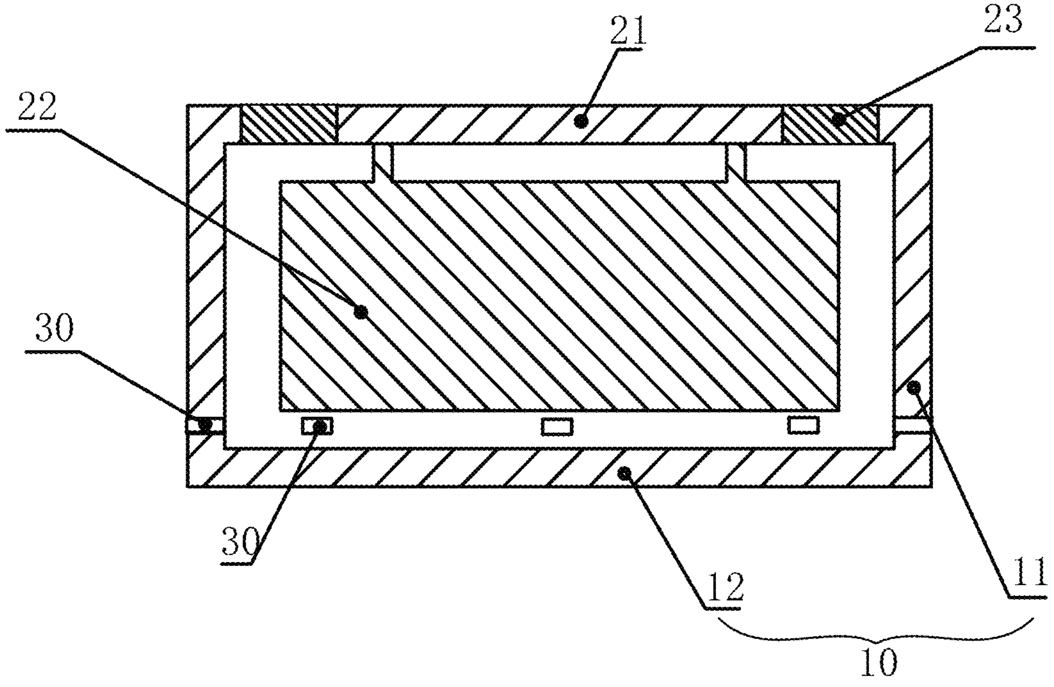

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may locate inside the housing and may generate synchronous vibrations with a same frequency.

Figure 7C:
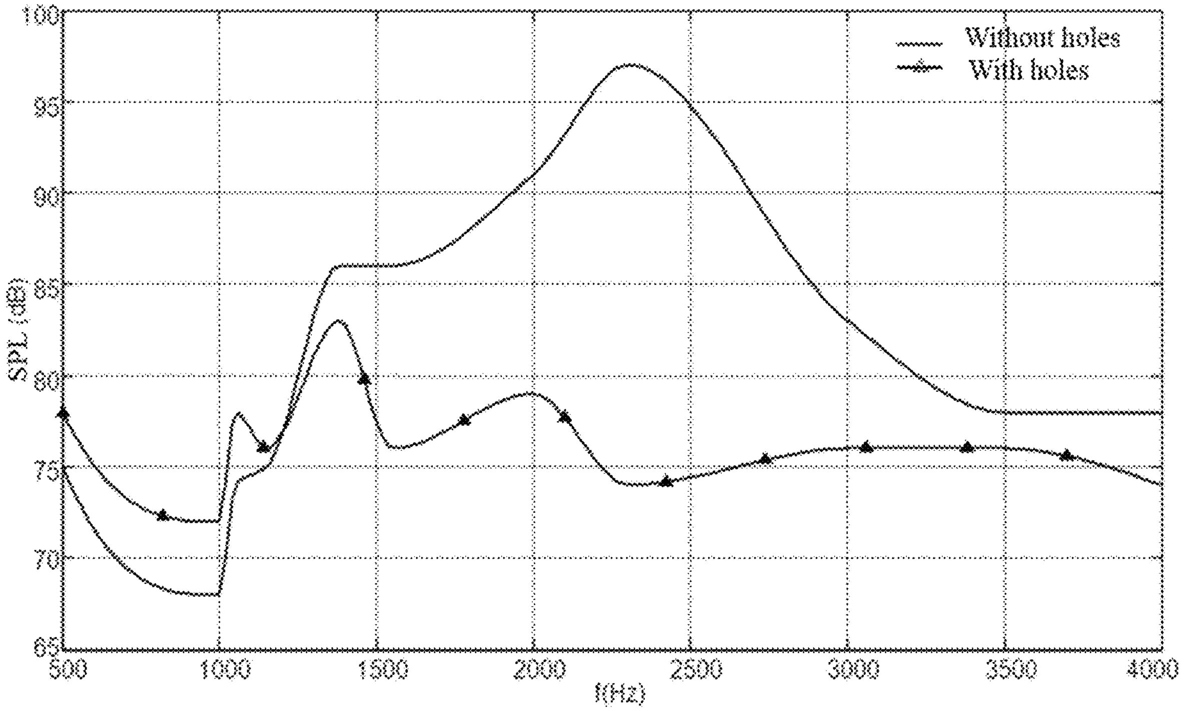
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
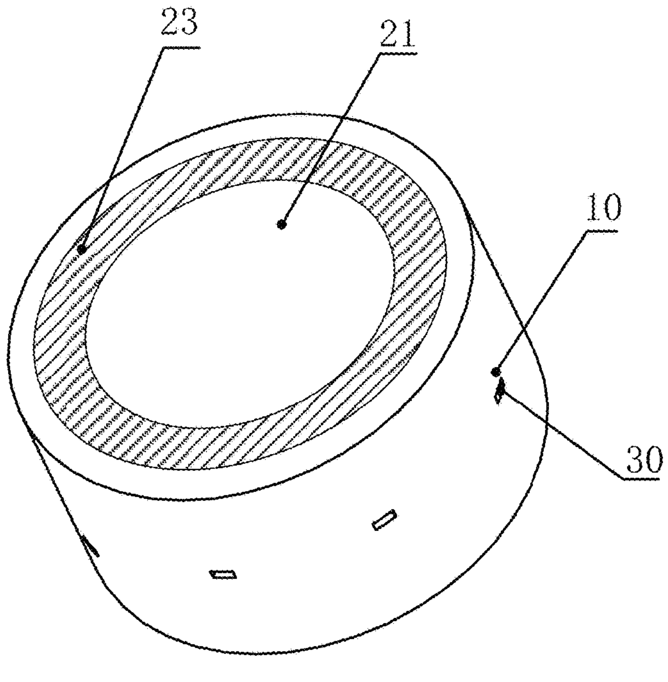
FIGS. 8A and 8B are schematic structure of an exemplary bone conduction speaker according to some embodiments of the present disclosure.
Figure 8B:
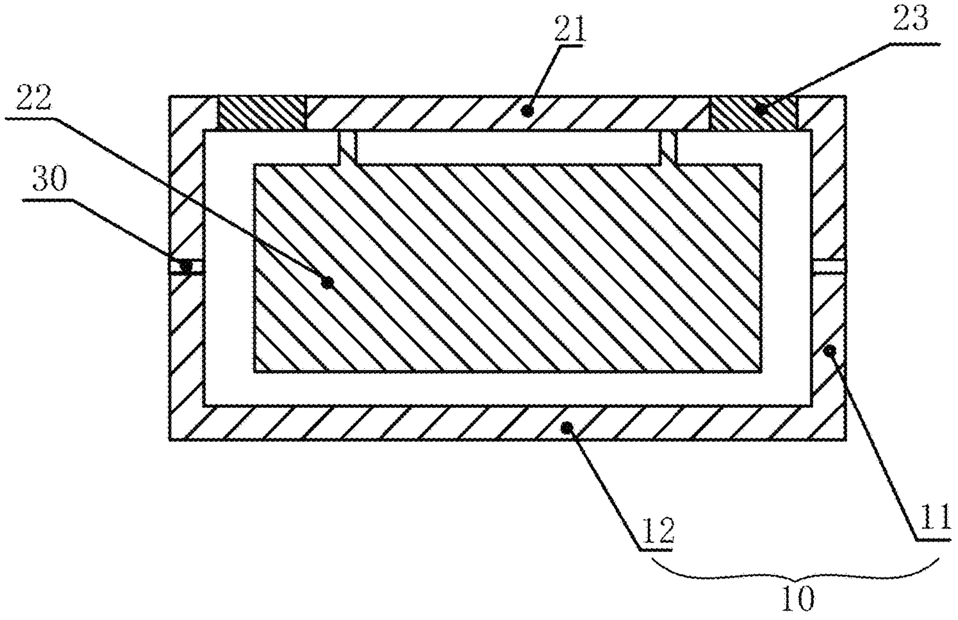

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
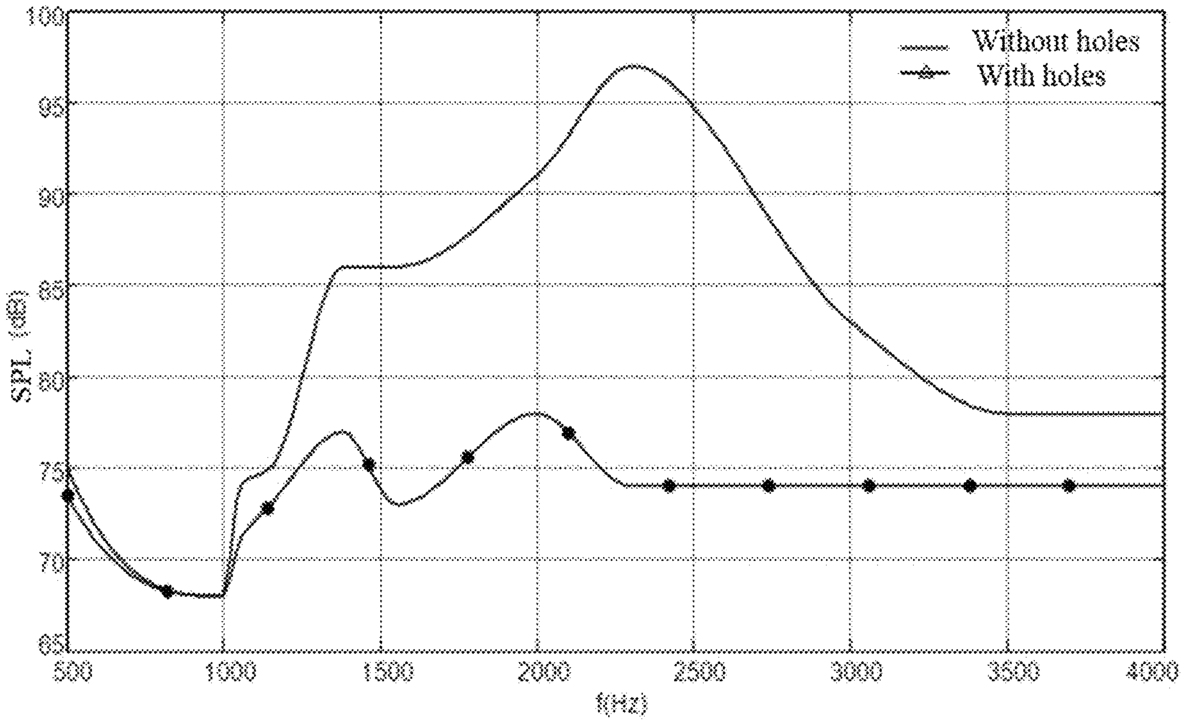
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
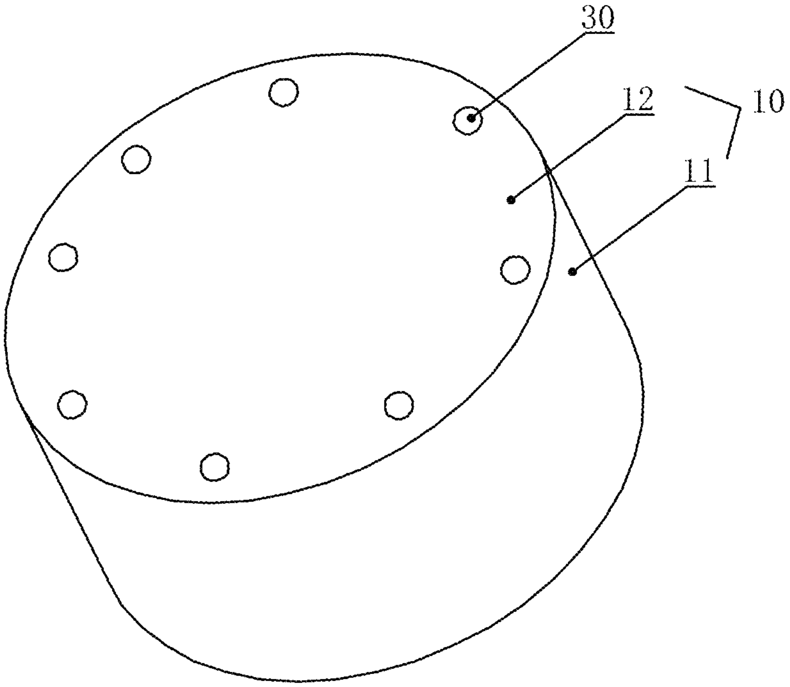
FIGS. 9A and 9B are schematic structures of an exemplary bone conduction speaker according to some embodiments of the present disclosure.
Figure 9B:
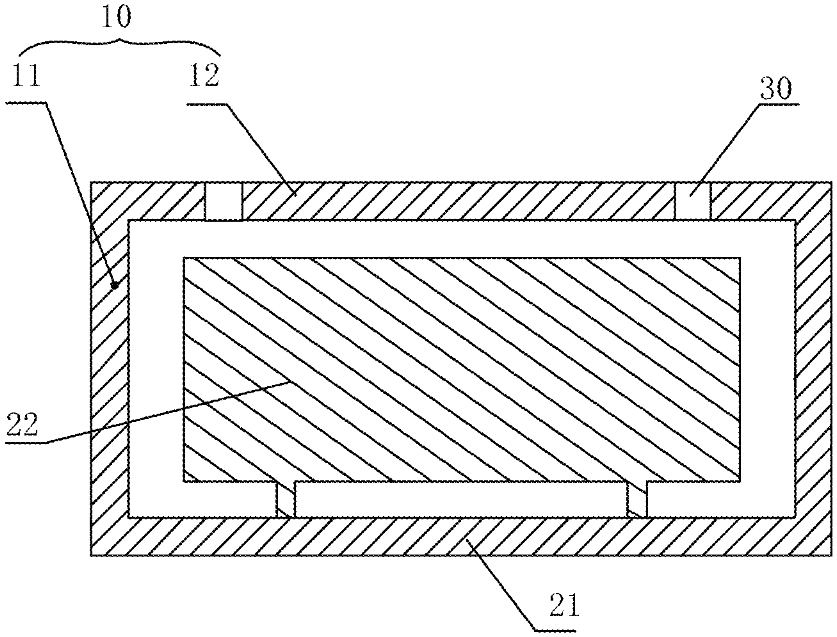

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
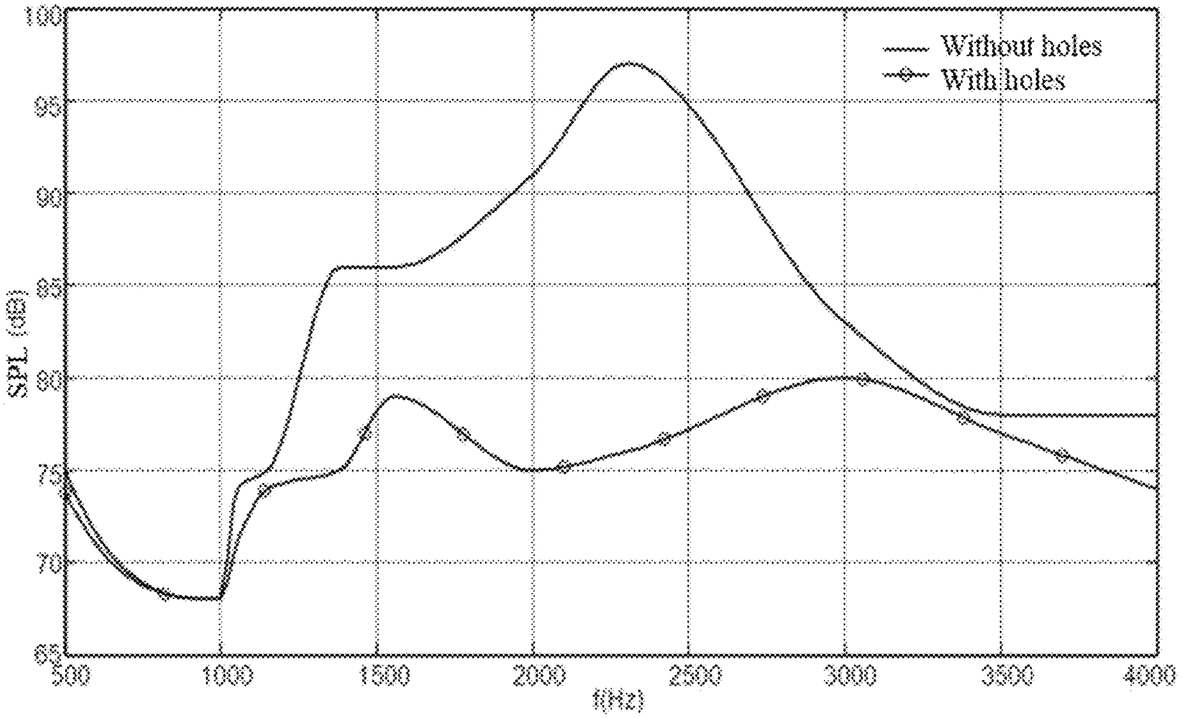
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
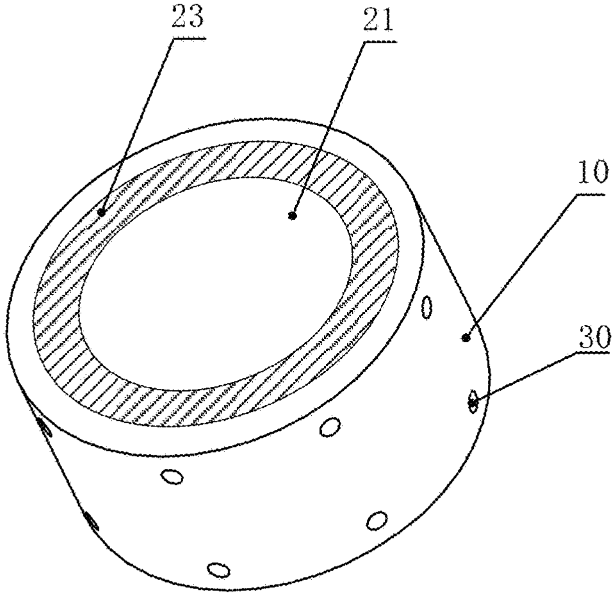
FIGS. 10A and 10B are schematic structures of an exemplary bone conduction speaker according to some embodiments of the present disclosure.
Figure 10B:
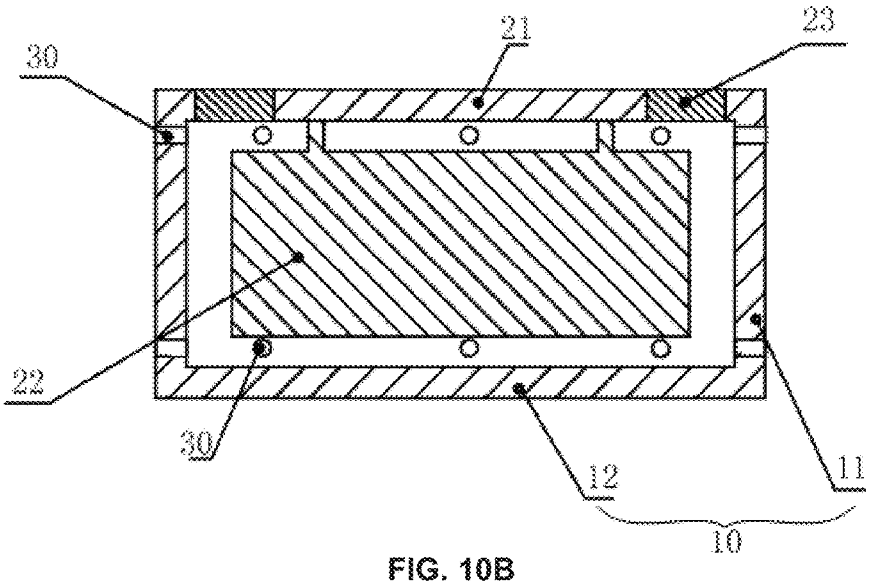

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
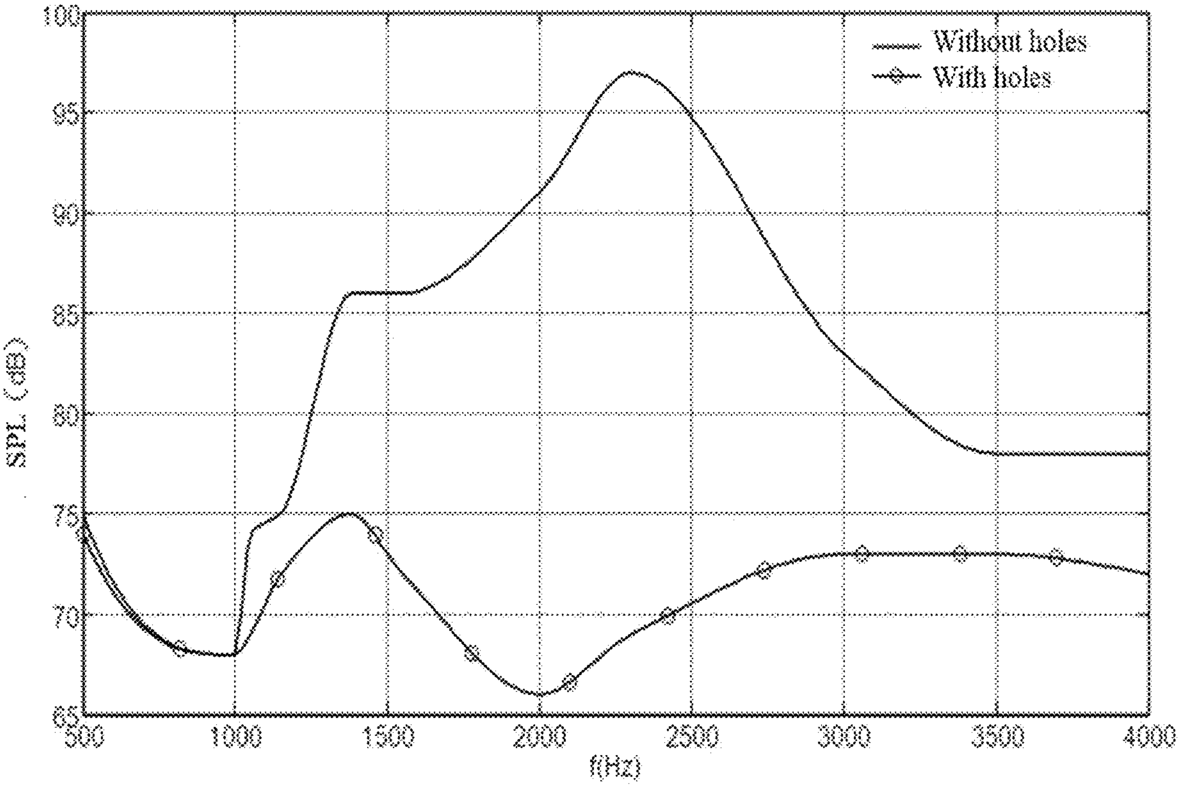
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
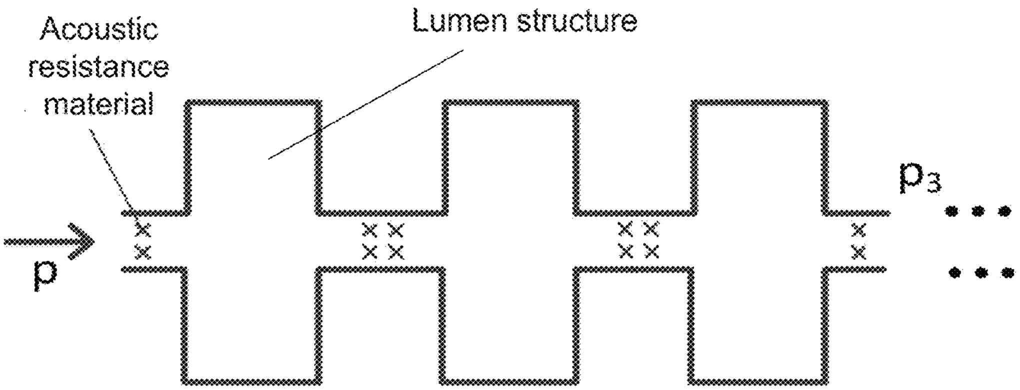
FIG. 10D is a schematic diagram illustrating an acoustic route according to some embodiments of the present disclosure.
Figure 10E:
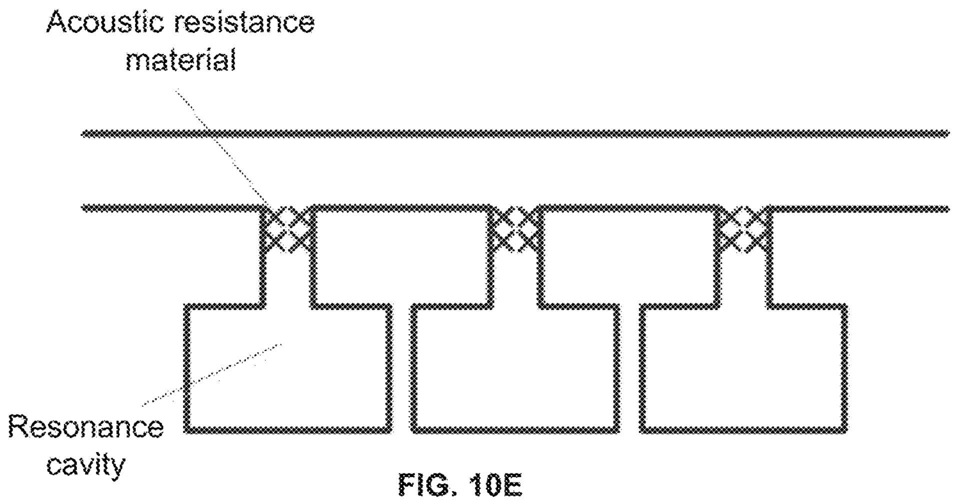
FIG. 10E is a schematic diagram illustrating another acoustic route according to some embodiments of the present disclosure.
Figure 10F:
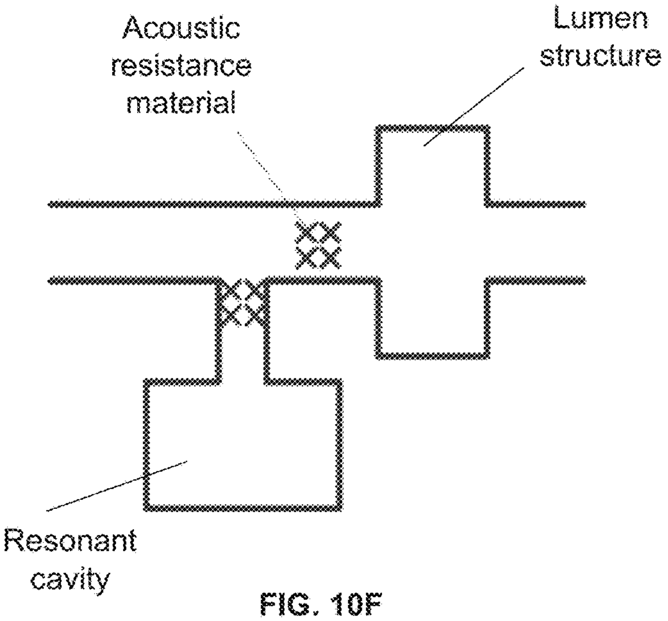
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
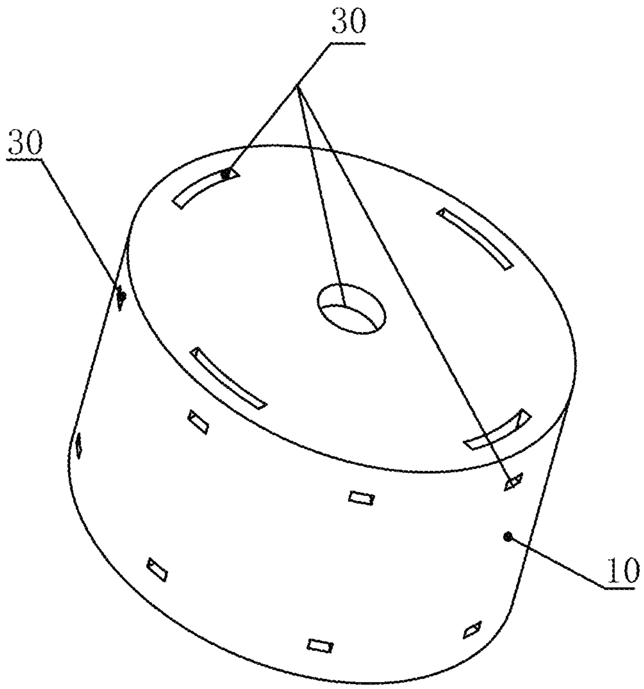
FIGS. 11A and 11B are schematic structures of an exemplary bone conduction speaker according to some embodiments of the present disclosure.
Figure 11B:
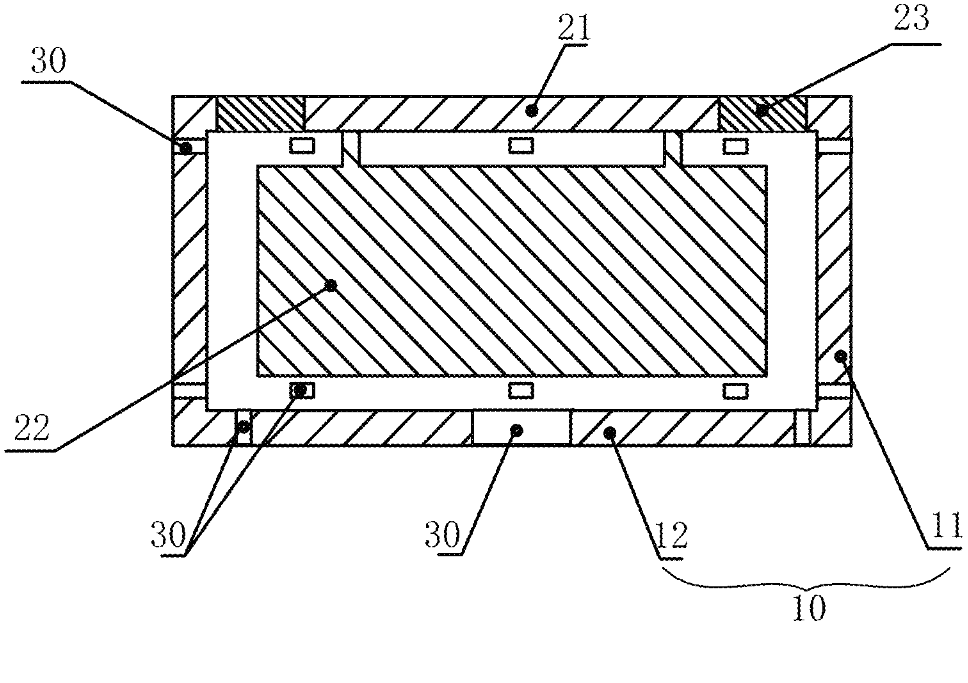

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
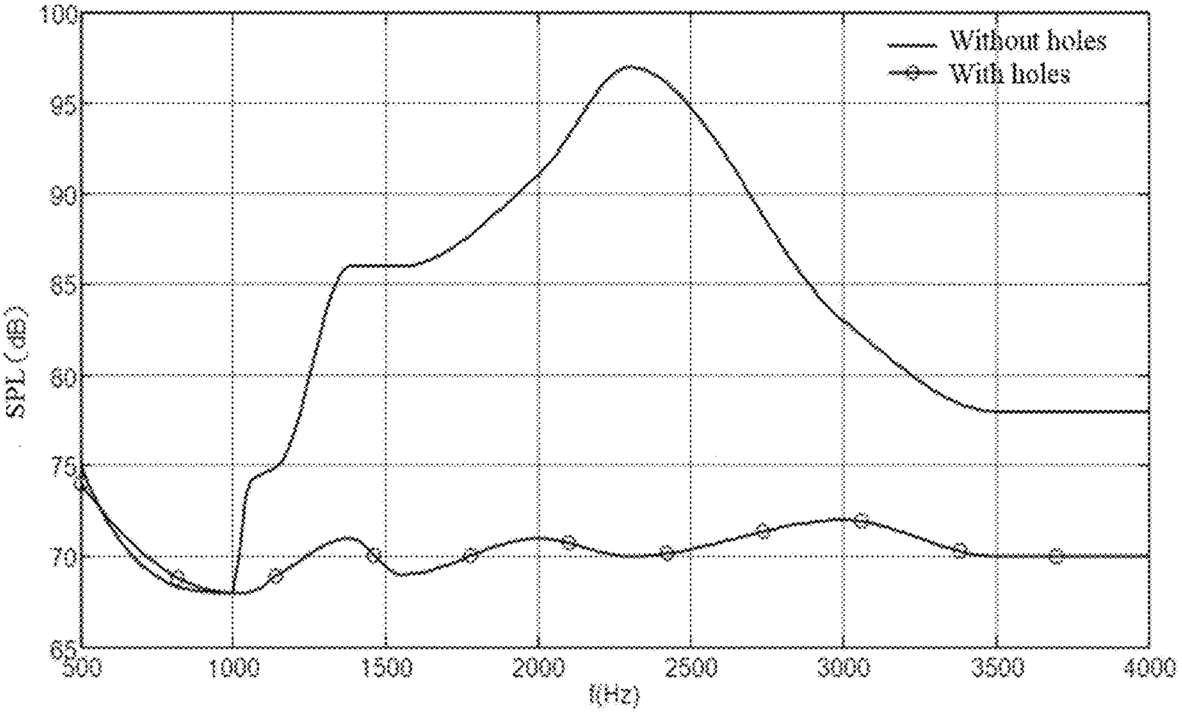
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
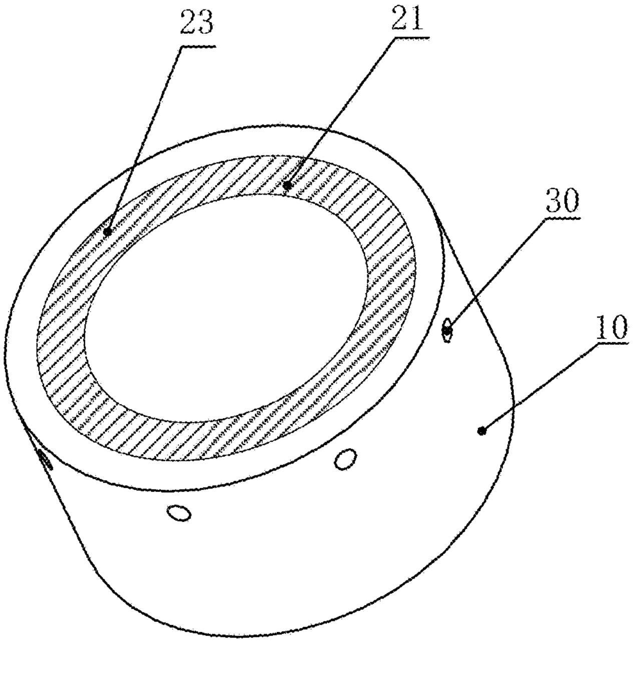
FIGS. 12A and 12B are schematic structures of an exemplary bone conduction speaker according to some embodiments of the present disclosure.
Figure 12B:
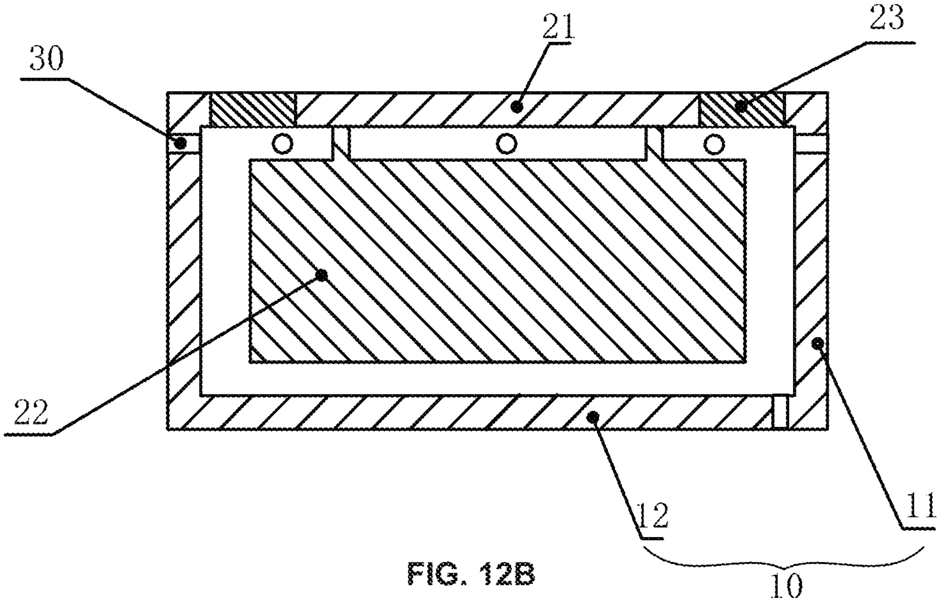

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
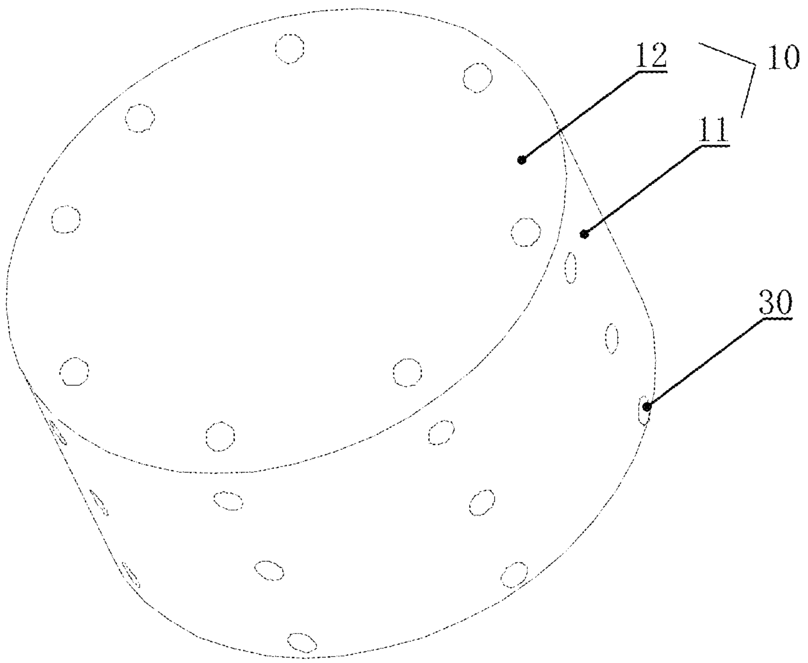
FIGS. 13A and 13B are schematic structures of an exemplary bone conduction speaker according to some embodiments of the present disclosure.
Figure 13B:
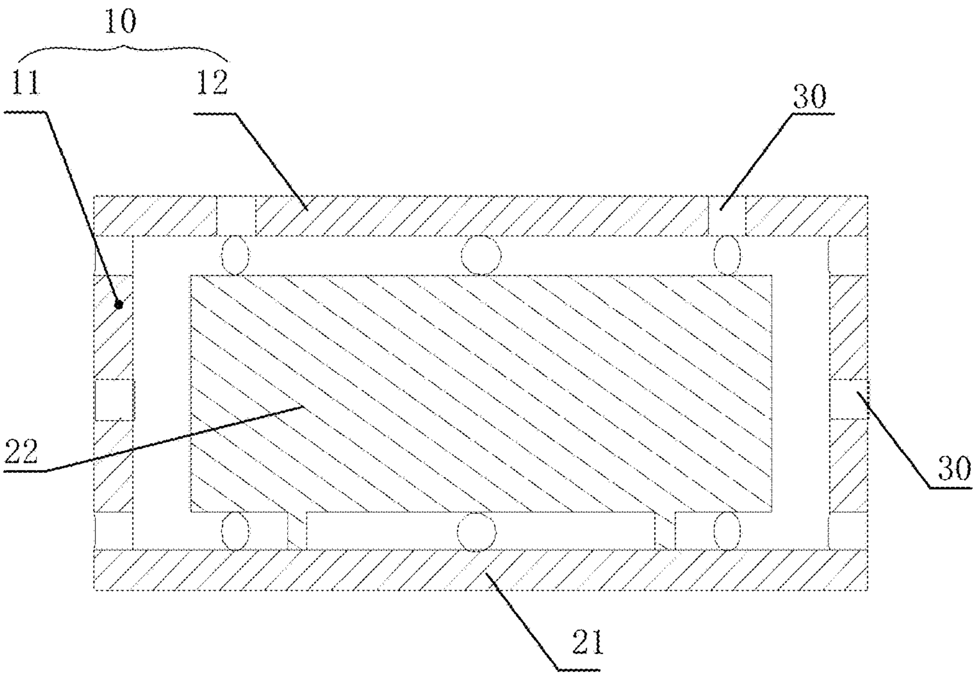

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

In some embodiments, a speaker (e.g., the speaker as shown FIG. 4A through 13B) as described elsewhere in the present disclosure may include a housing (e.g., the housing 10), one or more acoustic drivers (e.g., one or more transducers such as the transducer 22) residing inside the housing, and a plurality of sound guiding holes located on the housing. For example, the one or more acoustic driver may be configured to generate vibrations. The vibrations may produce a sound wave inside the housing and causing a leaked sound wave spreading outside the housing from a portion of the housing. The plurality of sound guiding holes may be configured to guide the sound wave inside the housing through at least one of the plurality of sound guiding holes to an outside of the housing. The at least one sound guiding hole may include a damping layer configured to adjust the phase of the guided sound wave in the target region. The guided sound wave may have a phase different from a phase of the leaked sound wave. The guided sound wave may interfere with the leaked sound wave in a target region. In some embodiments, the guided sound wave may include at least two sound waves having different phases. A sound pressure level of the at least a portion of the leaked sound wave may be reduced by more than 10 dB on average. More descriptions of which may be found elsewhere in the present disclosure, for example, FIGS. 4A through 13B and relevant descriptions thereof. The one or more acoustic drivers may further include at least one acoustic driver configured to generate a sound. When a user wears the speaker, the speaker may be at least placed on one side of the user's head, which may be close to and not block the user's ear. The speaker may be worn on the head of the user (e.g., an open earphone which is not placed in ear and may be worn as glasses, a headband, etc.), or worn on other body parts of the user (e.g., the neck, the shoulder of the user), or placed near the ear of the user via other manners (e.g., via a hand-hold manner). The sound generated by the at least one acoustic driver in the speaker may be transmitted outward through at least two of the plurality of sound guiding holes which may be acoustically coupled with the at least one acoustic driver. In some embodiments, the at least two sound guiding holes may be distributed on two sides of the user's auricle, respectively, more descriptions of which may be found in the following descriptions. In this case, the auricle may be served as a baffle, and the at least two sound guiding holes may be separated, thereby generating different acoustic routes between the at least two sound guiding holes and the user's ear canal. In some embodiments, a baffle structure may be disposed on the speaker and the at least two sound guiding holes may be distributed on two sides of the baffle structure, respectively. In some embodiments, the at least two sound guiding holes may be distributed two sides of the auricle or the baffle structure, thereby increasing an acoustic path difference between two distances that the sounds are transmitted from the two sound guiding holes to the user's ear (i.e., a distance difference between the two distances that the sounds are transmitted from the two sound guiding holes to the user's ear canal), weakening sound cancellation, increasing a volume of the sound heard by the user's ear (also referred to as a sound in the near-field), and improve a listening experience of the user. In some embodiments, auricle and/or the baffle may not affect the transmission of the sound from the at least two sound guiding holes to the surroundings (also referred to as a sound in the far-field). The sound in the far-fields transmitted from the at least two guiding holes may be offset, thereby reducing the leakage of the speaker and preventing the sound being heard by others near the user.

Figure 1A:
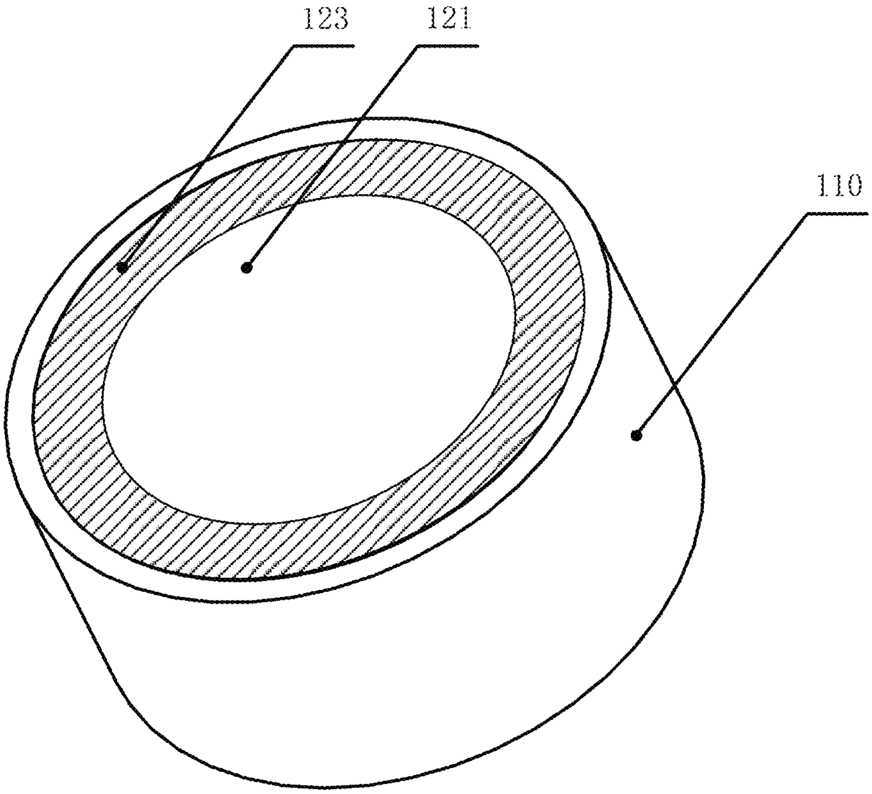
FIGS. 1A and 1B are schematic structures illustrating a bone conduction speaker of prior art.
Figure 1B:
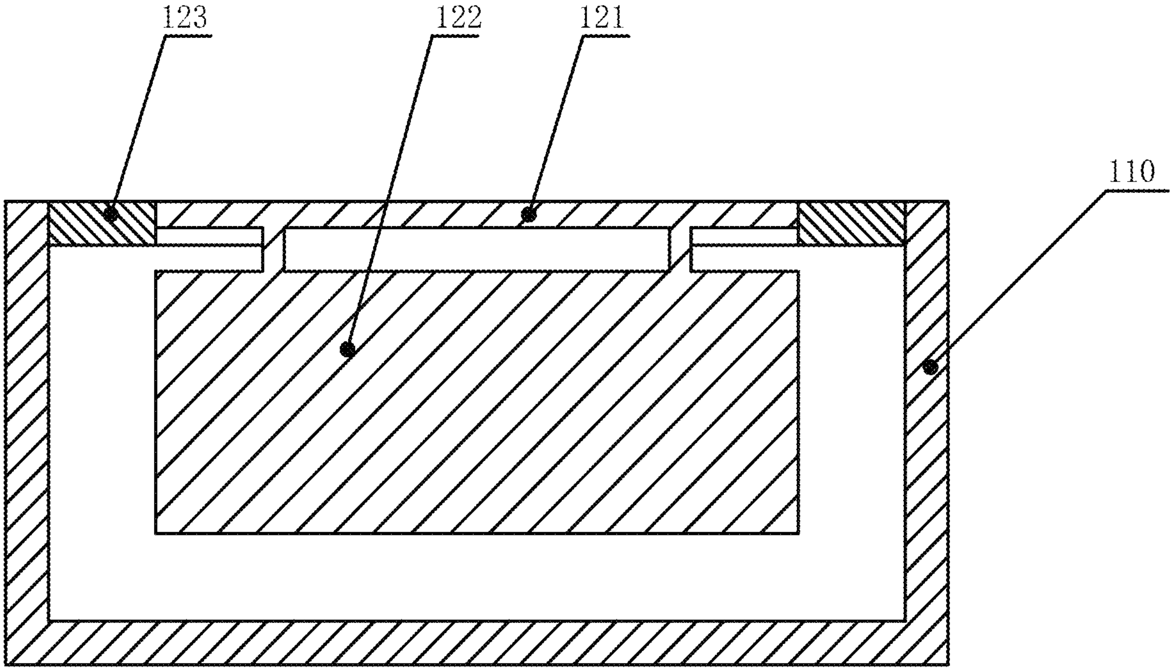
Figure 2:
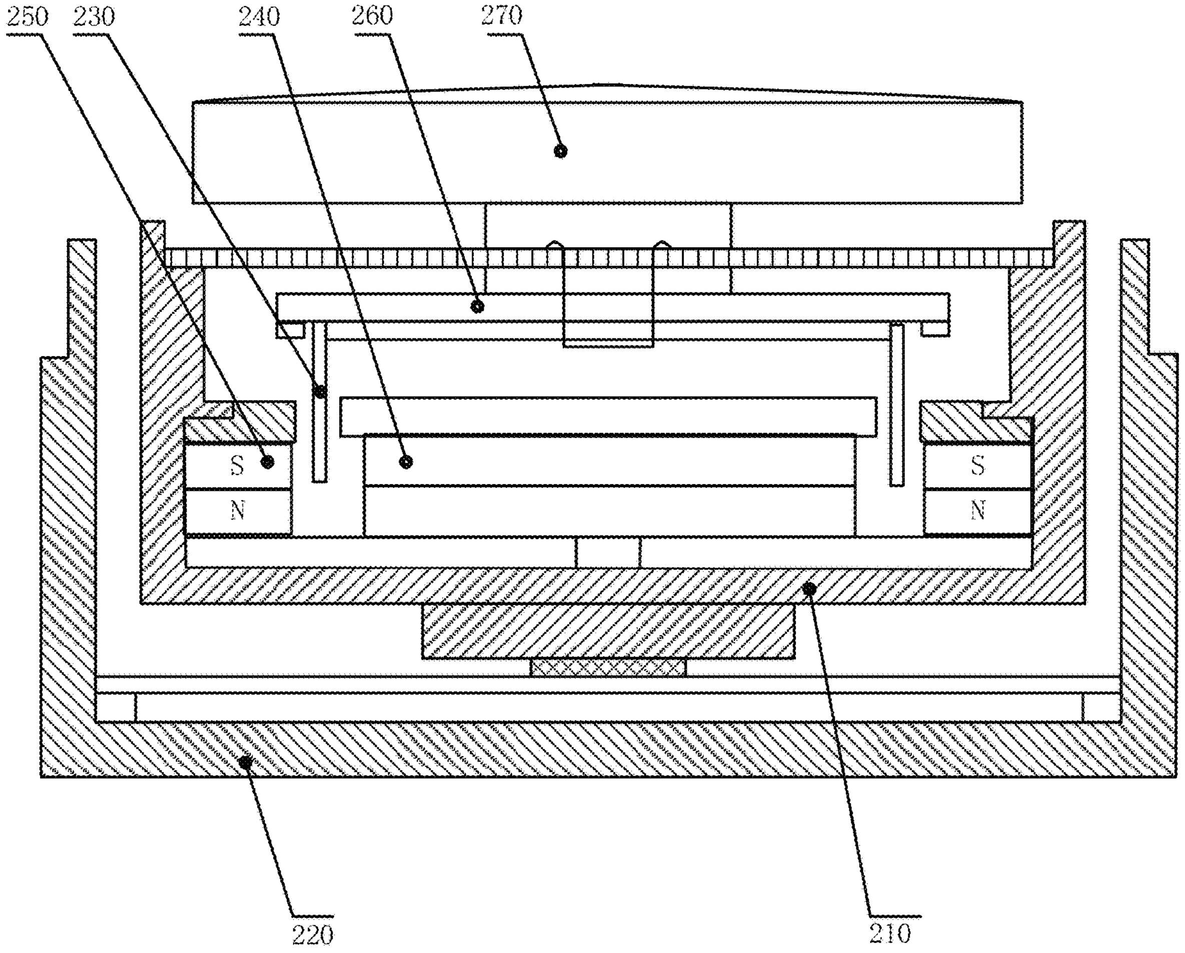
FIG. 2 is a schematic structure illustrating another bone conduction speaker of prior art.
Figure 14:
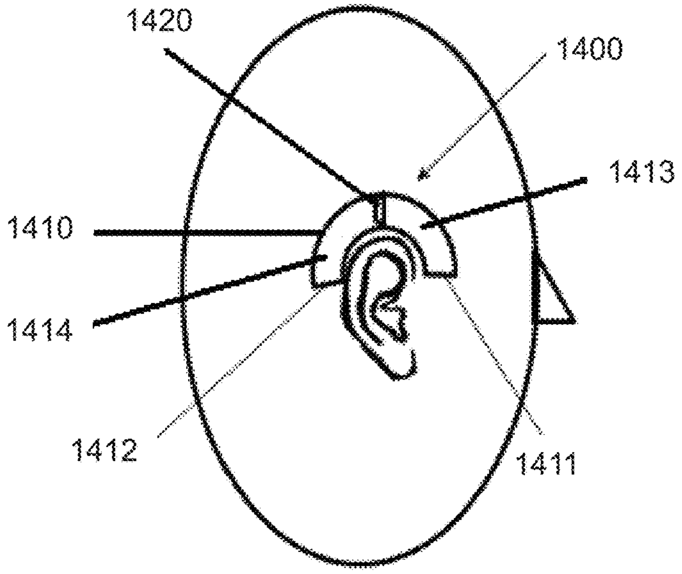
FIG. 14 is a schematic diagram illustrating an exemplary speaker according to some embodiments of the present disclosure.

FIG. 14 is a schematic diagram illustrating an exemplary speaker 1400 according to some embodiments of the present disclosure. As shown in FIG. 1, the speaker 1400 may include a supporting structure 1410 and an acoustic driver 1420. The acoustic driver 1420 may be disposed in the supporting structure 1410. In some embodiments, the speaker 1400 may be worn on a user's body (e.g., the head, the neck, the upper torso, etc. of the user) through the supporting structure 1410. The supporting structure 1410 and the acoustic driver 1420 may be close to and not block an ear canal of the user. The ear of the user may be in an open state. The user may hear a sound output from the speaker 1400 and a sound from an external source. For example, the speaker 1400 may be arranged around or partially around the user's ear, and may transmit the sound via an air conduction manner or a bone conduction manner.

The supporting structure 1410 may be worn on the user's body and configured to support one or more acoustic drivers 1420. In some embodiments, the supporting structure 1410 may include an enclosed shell structure with an internal hollow, and the one or more acoustic drivers 1420 may be disposed in the supporting structure 1410. In some embodiments, the speaker 1400 may be combined with a product such as a pair of glasses, a headset, a display device, an AR/VR helmet, etc. In this case, the supporting structure 1410 may be fixed near the user's ear via a hanging manner or a clamping manner. In some embodiments, the supporting structure 1410 may include a hook, a shape of the hook may be matched the shape of the auricle, and the speaker 1400 may be worn on the user's ear through the hook, independently. The speaker 1400, which is worn on the user's ear independently may be communicated with a signal source (e.g., a computer, a mobile phone, or other mobile devices) in a wired or wireless manner (e.g., Bluetooth™). For example, the speaker 1400 worn on the left ear and/or that worn on the right ear may directly communicate with the signal source via a wireless manner. As another example, the speaker 1400 worn at the left and/or right ear may include a first output part and a second output part. The first output part may communicate with the signal source, and the second output part may be connected to the first output part via a wireless manner. The sound may be output synchronously by the first output part and the second output part controlled by one or more synchronization signals. The wireless manner may include but not limited to the Bluetooth™, a local area network, a wide area network, a wireless personal area network, a near-field communication, or the like, or any combination thereof.

In some embodiments, the supporting structure 1410 may include a shell structure, and a shape of the supporting structure 1410 may match a shape of the ear of the user. The shape of the supporting structure 1410 may include a circular ring, an oval, a (regular or irregular) polygonal, a U-shape, a V-shape, a semi-circle, etc., and the supporting structure 1410 may be directly anchored at the user's ear. In some embodiments, the supporting structure 1410 may also include one or more fixed parts. The fixed part(s) may include an ear hook, a head beam, an elastic band, or the like, or any combination thereof. The fixed part(s) may be used to fix the speaker 1400 on the user and prevent the speaker 1400 from falling down. Merely by way of example, the elastic band may include a headband which may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the speaker 1400 to be fixed to a certain position of the head. In some embodiments, the elastic band may include a discontinuous band. For example, the elastic band may include a rigid portion and a flexible portion. The rigid portion may be made of a rigid material (e.g., a plastic, a metal, etc.), and the rigid portion may be fixed to the supporting structure 1410 of the speaker 1400 via a physical connection (e.g., a snap connection, a screw connection, etc.). The flexible portion may be made of an elastic material (e.g., a cloth, a composite material, a neoprene, etc.).

In some embodiments, when the user wears the speaker 1400, the supporting structure 1410 may be placed above or below the auricle. The supporting structure 1410 may also include a sound guiding hole 1411 and a sound guiding hole 1412, which may be configured to transmit sounds. In some embodiments, the sound guiding hole 1411 and the sound guiding hole 1412 may be placed on two sides of the user's auricle, respectively. The acoustic driver 1420 may output sound(s) through the sound guiding hole 1411 and/or the sound guiding hole 1412.

The acoustic driver 1420 may be configured to receive an electrical signal, and convert the electrical signal into a sound signal which may be output. In some embodiments, a type of the acoustic driver 1420 may include an acoustic driver with a low-frequency (e.g., 30 Hz-150 Hz), an acoustic driver with a middle-low-frequency (e.g., 150 Hz-500 Hz), an acoustic driver with a middle-high-frequency (e.g., 500 Hz-5 kHz) acoustic driver, an acoustic driver with a high-frequency e.g., 5 kHz-16 kHz), an acoustic driver with a full-frequency (e.g., 30 Hz-16 kHz), or the like, or any combination thereof, according to the frequency of the acoustic driver 1420. The low-frequency, the middle-low-frequency, the middle-high-frequency, the high-frequency, and/or the full-frequency may be merely used to indicate an approximate range of the frequency. In different application scenarios, different modes may be used to divide the frequency. For example, a frequency division point may be determined. The low frequency may indicate a frequency range which is less than the frequency division point, and the high frequency may indicate the frequency range which is greater than the frequency division point. The frequency division point may be any value within an audible range that can be heard by the ear of the user, for example, 500 Hz, 600 Hz, 700 Hz, 800 Hz, 14000 Hz, etc. In some embodiments, the acoustic driver 1420 may include a moving coil acoustic driver, a moving iron acoustic driver, a piezoelectric acoustic driver, an electrostatic acoustic driver, a magnetostrictive acoustic driver according to a principle of the acoustic driver 1420.

In some embodiments, the acoustic driver 1420 may include a vibration diaphragm. When the vibration diaphragm vibrates, sounds may be transmitted from a front side and a rear side of the vibration diaphragm, respectively. In some embodiments, a front chamber 1413 may be disposed on the front side of the vibration diaphragm in the supporting structure 1410, which may be configured to transmit the sound(s). The front chamber 1413 may be acoustically coupled with the sound guiding hole 1414. The sound transmitted from the front side of the vibration diaphragm may be transmitted from the sound guiding hole 1414 through the front chamber 1413. A rear chamber 1414 may be disposed on the rear side of the vibration diaphragm in the supporting structure 1410, which may be configured to transmit the sound(s). The rear chamber 1414 may be acoustically coupled with the sound guiding hole 1412. The sound transmitted from the rear side of the vibration diaphragm may be transmitted from the sound guiding hole 1412 through the rear chamber 1414. It should be noted that, when the vibration diaphragm vibrates, the front side and the rear side of the vibration diaphragm may simultaneously generate sounds with opposite phases. After passing through the front chamber 1413 and rear chamber 1414, respectively, the sounds may be transmitted outward from the sound guiding hole 1414 and the sound guiding hole 1412. In some embodiments, the sounds output by the acoustic driver 1420, which may be transmitted through the sound guiding hole 1414 and the sound guiding hole 1412 may meet specific requirement by setting a structure of at least one of the front chamber 1413 and the rear chamber 1414. For example, the sound guiding hole 1414 and the sound guiding hole 1412 may transmit a set of sounds with a specific phase relationship (e.g., opposite phases) by designing a length of at least one of the front chamber 1413 and the rear chamber 1414, thereby increasing a volume in the near-field of the speaker 1400, avoiding sound leakage of the speaker 1400, and effectively improving the performance of the speaker 1400.

In some alternative embodiments, the acoustic driver 1420 may include a plurality of vibration diaphragms (e.g., two vibration diaphragms). The plurality of vibration diaphragms may vibrate to generate sounds, respectively. Each of the sounds may be transmitted pass through a chamber which is connected to one of the vibration diaphragms in the supporting structure and may be output from a corresponding sound guiding hole. The plurality of vibration diaphragms may be controlled by a same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

In some embodiments, the speaker 1400 may include a plurality of acoustic drivers 1420. The plurality of acoustic drivers 1420 may be controlled by a same controller or different controllers. The plurality of acoustic drivers 1420 may generate sounds that satisfy the requirement of certain phase(s) and/or amplitude(s). Merely by way of example, the plurality of speakers 1420 may include a first acoustic driver and a second acoustic driver. The controller may control the first acoustic driver and the second acoustic driver using a control signal to generate sounds with certain phase(s) and amplitude(s) (e.g., the sounds with the same amplitude and opposite phases, the sounds with different amplitudes and opposite phases, etc.). The first acoustic driver may output a sound of the sounds through at least one of the first sound guide holes, and the second acoustic driver may output a sound of the sounds through at least one of the second sound guide holes. The first sound guide hole and the second sound guide hole may be disposed on two sides of the auricle, respectively. It should be noted that a count of the plurality of acoustic drivers may not be limited to two, for example, three, four, five, etc. Sound parameters (e.g., a phase, a frequency, an amplitude, etc.) of each of the plurality of acoustic drivers may be adjusted according to actual needs.

In order to further explain the influence of the sound guide holes distribution on two sides of the auricle on the sound output of the speaker 1400, the speaker 1400 and the auricle may be taken as a two-point sound sources-baffle model according to some embodiments of the present disclosure. Merely for illustration purpose, when the size of each of the sound guiding holes on the speaker 1400 is relatively small, each of the sound guiding holes may be regarded as a point sound source. A sound field pressure p generated by a single point sound source may satisfy Equation (13) as described in FIG. 4E. As mentioned above, at least two sound guiding holes (e.g., the sound guiding holes 1414 and the sound guiding holes 1412) may be disposed on the speaker 1400 to form two-point sound sources (also referred to as a dual-point sound source, or two point sound sources), thereby reducing sound transmitted to the surroundings. In some embodiments, sounds output from two sound guiding holes, i.e., two-point sound sources, may have a certain phase difference. When positions of the two-point sound sources and/or the phase difference of the two-point sound sources meet a certain condition, the speaker 1400 may perform different sound effects in the near-field and the far-field. For example, when phases of the point sound sources corresponding to the two sound guiding holes, respectively, are opposite, that is, an absolute value of the phase difference between the two-point sound sources is 180 degrees, and the sound leakage in the far-field may be reduced according to a principle of reversed-phase cancellation.

Further refer to FIG. 4E for illustration purposes, a sound pressure p in the sound field generated by two-point sound sources may satisfy the following Equation (14):

$$p = \frac{A_1}{r_1}\exp j(\omega t - kr_1 + \varphi_1)\frac{A_2}{r_2}\exp j(\omega t - kr_2 + \varphi_2), \quad (14)$$

where, $A_1$ and $A_2$ denote intensities of the two-point sound sources, $\varphi_1$ and $\varphi_2$ denote phases of the two-point sound sources, respectively, d denotes a distance between the two-point sound sources, and $r_1$ and $r_2$ may satisfy Equation (15);

$$\begin{cases} r_1 = \sqrt{r^2 + \left(\frac{d}{2}\right)^2 - 2 \times r \times \frac{d}{2} \times \cos\theta} \\ r_2 = \sqrt{r^2 + \left(\frac{d}{2}\right)^2 + 2 \times r \times \frac{d}{2} \times \cos\theta} \end{cases}, \tag{15}$$

where, r denotes a distance between any target point and the center of the two-point sound sources in the space, and θ denotes an angle between a line connecting the target point and the center of the two-point sound sources and another line on which the two-point sound sources may be located.

It may be known from Equation (15) that a value of the sound pressure p of the target point in the sound field may be related to the intensity of each of the two-point sound sources, the distance d, the phase, and the distance from the target point and the sound source.

Figure 15:
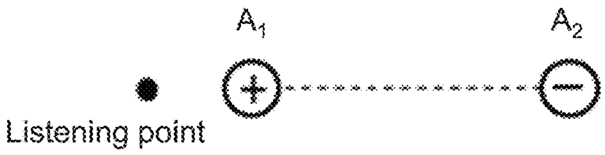
FIG. 15 is a schematic diagram illustrating two-point sound sources and a listening position according to some embodiments of the present disclosure.
Figure 16:
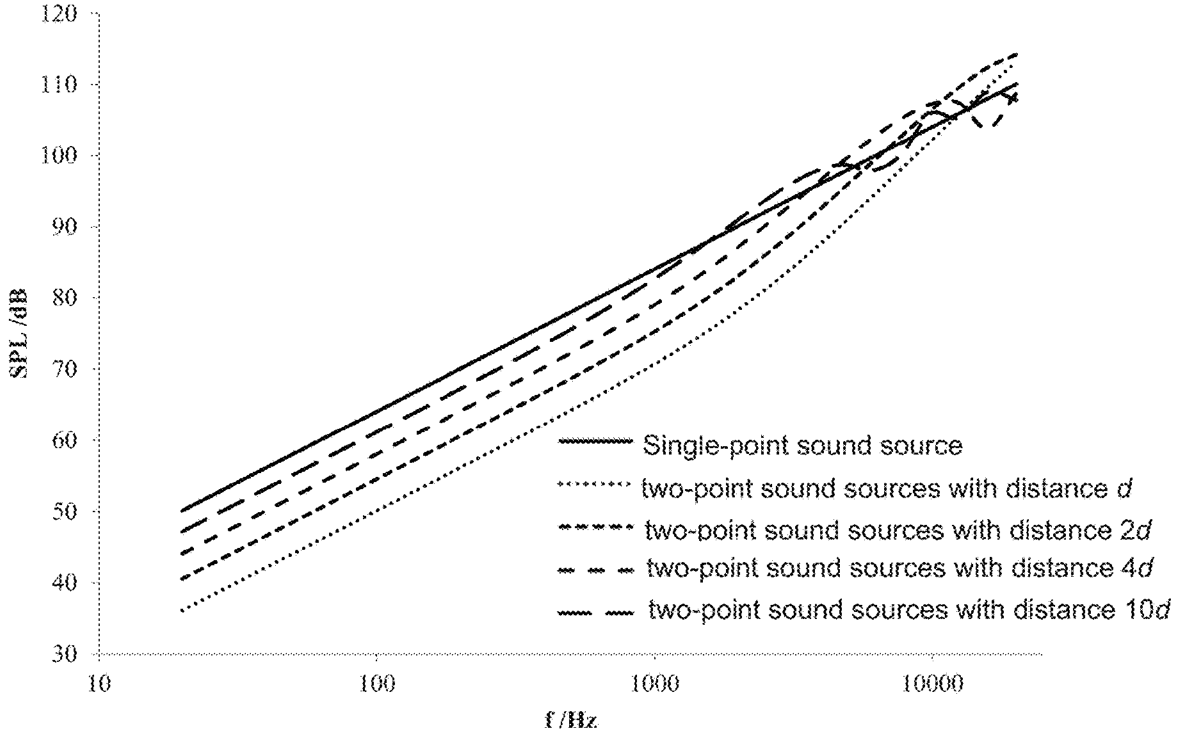
FIG. 16 is a schematic diagram illustrating frequency response characteristic curves of two-point sound sources with different distances in a listening position in a near-field according to some embodiments of the present disclosure.

FIG. 15 is a schematic diagram illustrating exemplary two-point sound sources and a listening position according to some embodiments of the present disclosure. FIG. 16 is a schematic diagram illustrating frequency response characteristic curves of two two-point sound sources with different distances in a listening position in a near-field according to some embodiments of the present disclosure. In some embodiments, the listening position may be regarded as a target point to further explain a relationship between an acoustic pressure at the target point and the distanced between the two-point sound sources. The listening position may be used to indicate a position of an ear of a user, that is, a sound at the listening position may be used to indicate a sound in the near-field generated by the two-point sound sources. It should be noted that "a sound in the near-field" may refer to a sound within a certain distance from a sound source (e.g., the sound guide hole 1414 which may be regarded as a point sound source), for example, a sound within 0.2 m from the sound source. Merely by way of example, as shown in FIG. 15, the point sound source $A_1$ and the point sound source $A_2$ may be on a same side of the listening position. The point sound source $A_1$ may be closer to the listening position, and the point sound source $A_1$ and the point sound source $A_2$ may output sounds with a same amplitude and opposite phases. As shown in FIG. 16, as the distance between the point sound source $A_1$ and the point sound source $A_2$ gradually increases (e.g., from d to 10d), a sound volume at the listening position may be gradually increased. As the distance between the point sound source $A_1$ and the point sound source $A_2$ increases, a difference between sound pressure amplitudes (i.e., sound pressure difference) between the two sounds reaching the listening position may be increased, and a difference of acoustic routes may be increased, thereby reducing the sound cancellation and increasing the sound volume of the listening position. Due to the existence of the sound cancellation, the sound volume at the listening position may be less than that generated by a single-point sound source with a same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume of the listening position generated by the two-point sound sources may be greater than that generated by the single-point sound source. As used herein, the sound pressure amplitude (i.e., a sound pressure) may refer to a pressure generated by the sound through the vibration of the air.

Figure 17:
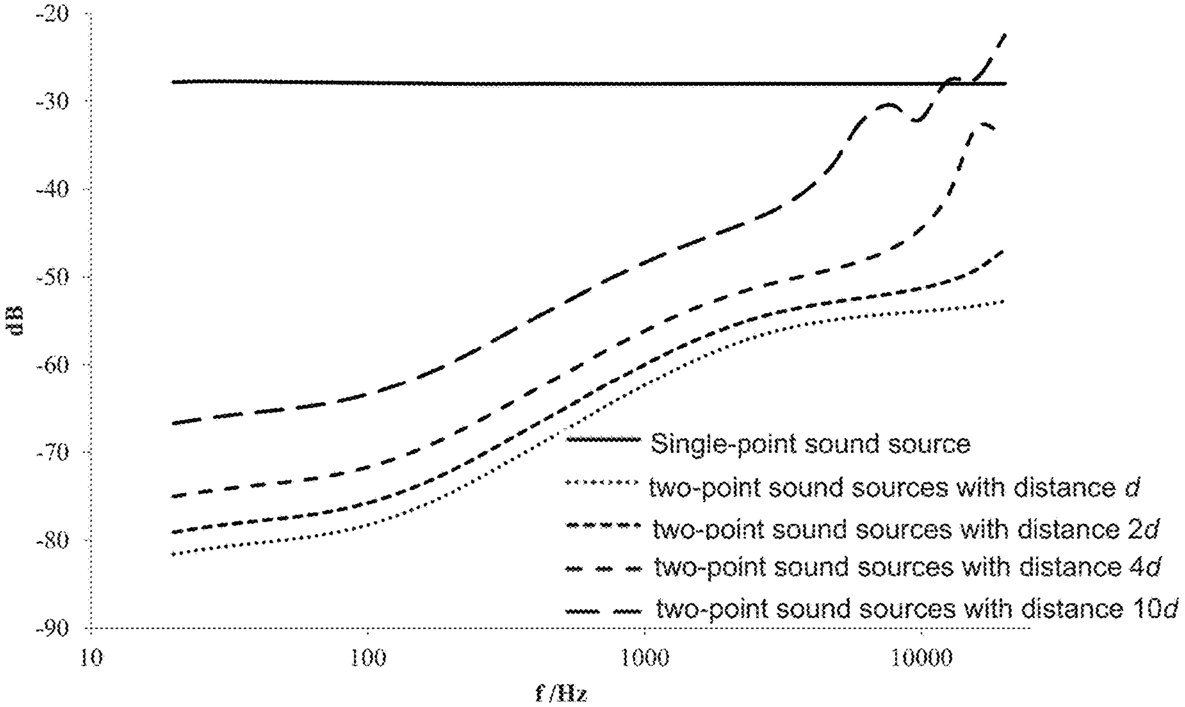
FIG. 17 is a schematic diagram illustrating exemplary sound leakage parameters of two-point sound sources with different distances in a far-field according to some embodiments of the present disclosure.

In some embodiments, the sound volume at the listening position may be increased by increasing the distance between the two-point sound sources (e.g., the point sound source $A_1$ and the point sound source $A_2$). As the distance increases, the sound cancellation of the two-point sound sources may be weakened, thereby increasing sound leakage in the far-field. For illustration purposes, FIG. 17 is a schematic diagram illustrating exemplary sound leakage parameters of two-point sound sources with different distances in the far-field according to some embodiments of the present disclosure. As shown in FIG. 17, taking a sound leakage parameter of a single-point sound source in the far-field as a reference, as the distance between the two-point sound sources increases from d to 10d, the sound leakage parameter in the far-field may be gradually increased, which may indicate that the sound leakage may be gradually increased. More descriptions regarding the sound leakage parameter may refer to Equation (16) and related descriptions.

Figure 18:
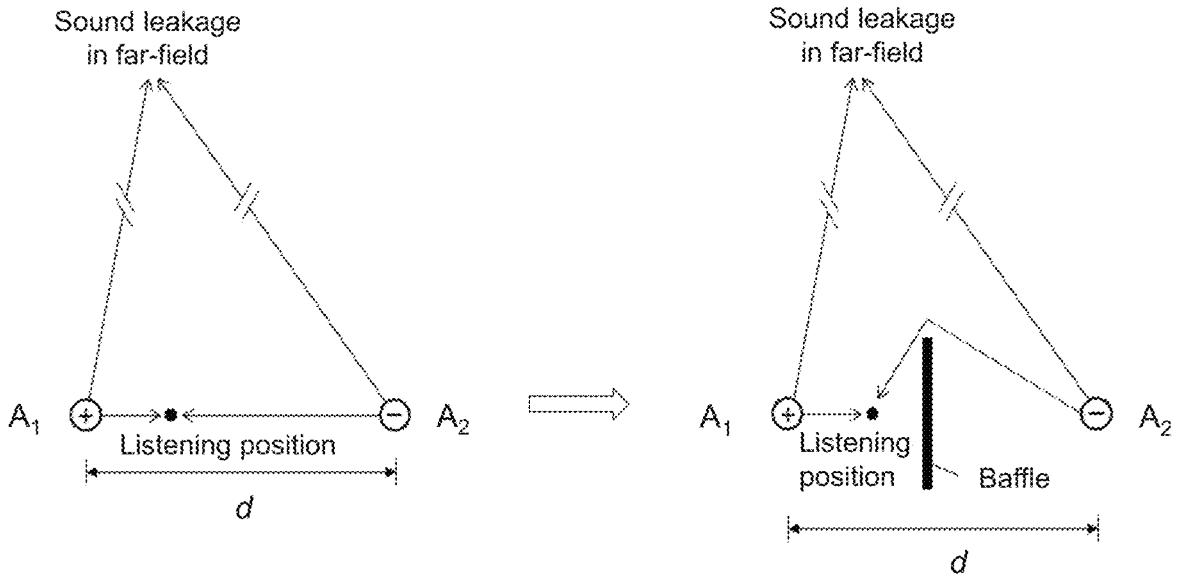
FIG. 18 is a schematic diagram illustrating an exemplary baffle disposed between the two-points sound sources according to some embodiments of the present disclosure.

In some embodiments, two sound guide holes may be disposed on two sides of the auricle of the user, which may improve an output effect of the speaker 1400, that is, increase the sound intensity of the listening position in the near-field and reduce the sound leakage in the far-field. For illustration purposes, the auricle of the user is regarded as a baffle, and the sounds transmitted from the two sound guide holes are regarded as two-point sound sources. FIG. 18 is a schematic diagram illustrating an exemplary baffle disposed between the two-points sound sources according to some embodiments of the present disclosure. As shown in FIG. 18, when the baffle is disposed between a point sound source $A_1$ and a point sound source $A_2$, a sound field of the point sound source $A_2$ may bypass the baffle to interfere with a sound wave of the point sound source $A_1$ at a listening position in the near-field, which may increase an acoustic route between the point sound source $A_2$ and the listening position. Assuming that the point sound source $A_1$ and the point sound source $A_2$ have a same amplitude, an amplitude difference between the sound waves of the point sound source $A_1$ and the point sound source $A_2$ at the listening position may be greater than that in a case without a baffle, thereby reducing a sound cancellation of the two sounds at the listening position, increasing a sound volume at the listening position. In the far-field, the sound waves generated by the point sound source $A_1$ and the point sound source $A_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $A_1$ and the point sound source $A_2$ may significantly increase the sound volume at the listening position in the near-field and not significantly increase the sound leakage in the far-field.

Figure 19:
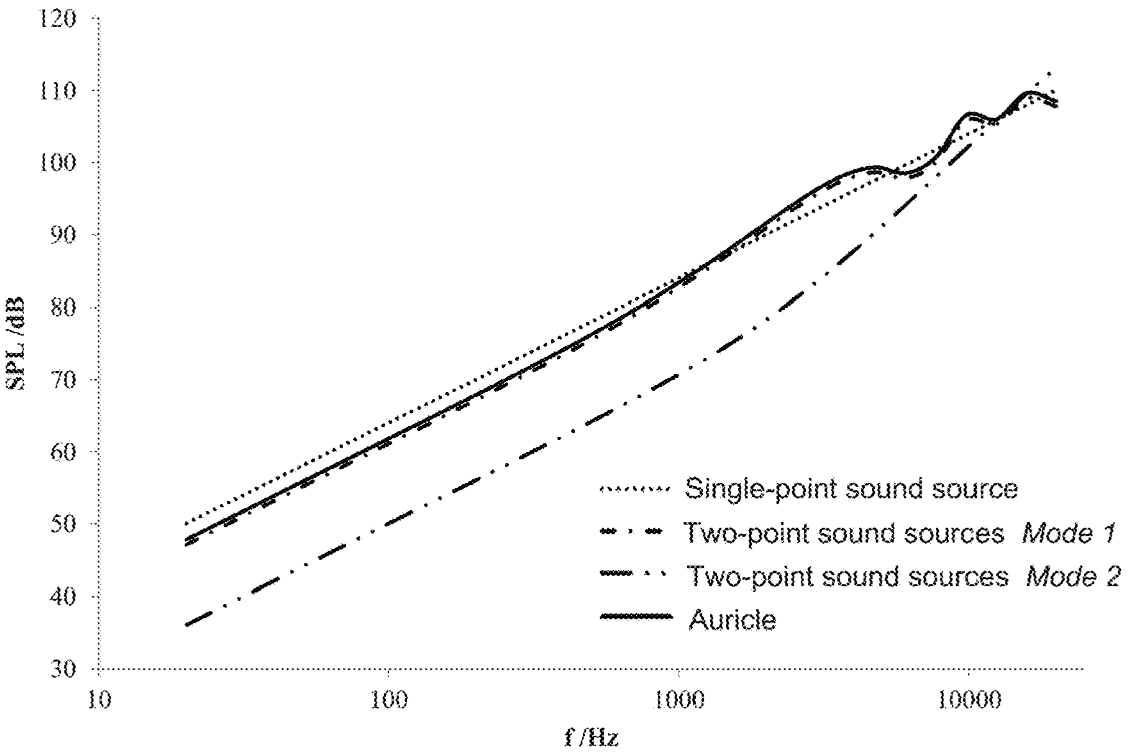
FIG. 19 is a schematic diagram illustrating exemplary frequency response characteristic curves of a near-field when the auricle is located between two-point sound sources according to some embodiments of the present disclosure.
Figure 20:
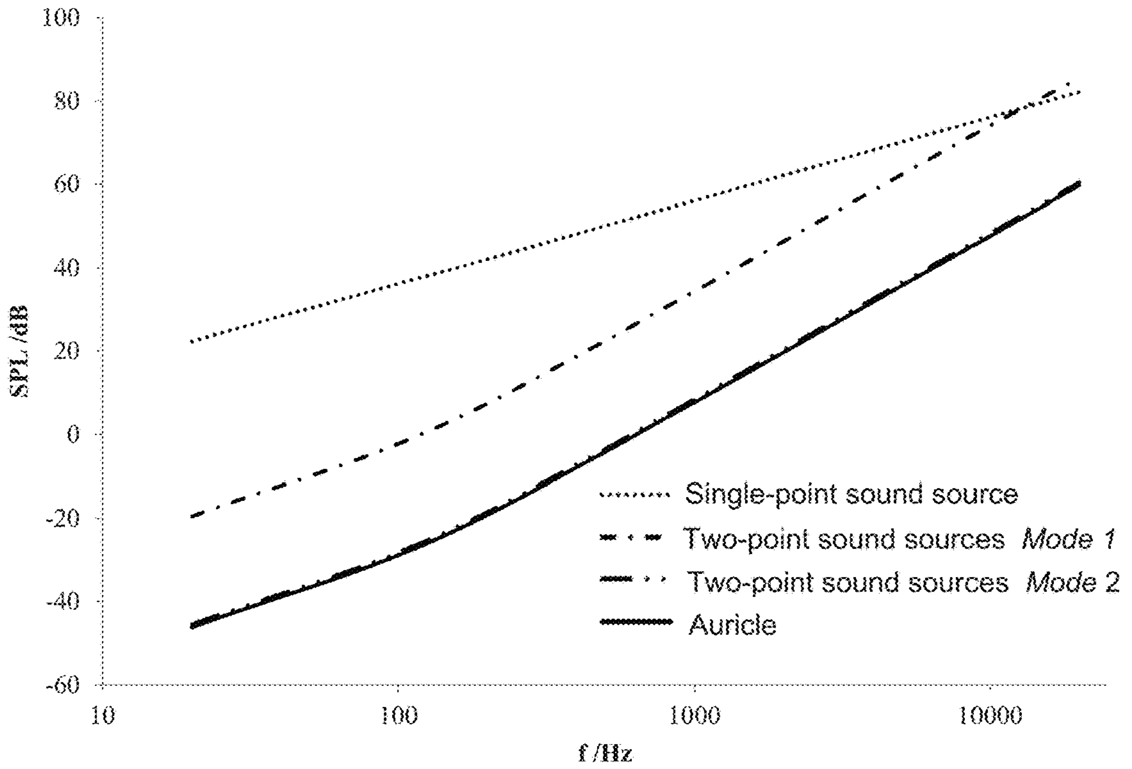
FIG. 20 is a schematic diagram illustrating exemplary frequency response characteristic curves of a far-field when an auricle is located between two-point sound sources according to some embodiments of the present disclosure.

FIG. 19 is a schematic diagram illustrating exemplary frequency response characteristic curves of a near-field when the auricle is located between two-point sound sources according to some embodiments of the present disclosure. FIG. 20 is a schematic diagram illustrating an exemplary frequency response characteristic curve of a far-field when the auricle is located between two-point sound sources according to some embodiments of the present disclosure. According to some embodiments of the present disclosure, when the two-point sound sources are located on two sides of the auricle, the auricle may perform a function of a baffle, and the auricle may be referred to as a baffle for convenience. Merely by way of example, due to the existence of the auricle, a sound in the near-field may be generated by two-point sound sources with a distance D1 (also referred to as Mode 1). A sound in a sound in the far-field may be generated by two-point sound sources with a distance D2 (also referred to as Mode 2), and D1>D2. As shown in FIG. 19, for a low-frequency (e.g., a frequency less than 1000 Hz), a volume of the sound in the near-field (i.e., a sound heard by an ear of a user) may be the same as or similar to that in mode 1 when the two-point sound sources are located on two sides of the auricle, which may be greater than a volume of a sound in the near-field in mode 2 and may be close to a volume of a sound in a near-field of a single-point sound source. As the frequency increases (e.g., 2000 Hz~7000 Hz), the volume of the sound in the near-field in mode 1 and that generated by the two-point sound sources located on two sides of the auricle may be greater than that of the one-point sound source. It should be understood that, when the auricle is located between the two-point sound sources, the volume of the sound in the near-field transmitted from a sound source to the ear may be effectively increased. As shown in FIG. 20, as the frequency increases, the sound leakage in the far-field may be increased. When the two-point sound sources are located on two sides of the auricle, the sound leakage in the far-field generated by the two-point sound sources may be the same as (or substantially same as) the sound leakage in the far-field in Mode 2, which may be less than the sound leakage in the far-field in Mode 1 and/or the sound leakage in the far-field generated by a single-point sound source. Therefore, when the auricle is located between the two-point sound sources, the sound transmitted from the sound source to the far-field may be effectively reduced, that is, the sound leakage from the sound source to the surroundings may be effectively reduced.

More descriptions regarding the sound leakage parameter (s) may be found in the following descriptions. In an application of an open ear speaker, an acoustic pressure Pear transmitted to the listening position may be large enough to meet the listening requirements, and an acoustic pressure $P_{far}$ radiated to the far-field may be small enough to reduce the sound leakage. A sound leakage parameter a may be taken as a parameter for evaluating a capability to reduce the sound leakage, and the sound leakage parameter a may be represented by Equation (16) below:

$$\alpha = \frac{|P_{far}|^2}{|P_{ear}|^2}. \tag{16}$$

Figure 21:
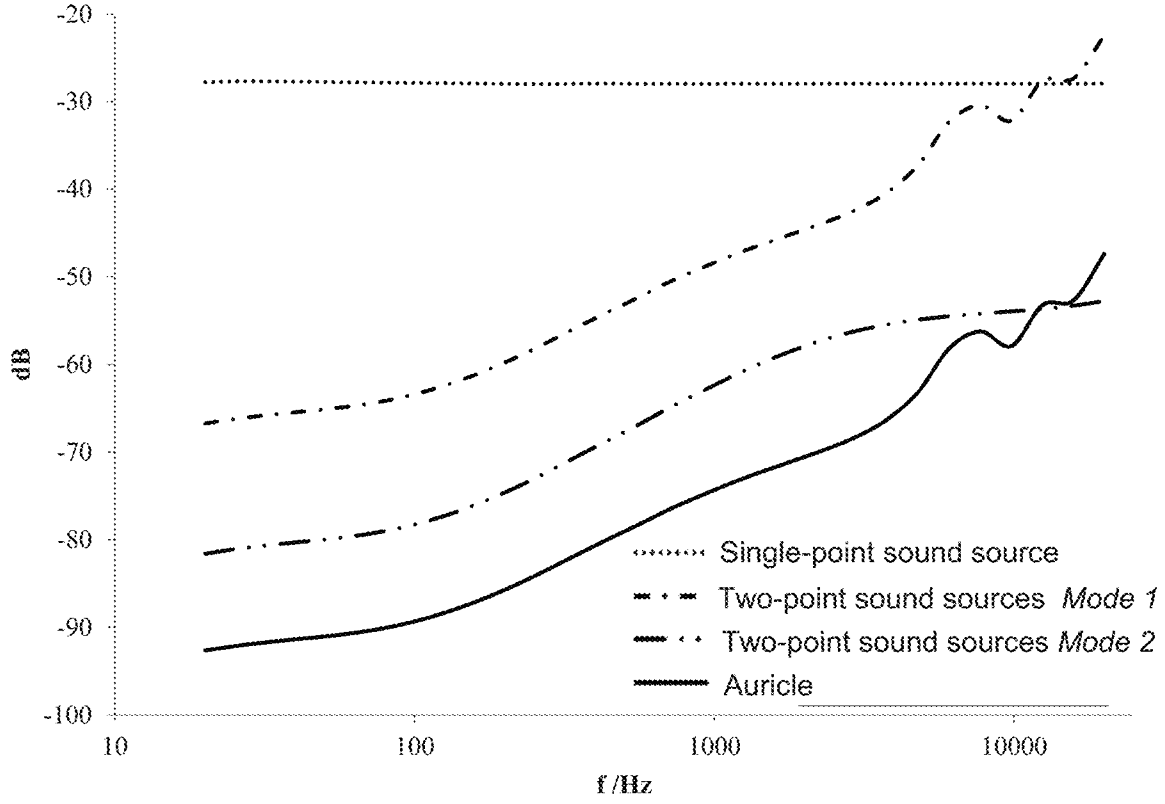
FIG. 21 is a schematic diagram illustrating sound leakage parameters when two-point sound sources are disposed on two sides of an auricle according to some embodiments of the present disclosure.

It can be known from Equation (16) that the smaller the sound leakage parameter, the stronger the leakage reduction ability of the speaker. The sound leakage in the far-field may be smaller when a volume of a sound at the listening position in a near-field listening is same. As shown in FIG. 21, when the frequency is less than 10000 Hz, the sound leakage parameter when the two-point sound sources are distributed on two sides of the auricle may be less than that in the mode 1 (no baffle is disposed between the two-point sound sources and the distance is D1), the mode 2 (no baffle is disposed between the two-point sound sources, and the distance is D2), and the single-point sound source. Therefore, the performance of reducing the sound leakage of the speaker 1400 may be improved when the two-point sound sources are located on two sides of the auricle.

Figure 22:
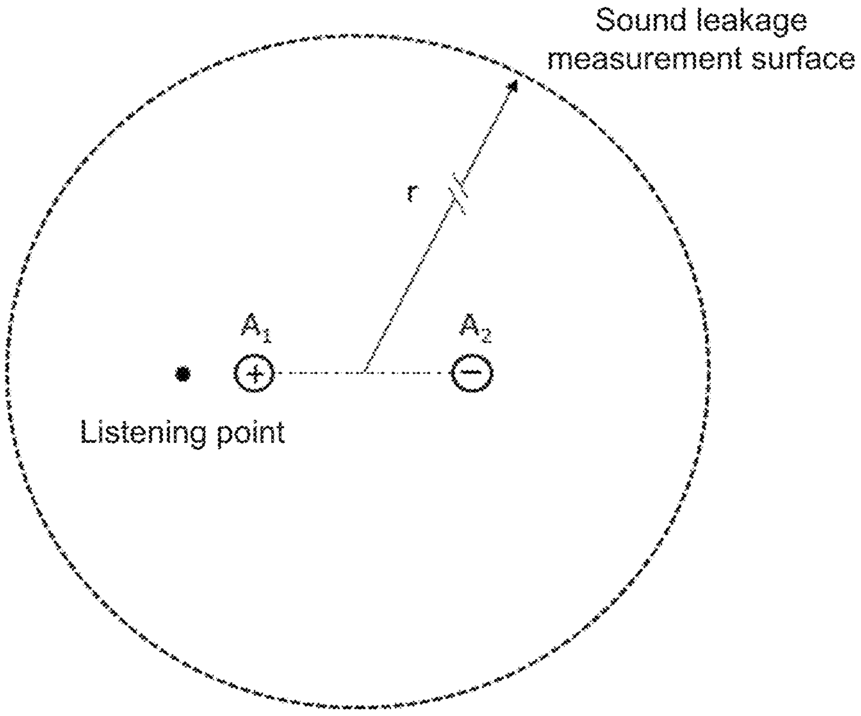
FIG. 22 is a schematic diagram illustrating a measurement of a sound leakage parameter according to some embodiments of the present disclosure.

FIG. 22 is a schematic diagram illustrating a measurement of a sound leakage parameter according to some embodiments of the present disclosure. As shown in FIG. 22, a listening position may be located at the left of the point source $A_1$. A method for measuring the sound leakage may include selecting an average value of acoustic pressure amplitudes of points located on a spherical surface with a center of two-point sound source (e.g., denoted by $A_1$ and $A_2$ as shown in FIG. 22) as a center and the radius r as a value of the sound leakage. It should be noted that the method for measuring the sound leakage in this embodiment is merely an example of the principle and effect, and not tended to limit the scope of the present disclosure. The method for measuring the sound leakage may also be adjusted according to an actual situation. For example, one or more points in a far-field may be used to measure the sound leakage. As another example, an intermediate point of the two-point sound sources may be taken as a center of a circle, and two or more points are uniformly taken in the far-field according to a certain spatial angle, and the acoustic pressure amplitudes of the points may be averaged as the value of the sound leakage. In some embodiments, a method for measuring a heard sound may include selecting a position near the point sound source(s) as the listening position, and an amplitude of an acoustic pressure measured at the listening position as a value of the heard sound. In some embodiments, the listening position may be on a line connecting the two-point sound sources, or may not be on the line. The method for measuring the heard sound may be reasonably adjusted according to the actual situation. For example, acoustic pressure amplitudes of one or more other points of the near-field position may be averaged as the value of the heard sound. As another example, one of the point sound sources may be taken as a center of a circle, and two or more points may be uniformly taken in the near-field according to a certain spatial angle, the acoustic pressure amplitudes of the points may be averaged as the value of the heard sound. In some embodiments, a distance between the listening position in the near-field and the point sound source(s) may be less than a distance between the point sound source(s) and the spherical surface.

It should be noted that the sound guiding holes for outputting sound taken as point sound sources may only serve as an explanation of the principle and effect of the present disclosure, and may not limit the shapes and sizes of the sound guiding holes in practical applications. In some embodiments, when an area of a sound guiding hole is relatively large, the sound guiding hole may be regarded as a planar acoustic source. In some embodiments, the point sound source may also be realized by other structures, such as a vibration surface, a sound radiation surface, etc. For those skilled in the art, without creative activities, it may be known that the sound produced by a structure such as the sound guiding hole, the vibration surface, and the acoustic radiation surface may be equivalent to the point sound source in the spatial scale discussed in the present disclosure, which may have consistent sound propagation characteristics and a same mathematical description method. Further, for those skilled in the art, without creative activities, it may be known that an acoustic effect achieved by "the acoustic driver may output sound through at least two first sound guiding holes" described in the present disclosure may also be achieved by other acoustic structures, for example, "at least two acoustic drivers may output sound through at least one acoustic radiation surface." According to actual situations, other acoustic structures may be selected, adjusted, and/or combined, and the same acoustic output effect may also be achieved. The principle of radiating sound outward from a structure such as the surface sound source may be similar to that of the point sound source, and not repeated herein. In addition, the number or the count of the sound guide holes (e.g., the point sound source, the surface sound source, etc.) on the speaker is not limited to two mentioned above, and the number or the count of the sound guide holes may be three, four, five, etc., thereby forming multiple sets of two-points/areas sound sources, or a set of multiple-points/areas sound sources, which are not limited herein, which may achieve the technical effects of the two-point sound sources according to some embodiments of the present disclosure.

In order to further explain an effect on the acoustic output of the speaker 1400 with or without a baffle between two-point sound sources or two sound guiding holes, a volume of a sound at the listening position in a near-field and/or a volume of a sound leakage in a far-field under different conditions may be described below.

Figure 23:
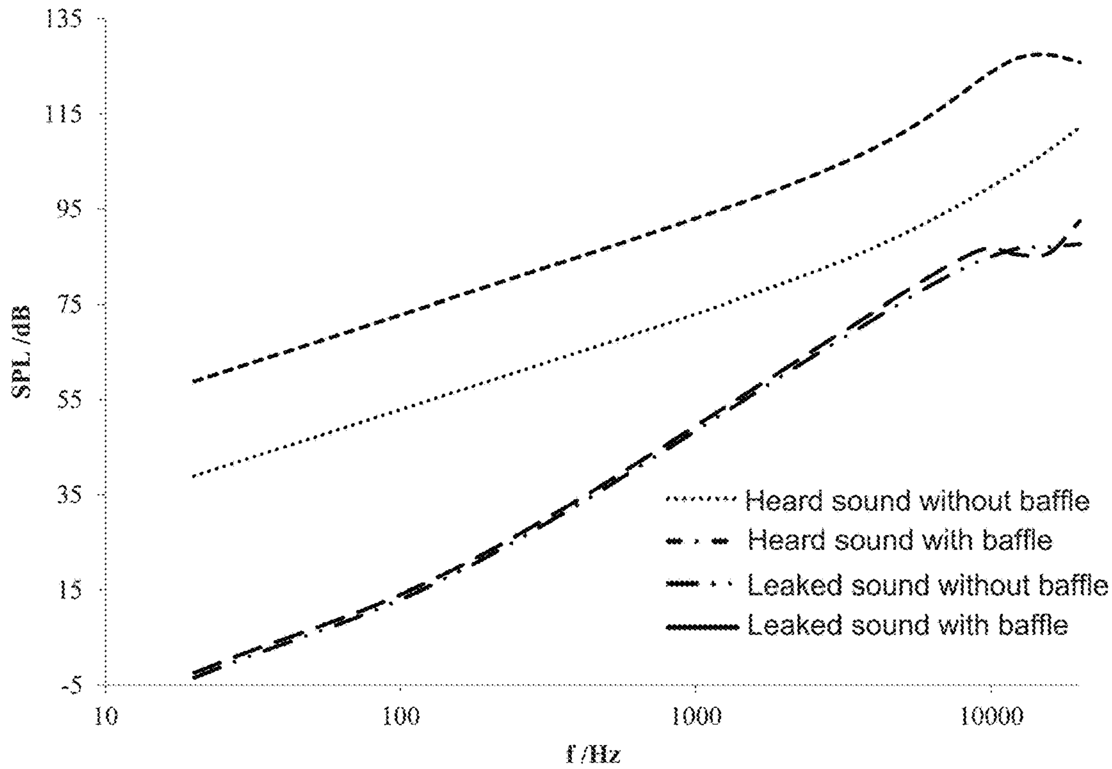
FIG. 23 is a schematic diagram illustrating exemplary frequency response characteristic curves of two-point sound sources when a baffle is disposed and not disposed between the two-point sound sources according to some embodiments of the present disclosure.

FIG. 23 is a schematic diagram illustrating exemplary frequency response characteristic curves of two-point sound sources when a baffle is disposed and not disposed between the two-point sound sources. As shown in FIG. 23, when the baffle is disposed between the two-point sound sources (i.e., two sound guiding holes) of the speaker, a distance between the two-point sound sources may be increased in the near-field, and the volume of the sound at the listening position in the near-field may be equivalent to being generated by two-point sound sources with a relatively large distance, thereby increasing the volume of the sound in the near-field compared to a case without the baffle. In the far-field, the interference of sound waves generated by the two-point sound sources may not be affected by the baffle significantly, the sound leakage may be regarded as being generated by a set of two-point sound sources with a relatively small distance, and the sound leakage may not be changed significantly with or without the baffle. The baffle disposed between the two sound guiding holes (the two-point sound sources) may improve the performance of the speaker on reducing the sound leakage, and increase the volume of the sound in the near-field, thereby reducing requirements for a component that plays an acoustic role in the speaker, simplifying a circuit structure of the speaker, reducing electrical loss of the speaker, and prolonging a working time of the speaker.

Figure 24:
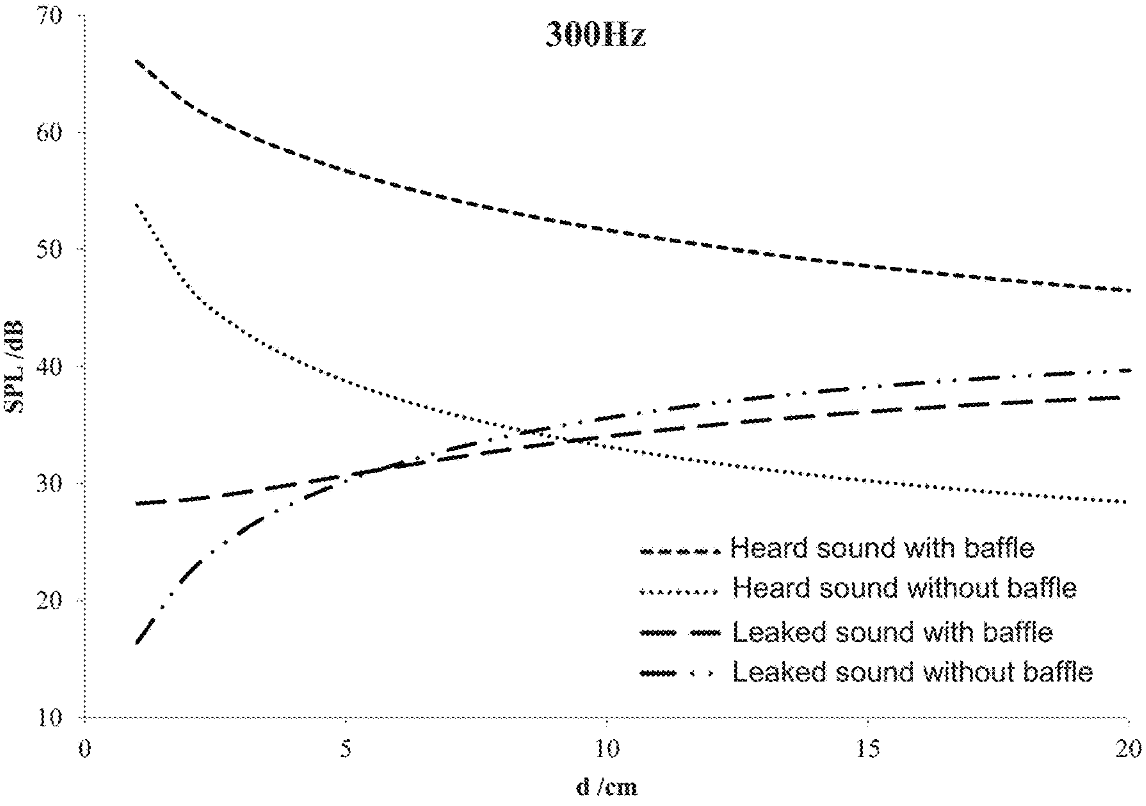
FIG. 24 is a schematic diagram illustrating exemplary curves of acoustic pressure amplitudes corresponding to two-point sound sources with different distances and a frequency of 300 Hz according to some embodiments of the present disclosure.
Figure 25:
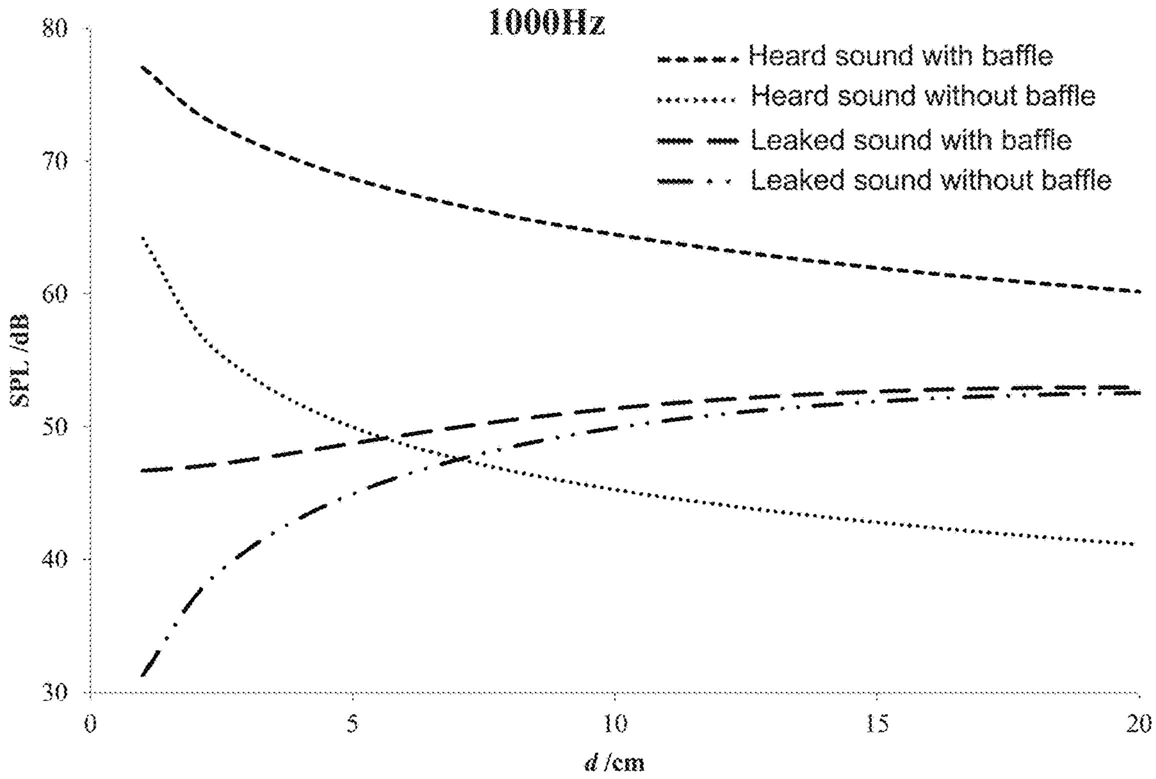
FIG. 25 is a schematic diagram illustrating exemplary curves of acoustic pressure amplitudes corresponding to two-point sound sources with different distances and a frequency of 14000 Hz according to some embodiments of the present disclosure.

FIG. 24 is a schematic diagram illustrating exemplary curves of acoustic pressure amplitudes corresponding to two-point sound sources with different distances and a frequency of 300 Hz. FIG. 25 is a schematic diagram illustrating exemplary curves of acoustic pressure amplitudes corresponding to two-point sound sources with different distances and a frequency of 1000 Hz. As shown in FIGS. 24 and 25, in the near-field, when the frequency is 300 Hz or 1000 Hz, a volume of a heard sound when a baffle is disposed between the two-point sound sources is greater than a volume of a heard sound when the baffle is not disposed between the two-point sound sources as the distance d of the two-point sound sources is increased. In this case, the baffle disposed between the two-point sound sources may effectively increase the volume of the heard sound in the near-field when the frequency is 300 Hz or 1000 Hz. In a far-field, a volume of a leaked sound when the baffle is disposed between the two-point sound sources may be equivalent to (or substantially equivalent to) a volume of the leaked sound when the baffle is not disposed between the two-point sound sources, which may show that the baffle disposed between the two-point sound sources may not affect on the sound leakage in the far-field when the frequency is 300 Hz or 1000 Hz.

Figure 26:
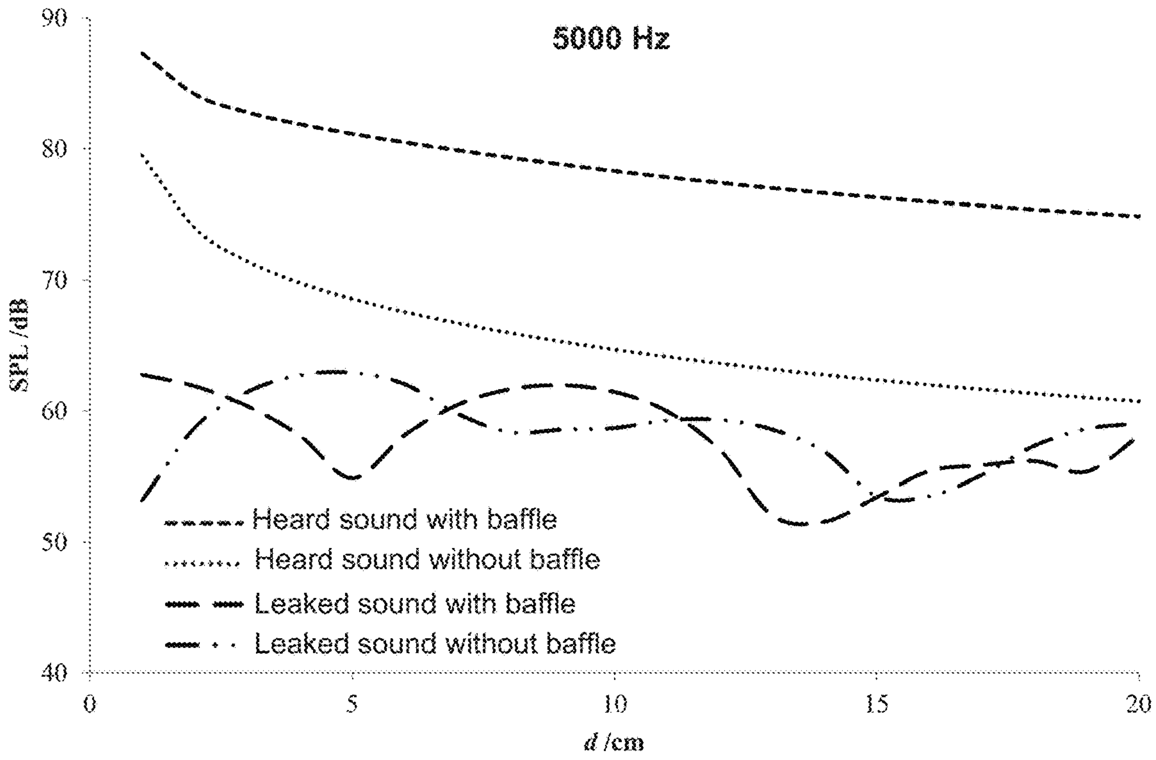
FIG. 26 is a schematic diagram illustrating exemplary curves of acoustic pressure amplitudes corresponding to two-point sound sources with different distances and a frequency of 5000 Hz according to some embodiments of the present disclosure.

FIG. 26 is a schematic diagram illustrating exemplary curves of acoustic pressure amplitudes corresponding to two-point sound sources with different distances and a frequency of 5000 Hz. As shown in FIG. 26, in the near-field, when the frequency is 5000 Hz, a volume of a heard sound when a baffle is disposed between the two-point sound sources is greater than a volume of a heard sound when the baffle is disposed between the two-point sound sources as the distance d of the two-point sound sources is increased. In the far-field, a volume of a leaked sound of the two-point sound sources may be fluctuant as a function of the distance d when the baffle is disposed and not disposed between the two-point sound sources. Overall, whether the baffle structure is disposed between the two-point sound sources may have little effect on the sound leakage in the far-field.

Figure 27:
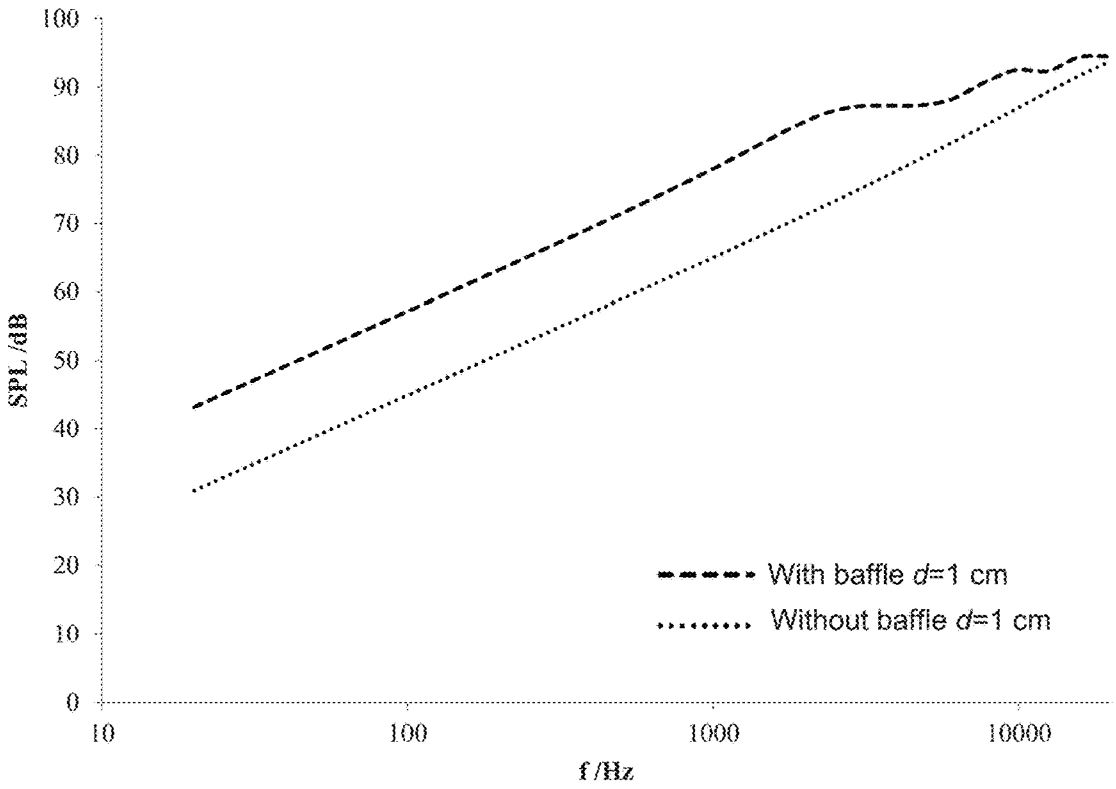
FIG. 27 is a schematic diagram illustrating exemplary frequency response characteristic curves of two-point sound sources when a distance d between the two-point sound sources is 1 cm.
Figure 28:
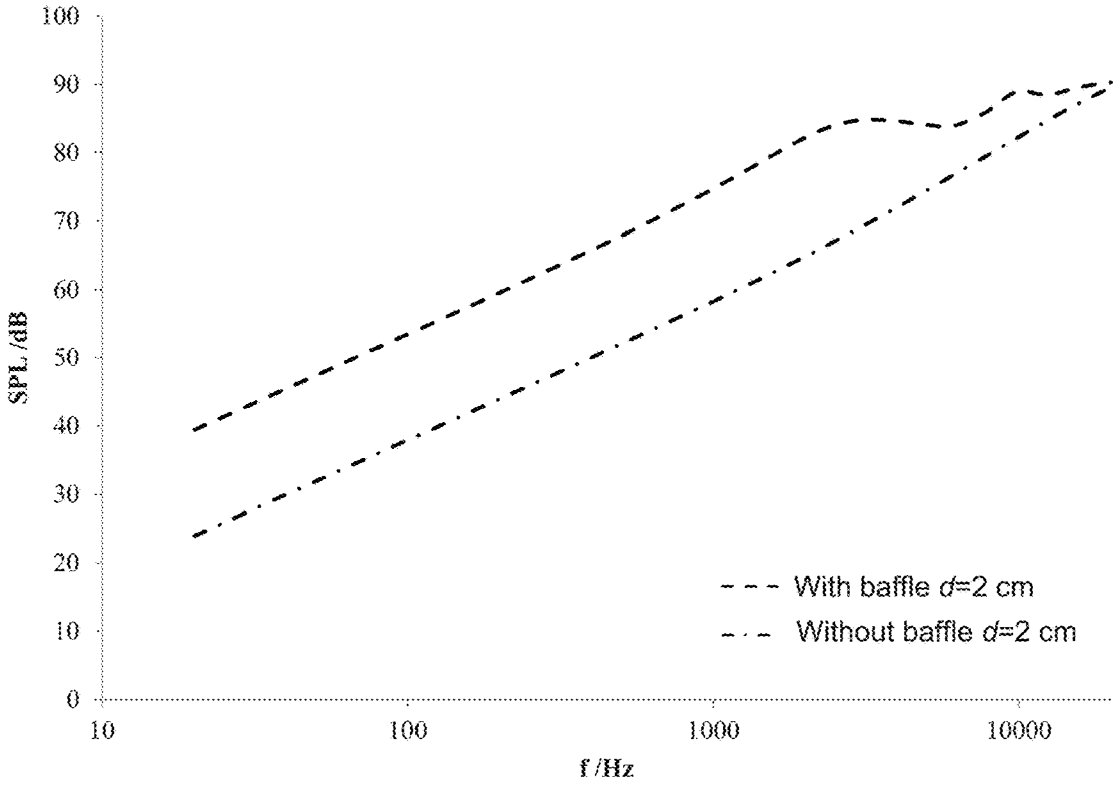
FIG. 28 is a schematic diagram illustrating exemplary frequency response characteristic curves of two-point sound sources when a distance d between the two-point sound sources is 2 cm.
Figure 29:
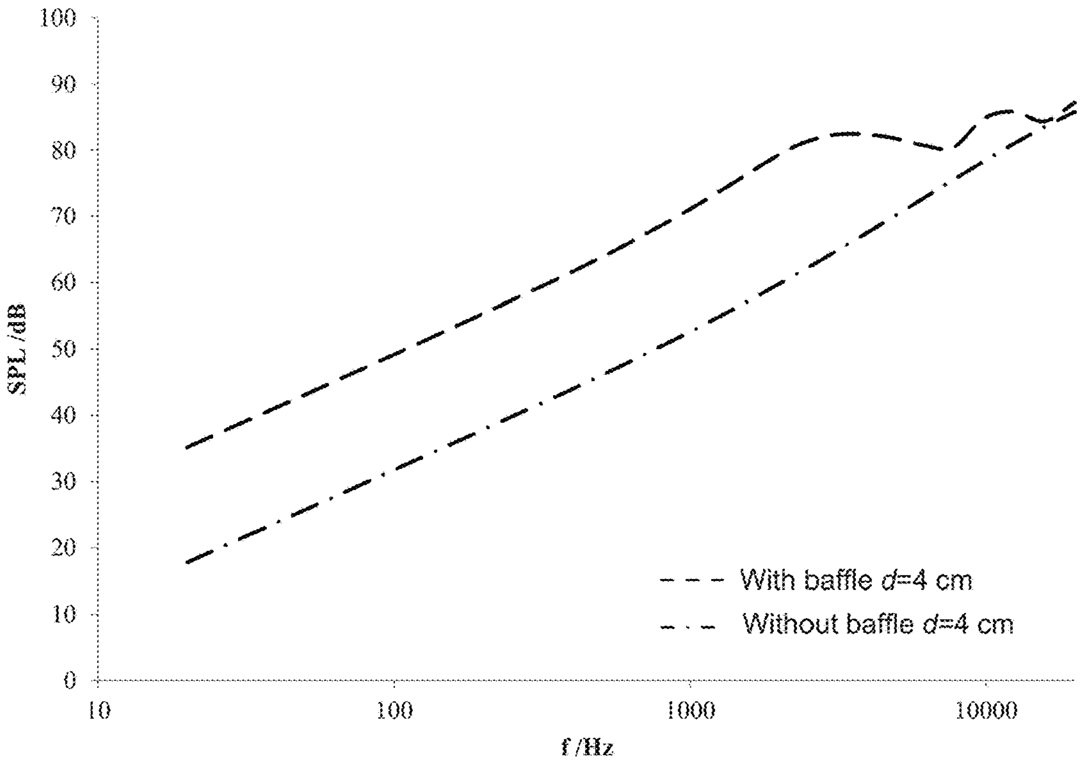
FIG. 29 is a schematic diagram illustrating exemplary frequency response characteristic curves of two-point sound sources when a distance d between the two-point sound sources is 4 cm.
Figure 30:
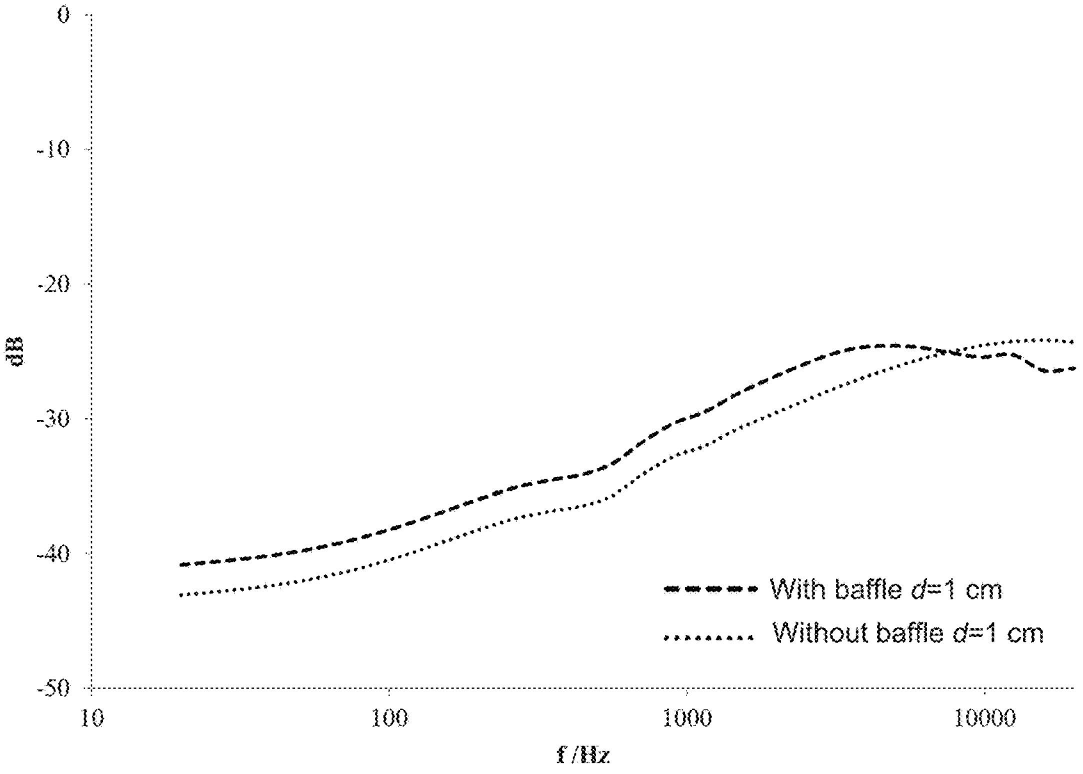
FIG. 30 is a schematic diagram illustrating a sound leakage parameter in a far-field when a distance d between the two-point sound sources is 1 cm.
Figure 31:
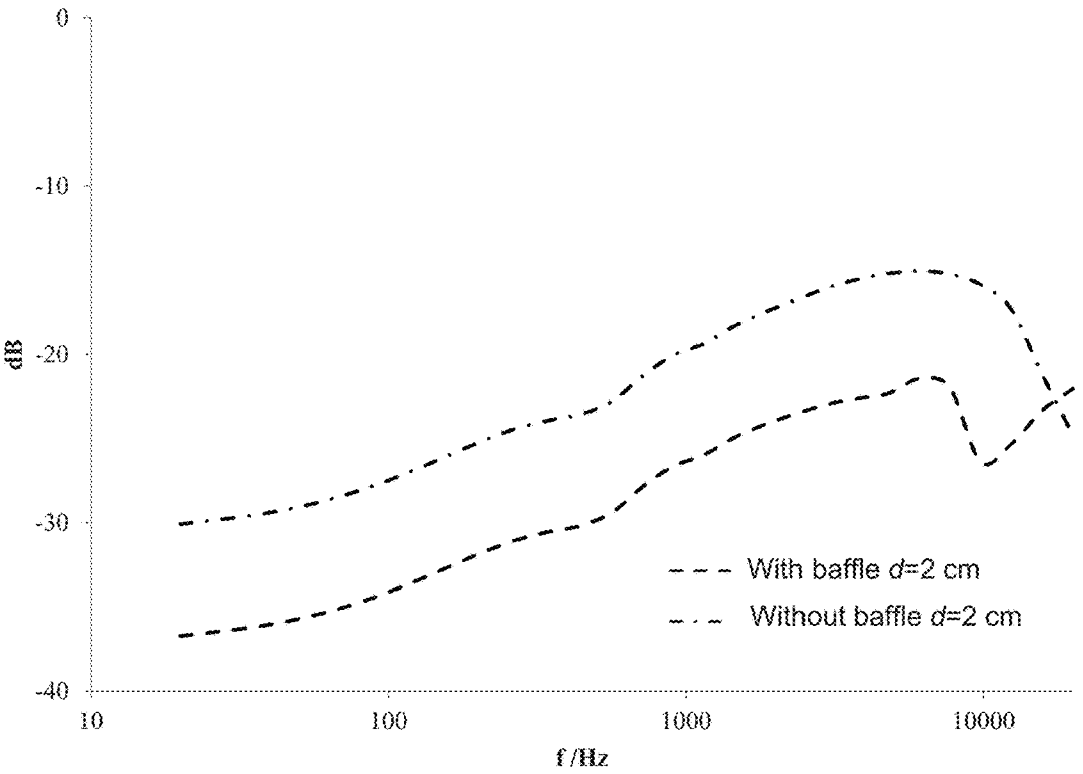
FIG. 31 is a schematic diagram illustrating a sound leakage parameter in a far-field when a distance d between the two-point sound sources is 2 cm.
Figure 32:
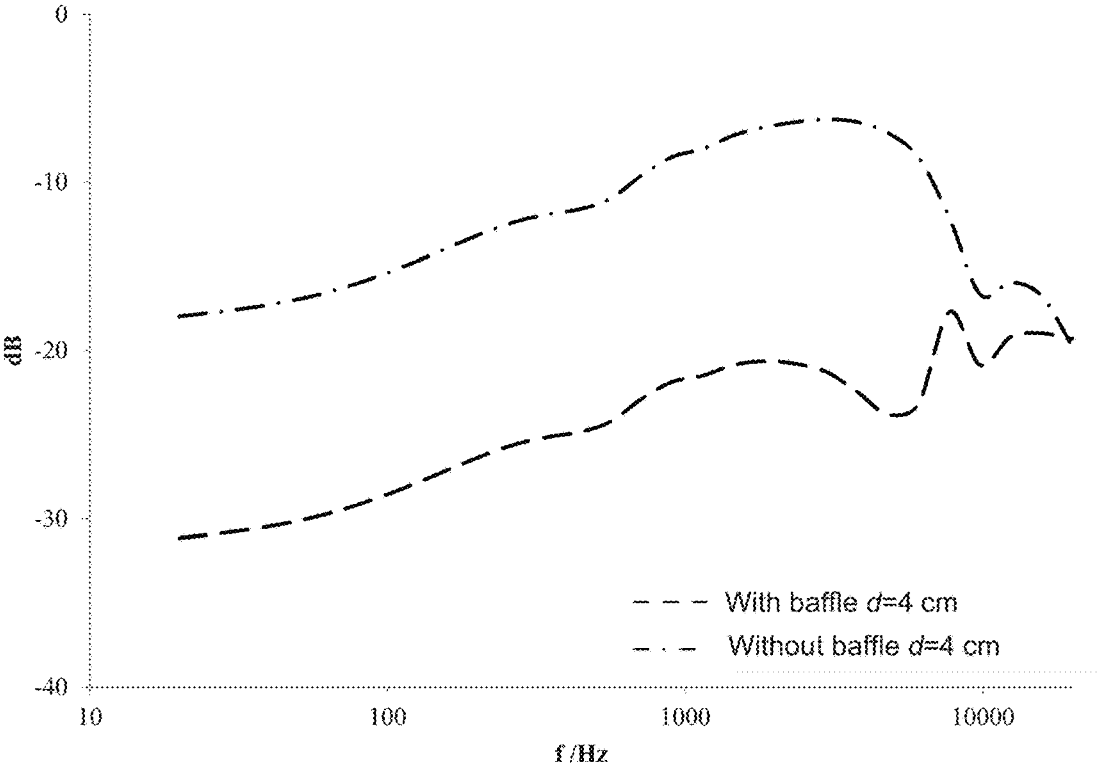
FIG. 32 is a schematic diagram illustrating a sound leakage parameter in a far-field when the distance d between the two-point sound sources is 4 cm.

FIG. 27 is a schematic diagram illustrating exemplary frequency response characteristic curves of two-point sound sources when a distance d between the two-point sound sources is 1 cm. FIG. 28 is a schematic diagram illustrating exemplary frequency response characteristic curves of two-point sound sources when the distance d between the two-point sound sources is 2 cm. FIG. 29 is a schematic diagram illustrating exemplary frequency response characteristic curves of two-point sound sources when the distance d between the two-point sound sources is 4 cm. FIG. 30 is a schematic diagram illustrating a sound leakage parameter in a far-field when the distance d between the two-point sound sources is 1 cm. FIG. 31 is a schematic diagram illustrating a sound leakage parameter in a far-field when the distance d between the two-point sound sources is 2 cm. FIG. 32 is a schematic diagram illustrating a sound leakage parameter in a far-field when the distance d between the two-point sound sources is 4 cm. As shown in FIGS. 27-29, for different distance d (e.g., 1 cm, 2 cm, 4 cm) between sound guiding holes, at a certain frequency, in a listening position in the near-field (e.g., an ear of a user), a volume of a sound generated by two sound guiding holes which may be disposed on two sides of the auricle (i.e., in the case of "without baffle" shown in FIGS. 27-29) may be greater than a volume of a sound generated by two sound guiding holes which may be not disposed on the two sides of the auricle. The certain frequency may be below 10000 Hz, 5000 Hz, or 1000 Hz.

As shown in FIGS. 30-32, for different distances d (e.g., 1 cm, 2 cm, 4 cm, etc.) between sound guiding holes, at a certain frequency, in far-field (e.g., a position away from an ear of a user), a volume of a leaked sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and reduce the ability of reducing the sound leakage. The distance d between the two sound guiding holes or the two-point sound sources may be not greater than a distance threshold. In some embodiments, the distance d between the two sound guiding holes may be set to be less than 20 cm to increase the volume in the near-field and reduce the sound leakage in the far-field. In some embodiments, the distance d between the two sound guiding holes may be set to be less than 12 cm. In some embodiments, the distance d between the two sound guiding holes may be set to be less than 10 cm. In some embodiments, the distance d between the two sound guiding holes may be set to be less than 6 cm. In some embodiments, considering a size of the speaker and a structural requirement for the sound guiding hole(s), the distance d between the two sound guiding holes may be set to be no less than 1 cm and no greater than 12 cm. In some embodiments, the distance d between the two sound guiding holes may be set to be no less than 1 cm and no more than 10 cm. In some embodiments, the distance d between the two sound guiding holes may be set to be no less than 1 cm and no more than 8 cm. In some embodiments, the distance d between the two sound guiding holes may be set to be no less than 1 cm and no more than 6 cm. In some embodiments, the distanced between the two sound guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the speaker may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

In some embodiments, for a certain distance between the two-point sound sources, a relative position of the listening position to the two-point sound sources may affect the volume of the sound in the near-field and the sound leakage in the far-field. To improve the acoustic output performance of the speaker, in some embodiments, the speaker may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear.

Figure 33:
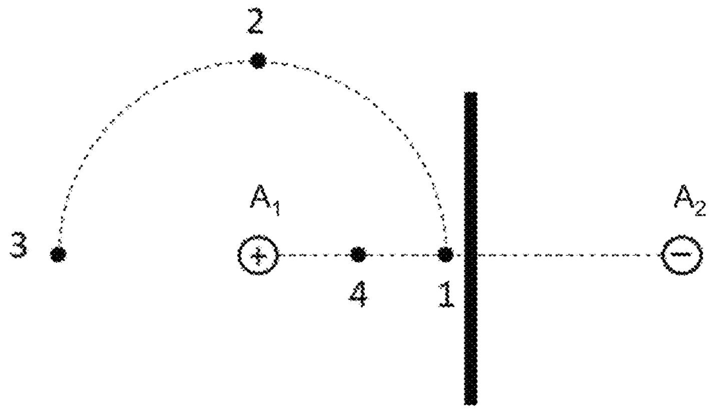
FIG. 33 is a schematic diagram illustrating listening positions according to some embodiments of the present disclosure.

FIG. 33 is a schematic diagram illustrating listening positions according to some embodiments of the present disclosure. In order to further explain an effect of the listening position on the acoustic output, four listening positions (i.e., a listening position 1, a listening position 2, a listening position 3, and a listening position 4) may be selected as shown in FIG. 33, which may be used to describe the effect and criteria of the listening positions. A distance between each of the listening position 1, the listening position 2, and the listening position 3 and a point sound source $A_1$ may be equal, which may be denoted by $r_1$. A distance between the listening position 4 and the point sound source $A_1$ may be denoted by $r_2$, and $r_2<r_1$. The point sound source $A_1$ and a point sound source $A_2$ may generate sounds with opposite phases.

Figure 34:
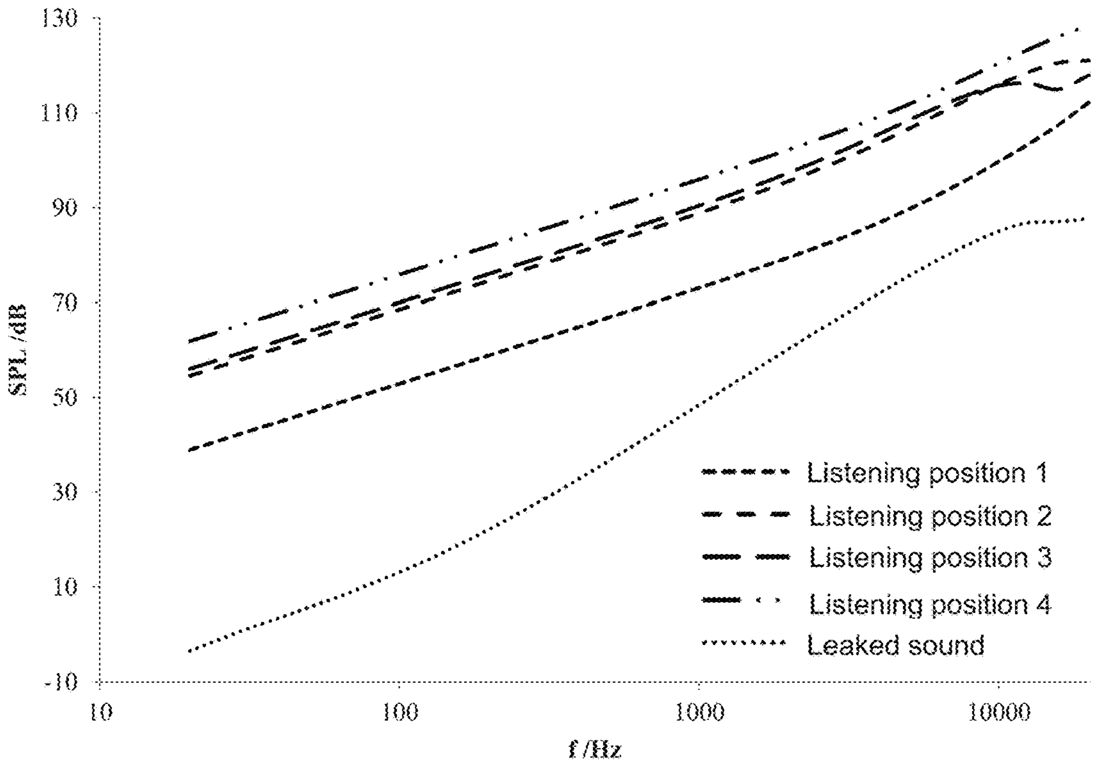
FIG. 34 is a schematic diagram illustrating exemplary frequency response characteristic curves of two-point sound sources in different listening positions in a near-field when a baffle is not disposed between the two-point sound sources according to some embodiments of the present disclosure.
Figure 35:
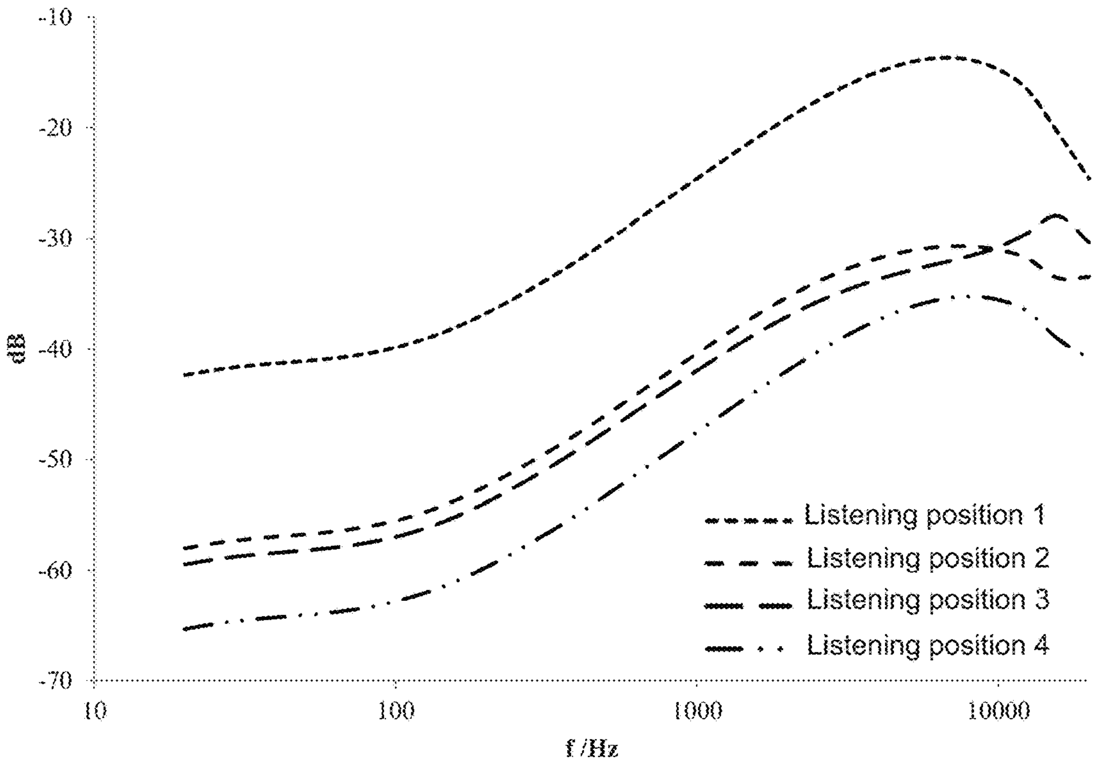
FIG. 35 is a schematic diagram illustrating sound leakage parameters of different listening positions when a baffle is not disposed between the two-point sound sources according to some embodiments of the present disclosure.

FIG. 34 is a schematic diagram illustrating exemplary frequency response characteristic curves of two-point sound sources in different listening positions in the near-field when a baffle is not disposed between the two-point sound sources. FIG. 35 is a schematic diagram illustrating sound leakage parameters of different listening positions, which may be obtained with reference to Equation (16) on the basis of FIG. 34. As shown in FIGS. 34 and 35, an acoustic route difference between an acoustic route from the point sound source $A_1$ to the listening position 1 and an acoustic route from the point sound source $A_2$ to the listening position 1 is relatively small, and accordingly an interference of sounds generated by the two-point sound sources at the listening position 1 may decrease the volume of a heard sound at the listening position 1 to be relatively smaller than that of other listening positions. For a listening position 2, compared with the listening position 1, a distance between the listening position 2 and the point sound source $A_1$ may be the same as that between the listening position 1 and the point sound source $A_1$, that is, an acoustic route from the point sound source $A_1$ to the listening position 2 may be the same as that from the point sound source $A_1$ to the listening position. A distance between the listening position 2 and the point sound source $A_2$ may be longer than that between the listening position 1 and the point sound source $A_2$, and an acoustic route from the point sound source $A_2$ to the listening position 2 may be greater than that from the point sound source $A_2$ to the listening position 1. An amplitude difference between the sound generated by the point sound source $A_1$ and the sound generated by the point sound source $A_2$ may be increased at the listening position 2. Accordingly, a volume of the sound transmitted from the two-point sound sources after being interfered at the listening position 2 may be greater than that at the listening position 1. Among a plurality of positions on an arc with a radius of $r_1$, a difference between the acoustic route from the point sound source $A_1$ to the listening position 3 and the acoustic route from the point sound source $A_2$ to the listening position 3 may be the longer than other acoustic routes. Compared with the listening position 1 and the listening position 2, a volume of a heard sound at the listening position 3 may be higher than that at other listening positions. For the listening position 4, a distance between the listening position 4 and the point sound source $A_1$ may be relatively short, a sound amplitude of a sound generated by the point sound source $A_1$ at the listening position 4 may be greater than the sound amplitude of the sound generated by the point sound source $A_1$ at other listening positions, and a volume of a heard sound at the listening position 4 may be greater than other volumes of heard sounds at other listening positions. In closing, the volume of the heard sound at the listening position in the near-field may be changed when the listening position and/or a relative position of the two-point sound sources are changed. When the listening position (e.g., listening position 3) is on the line between the two-point sound sources and on a same side of the two-point sound sources, the acoustic route difference between the two-point sound sources at the listening position may be the largest (the acoustic route difference may be the distance d between the two-point sound sources). In this case (i.e., when the auricle is not used as a baffle), the volume of the heard sound at the listening position may be greater than that at other positions. According to Equation (16), the sound leakage in the far-field is constant, the sound leakage parameter corresponding to the listening position may be relatively small, and a capability for reducing the sound leakage may be relatively strong. Further, the distance $r_1$ between the listening position (e.g., the listening position 4) and the point source $A_1$ may be decreased, thereby increasing the volume of the heard sound at the listening position, reducing the sound leakage parameter, and improving the capability of reducing sound leakage.

Figure 36:
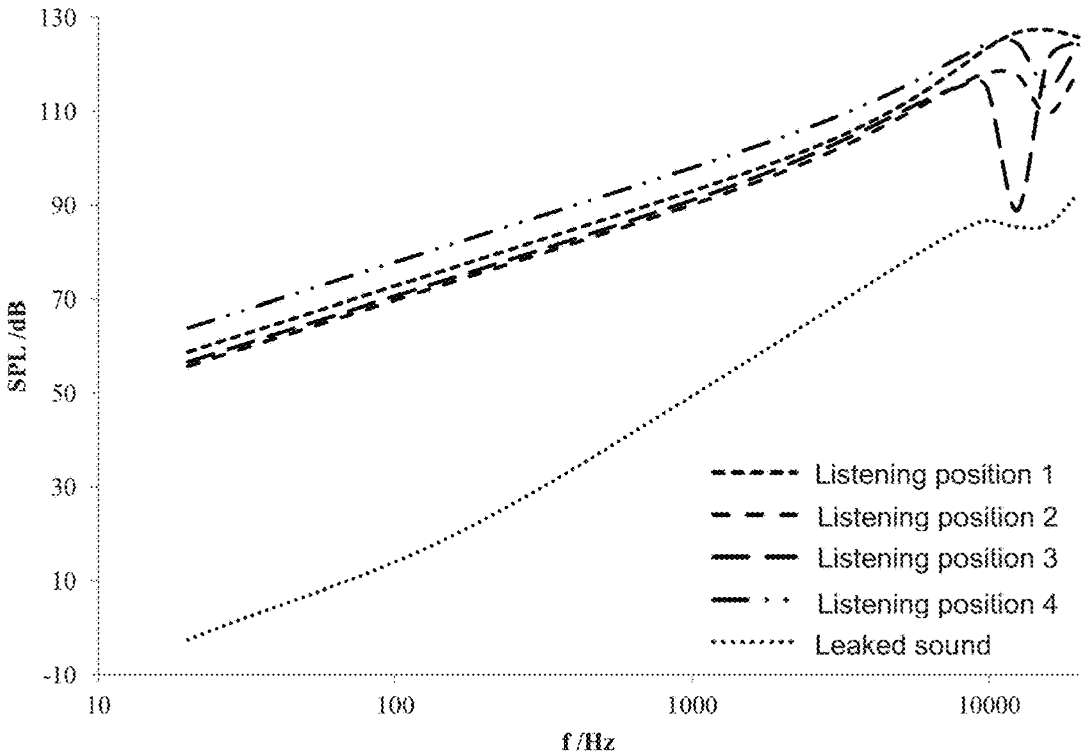
FIG. 36 is a schematic diagram illustrating exemplary frequency response characteristic curves of two-point sound sources in different listening positions in a near-field when a baffle is disposed between the two-point sound sources according to some embodiments of the present disclosure.
Figure 37:
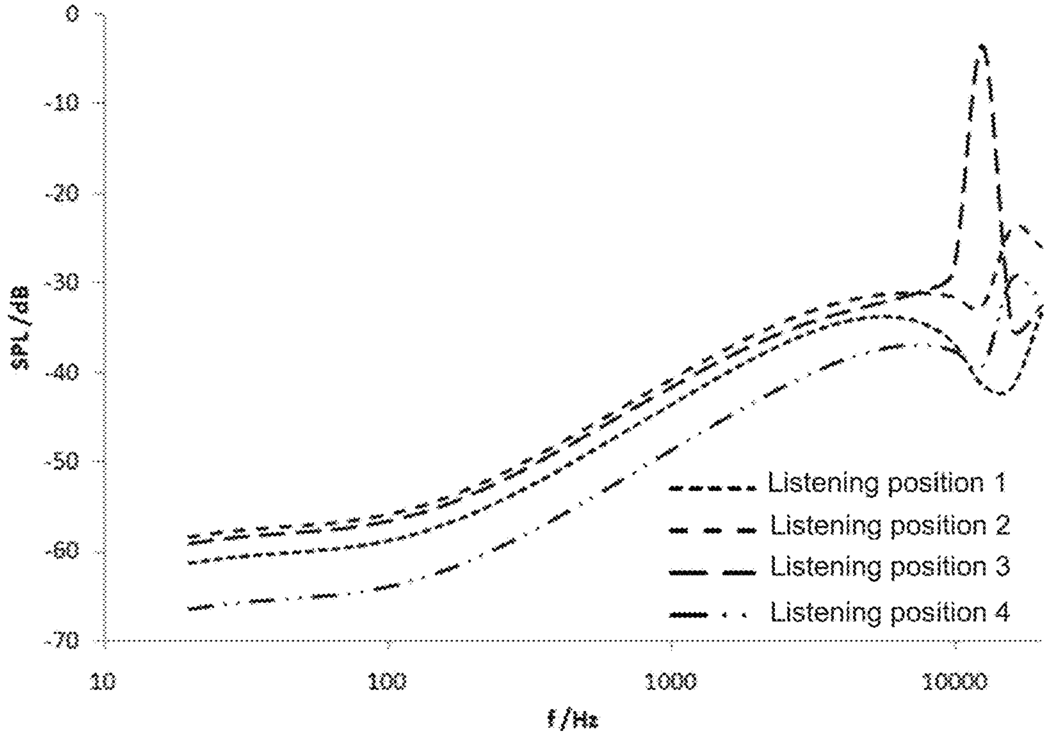
FIG. 37 is a schematic diagram illustrating sound leakage parameters of different listening positions when a baffle is disposed between the two-point sound sources according to some embodiments of the present disclosure.

FIG. 36 is a schematic diagram illustrating exemplary frequency response characteristic curves of two-point sound sources at different listening positions in a near-field when a baffle is disposed between the two-point sound sources (as shown in FIG. 33). FIG. 37 is a graph illustrating sound leakage parameters of different listening positions, which may be obtained with reference to Equation (16) on the basis of FIG. 36. As shown in FIGS. 36 and 37, comparing to a case without a baffle, a volume of a heard sound generated by the two-point sound sources at the listening position 1 may be increased when the baffle is disposed between the two-point sound sources. The volume of the heard sound at the listening position 1 may be greater than that at the listening position 2 and/or the listening position 3. An acoustic route from the point sound source $A_2$ to the listening position 1 may be increased when the baffle is disposed between the two-point sound sources, and accordingly, an acoustic route difference between the two-point sound sources and the listening position 1 may be increased. An amplitude difference between the sounds generated by the two-point sound sources at the listening position 1 may be increased, and the sound interference cancellation may be not formed, thereby increasing the volume of the heard sound generated at the listening position 1. At the listening position 4, a distance between the listening position 4 and the point sound source $A_1$ may be decreased, the sound amplitude of the point sound source $A_1$ at the listening position may be relatively great. The volume of the heard sound at the listening position 4 may be the greater than that at other listening positions (i.e., the listening position 1, the listening position 2, and/or the listening position 3). For the listening position 2 and the listening position 3, an effect of the baffle on the acoustic route from the point sound source $A_2$ to the listening positions may be not obvious, the increase of the volume of the heard sound at the listening position 2 and the listening position 3 may be less than that at the listening position 1 and the listening position 4 which are located close to the baffle.

The volume of leaked sound in the far-field may be not changed, and the volume of the heard sound at the listening position in the near-field may be changed when the listening position is changed. In this case, according to Equation (16), the sound leakage parameter of the speaker may be different at different listening positions. Specifically, a listening position with a relatively large volume of the heard sound (e.g., the listening position 1 and/or the listening position 4) may correspond to a small sound leakage parameter and a strong capability for reducing the sound leakage. A listening position with a low volume of the heard sound (e.g., the listening position 2 and listening position 3) may correspond to a large sound leakage parameter and a weak capability for reducing the sound leakage.

According to an actual application scenario of the speaker, an auricle of a user may be served as the baffle. In this case, the two sound guiding holes on the speaker may be arranged on a front side and a rear side of the auricle, respectively, and an ear canal may be located between the two sound guiding holes as a listening position. In some embodiments, a distance between the sound guiding hole on the front side of the auricle and the ear canal may be smaller than a distance between the sound guiding hole on the rear side of the auricle and the ear canal by adjusting positions of the two sound guiding holes on the speaker. In this case, the speaker may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the speaker may include one or more contact points (e.g., "an inflection point" on a supporting structure to match a shape of the ear) which may contact with the auricle when the speaker is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 38:
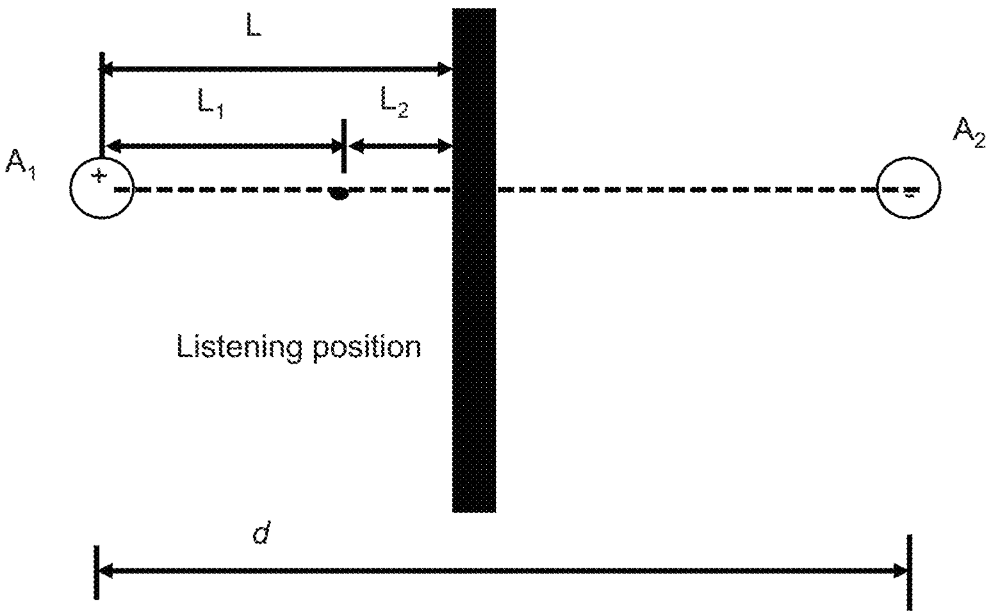
FIG. 38 is a schematic diagram illustrating two-point sound sources and a baffle according to some embodiments of the present disclosure.

FIG. 38 is a schematic diagram illustrating two-point sound sources and a baffle according to some embodiments of the present disclosure. In some embodiments, a position of the baffle disposed between the two sound guiding holes may affect acoustic output of a speaker. Merely by way of example, as shown in FIG. 38, the baffle may be disposed between a point sound source $A_1$ and a point sound source $A_2$, a listening position may be located on a line connecting the point sound source $A_1$ and the point sound source $A_2$. In addition, the listening position may be located between the point sound source $A_1$ and the baffle. A distance between the point sound source $A_1$ and the baffle may be L. A distance between the point sound source $A_1$ and the point sound source $A_2$ may be d. A distance between the point sound source $A_1$ and the heard sound may be $L_1$. A distance between the listening position and the baffle may be $L_2$. When the distance $L_1$ is constant, a movement of the baffle may change a ratio of L to d, and a volume of the heard sound at the listening position and/or a volume of a sound leakage in a far-field may be obtained.

Figure 39:
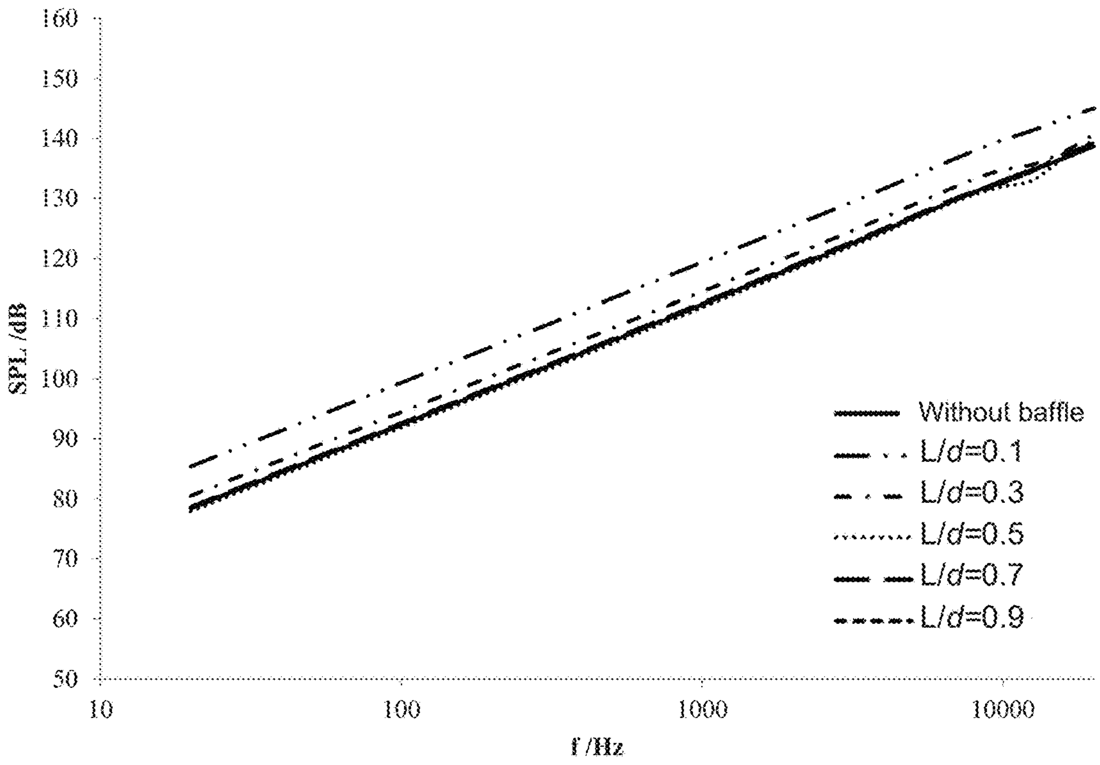
FIG. 39 is a schematic diagram illustrating exemplary frequency response characteristic curves of two-point sound sources in a near-field when a baffle is disposed at different positions according to some embodiments of the present disclosure.
Figure 40:
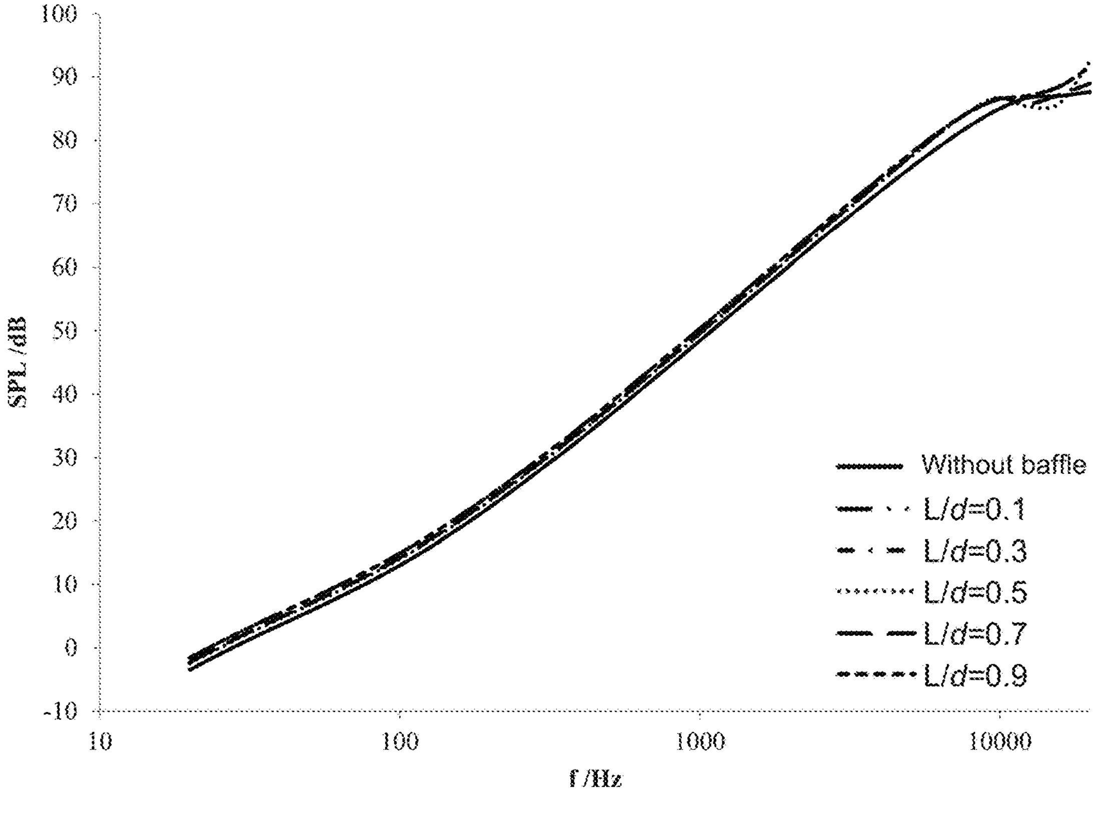
FIG. 40 is a schematic diagram illustrating exemplary frequency response characteristic curves of two-point sound sources in a far-field when a baffle is disposed at different positions according to some embodiments of the present disclosure.
Figure 41:
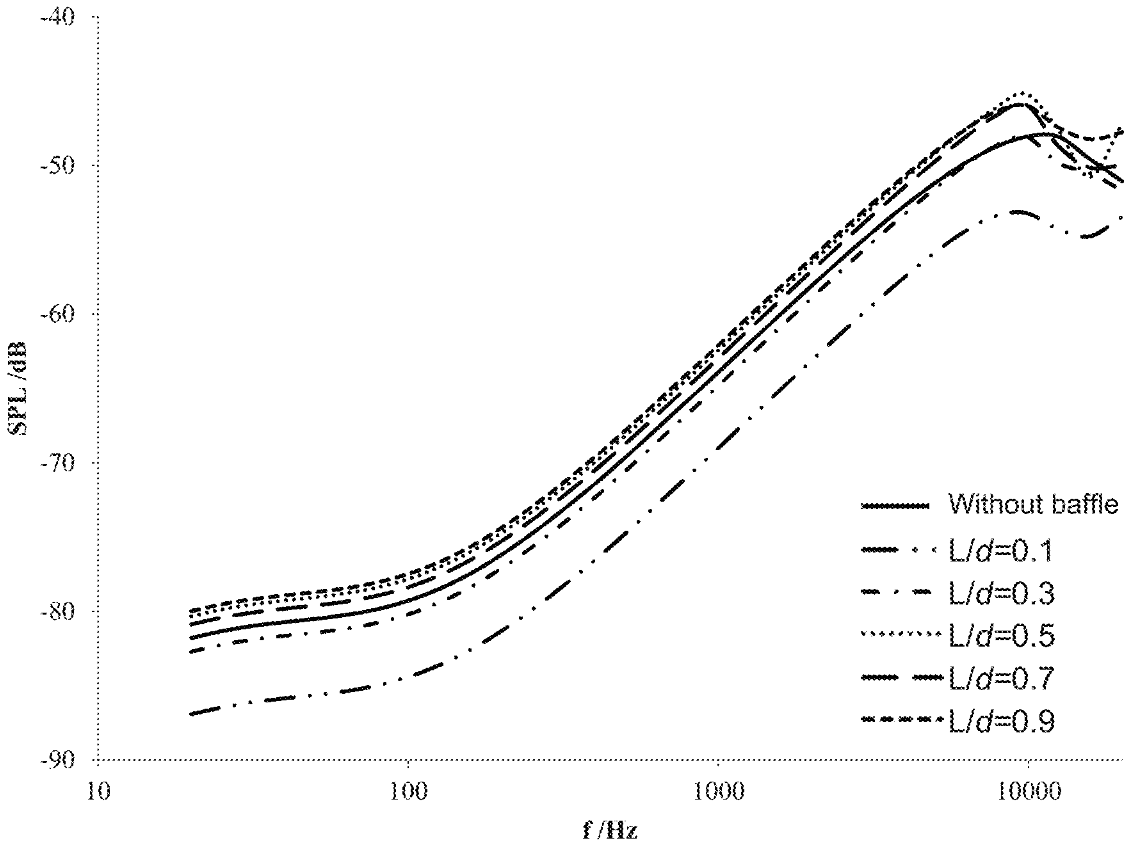
FIG. 41 is a schematic diagram illustrating a sound leakage parameter in a far-field when a baffle is disposed at different positions according to some embodiments of the present disclosure.

FIG. 39 is a schematic diagram illustrating exemplary frequency response characteristic curves of two-point sound sources in a near-field when a baffle is disposed at different positions. FIG. 40 is a schematic diagram illustrating exemplary frequency response characteristic curves of two-point sound sources in a far-field when the baffle is disposed at different positions. FIG. 41 is a schematic diagram illustrating a sound leakage parameter in a far-field when a baffle is disposed at different positions.

As shown in FIGS. 38-41, the sound leakage in the far-field may be not changed or a change of the sound leakage in the far-field may be less than a sound threshold when the position of the baffle is changed between the two-point sound sources. When a distance d between the point sound source $A_1$ and the point sound source $A_2$ is constant, when L is decreased, a volume of a sound at a listening position may be increased, the sound leakage parameter may be decreased, and the capability for reducing sound leakage may be enhanced. When L increased, the volume at the listening position may be increased, the sound leakage parameter may be increased, and the capability for reducing the sound leakage may be weakened. When L is relatively small, the listening position may be close to the baffle, an acoustic route of a sound wave from the point sound source $A_2$ to the listening position may be increased in the existence of the baffle. In this case, an acoustic route difference between an acoustic route from the point sound source $A_1$ to the listening position and an acoustic route from the point sound source $A_2$ to the listening position may be increased and the interference cancellation of the sound may be reduced. The volume of the sound at the listening position may be increased in the existence of the baffle. When L is relatively large, the listening position may be far away from the baffle. The baffle may not affect (or barely affect) the acoustic route difference. The volume at the listening position may be not changed when the baffle is added.

As described above, by adjusting a position of the sound guiding holes on the speaker, the auricle of the user may be served as the baffle to separate sound guiding holes when the user wears the speaker. In this case, a structure of the speaker may be simplified, and the output effect of the speaker may be further improved. In some embodiments, the positions of the two sound guiding holes may be determined so that a ratio of a distance between the sound guiding hole on the front side of the auricle and the auricle (or a contact point on the speaker for contact with the auricle) to a distance between the two sound guiding holes may be less than or equal to 0.5 when the user wears the speaker. In some embodiments, the ratio of the distance between the sound guiding hole on the front side of the auricle and the auricle to the distance between the two sound guiding holes may be less than or equal to 0.3. In some embodiments, the ratio of the distance between the sound guiding hole on the front side of the auricle and the auricle to the distance between the two sound guiding holes may be less than or equal to 0.1. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the speaker may affect the volume of the sound in the near-field and sound leakage in the far-field. The acoustic route may be changed by adjusting a length of a chamber between a vibration diaphragm in the speaker and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2. In some embodiments, the ratio may be 0.6-1.5. In some embodiments, the ratio may be 0.8-1.2.

In some embodiments, when the two sound guiding holes transmit the sounds with opposite phases, amplitudes of the sounds may be adjusted to improve the output performance of the speaker. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2. In some embodiments, the ratio of the acoustic impedance between the acoustic driver and the two sound guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the speaker without departing from this principle. For example, the listening position may not be on the line connecting the two-point sound sources, but may also be above, below, or in an extension direction of the line connecting the two-point sound sources. As another example, a method for measuring the distance between a point sound source and the auricle, and a method for measuring the height of the auricle may also be adjusted according to different conditions. These similar changes may be all within the protection scope of the present disclosure.

Figure 42:
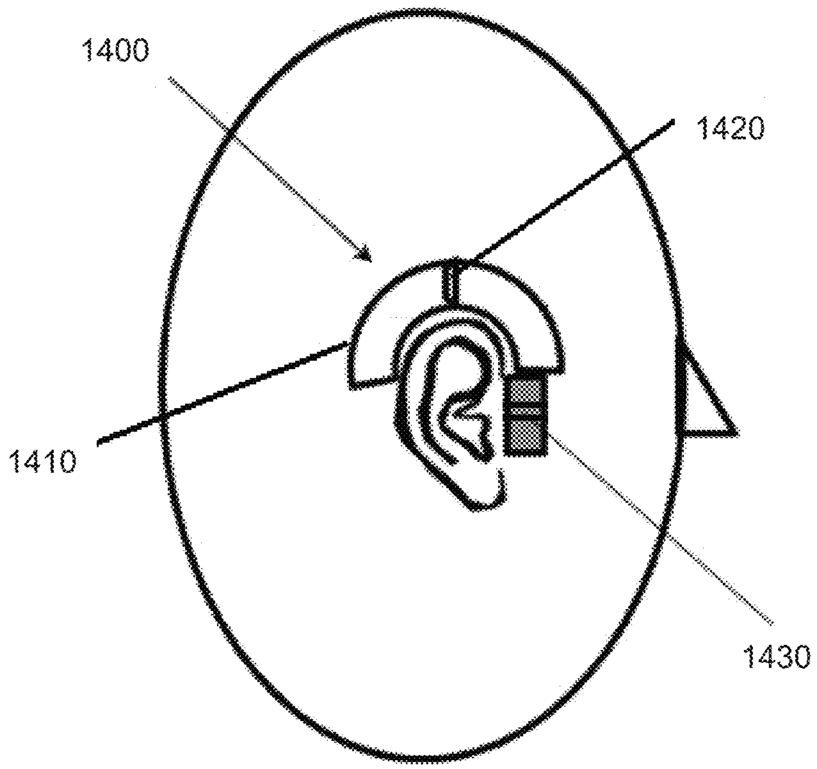
FIG. 42 is a schematic diagram illustrating an exemplary speaker according to some embodiments of the present disclosure.

FIG. 42 is a schematic diagram illustrating an exemplary speaker according to some embodiments of the present disclosure.

For a human ear, a frequency band of a sound can be heard may be in a middle-low-frequency band. An optimization goal of the speaker in the mid-low-frequency bands may be to increase a volume of a heard sound. When a listening position is fixed, parameters of the two-point sound sources may be adjusted to increase the volume of the heard sound and not increase a volume of a leaked sound (e.g., an increase of the volume of the heard sound may be greater than an increase of the volume of the leaked sound). In a high-frequency band, a sound leakage of the two-point sound sources may be not decreased significantly. In the high-frequency band, an optimization goal of the speaker may be reducing the sound leakage. The sound leakage may be further reduced and a leakage-reducing frequency band may be expanded by adjusting the parameters of the two-point sound sources of different frequencies. In some embodiments, the speaker 1400 may include an acoustic driver 1430. The acoustic driver 1430 may output sound through two of the second sound guiding holes. More descriptions regarding the acoustic driver 1430, the second sound guiding holes, and a structure therebetween may be described with reference to the acoustic driver 1420 and/or the first sound guiding holes and the relevant descriptions thereof. In some embodiments, the acoustic driver 1430 and the acoustic driver 1420 may output sounds with different frequencies, respectively. In some embodiments, the speaker 1400 may include a controller configured to cause the acoustic driver 1420 to output a sound within a first frequency range, and cause the acoustic driver 1430 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1420 may be a low-frequency speaker, and the acoustic driver 1430 may be a middle-high-frequency speaker. Due to different frequency response characteristics of the low-frequency speaker and the middle-high-frequency speaker, frequency bands of sounds output by the acoustic driver 1420 and the acoustic driver 1430 may also be different. A high-frequency band and a low-frequency band may be divided using the low-frequency speaker and the middle-high-frequency speaker, and accordingly, two-point sound sources with low-frequency and two-point sound sources middle-high-frequency may be constructed to output sound in the near-field output and/or reduce sound leakage in the far-field. For example, the two-point sound sources for outputting low-frequency sound may be formed when the acoustic driver 1420 outputs the low-frequency sound through the sound guiding hole 1411 and the sound guiding hole 1412 shown in FIG. 14. The two-point sound sources with low-frequency may be disposed on two sides of an auricle to increase a volume heard by an ear near the near-field. Two-point sound sources for outputting middle-high-frequency sound may be formed when the acoustic driver 1430 outputs the middle-high-frequency sound through two second sound guiding holes. A middle-high-frequency sound leakage may be reduced by adjusting a distance between the two second sound guiding holes. The two-point sound sources with middle-high-frequency may be disposed on two sides of the auricle, or the same side of the auricle. Alternatively, the acoustic driver 1420 may provide two-point sound sources for outputting full-frequency sound through the sound guiding hole 1411 and the sound guiding hole 1412 to increase the volume of the sound in the near-field.

Figure 43:
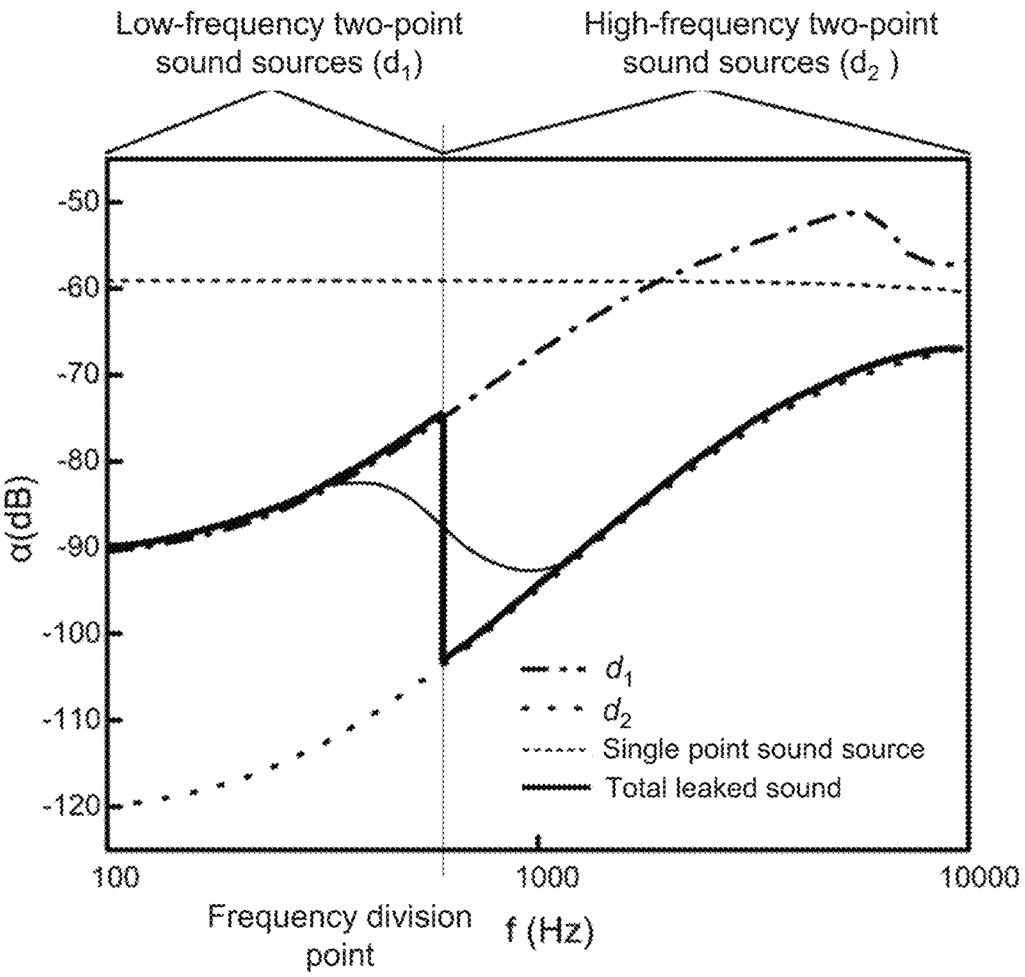
FIG. 43 is a schematic diagram illustrating sound leakage parameters when a two-point sound sources with a low-frequency and two-point sound sources with a high-frequency are worked together according to some embodiments of the present disclosure.

Further, a distance $d_2$ between the two second sound guiding holes may be less than a distance $d_1$ between the sound guiding hole 1411 and the sound guiding hole 1412, that is, $d_1$ may be larger than d. FIG. 43 is a schematic diagram illustrating sound leakage parameters when a two-point sound sources with a low-frequency and two-point sound sources with a high-frequency are worked together. As shown in FIG. 43, two sets of two-point sound sources may be disposed to improve the sound leakage reduction capability of the speaker which may be better than that of a speaker 1400 with a single-point sound source, and distances between the two-point sound sources in the two sets of two-point sound sources may be different. In the low-frequency range, by setting the distance (e.g., increasing the distance) of the two-point sound sources with low-frequency, the increase of a volume of a heard sound may be greater than the increase of a volume of sound leakage, and a relatively high volume of the sound in the low-frequency band in the near-field. In the low-frequency range, the sound leakage of the two-point sound sources may originally be relatively small. After the distance between the two-point sound sources is changed (e.g., increasing the distance), a slight increase of the sound leakage may still maintain a low level (e.g., a sound leakage parameter a may be even further reduced). In the high-frequency range, by setting the distance of the two-point sound sources (e.g., decreasing the distance), a problem such as a cutoff frequency of the high-frequency for reducing the sound leakage is relatively low, the frequency band for reducing the sound leakage is relatively narrow, or the like, or any combination thereof, may be overcome. The performance of the speaker for reducing the sound leakage in a higher-frequency band may be improved, and the requirement for an open ear speaker may be met.

It should be noted that the sound leakage reduction curve shown in FIG. 43 may indicate an ideal case, and is only for explaining the principle and/or effect. The sound leakage curve may also be affected by one or more factors such as filter characteristics of an actual circuit, frequency characteristics of a transducer, and frequency characteristics of an acoustic channel, an actual low-frequency and/or high-frequency sounds of the speaker may be different from that shown in FIG. 43. A frequency band of a sound with the low-frequency and a frequency band of a sound with the high-frequency may be overlapped (e.g., aliased) near a frequency division point, and the sound leakage reduction curve of the speaker may not include a mutation at the frequency division point as shown in FIG. 43. A gradient and/or a transition may exist near the frequency division point denoted as a thin solid line in FIG. 43.

In some embodiments, the two second sound guide holes may output sounds with a phase difference. Preferably, the two second sound guide holes output sounds with an opposite phase difference. More descriptions regarding that the acoustic driver 1430 outputs sounds with phase difference from the second sound guide hole may refer to the description of the acoustic driver 1420 which may output sound(s) from the sound guide hole.

It should be noted that the position of the sound guiding holes of the speaker may not be limited to the case that the two sound guiding holes 1411 and 1412 corresponding to the acoustic driver 1420 shown in FIG. 42 are disposed on the two sides of the auricle, and the case that the two sound guiding holes corresponding to the acoustic driver 1430 are disposed on the front side of the auricle. For example, in some embodiments, the two second sound guiding holes corresponding to the acoustic driver 1430 may be disposed on the same side of the auricle (e.g., a rear side, an upper side, or a lower side of the auricle). As another example, the two second sound guiding holes corresponding to the acoustic driver 1430 may be disposed on two sides of the auricle. In some embodiments, when the sound guiding hole 1411 and the sound guiding hole 1412 and/or the two second sound guiding holes are disposed on the same side of the auricle, a baffle may be disposed between the sound guiding hole 1411 and the sound guiding hole 1412 and/or the two second sound guiding holes to further increase the volume of the sound in the near-field and reduce the sound leakage in the far-field. As yet another example, the two sound guiding holes corresponding to the acoustic driver 1420 may be disposed on the same side of the auricle (e.g., the front side, the rear side, the upper side, the lower side, etc. of the auricle).

Figure 44:
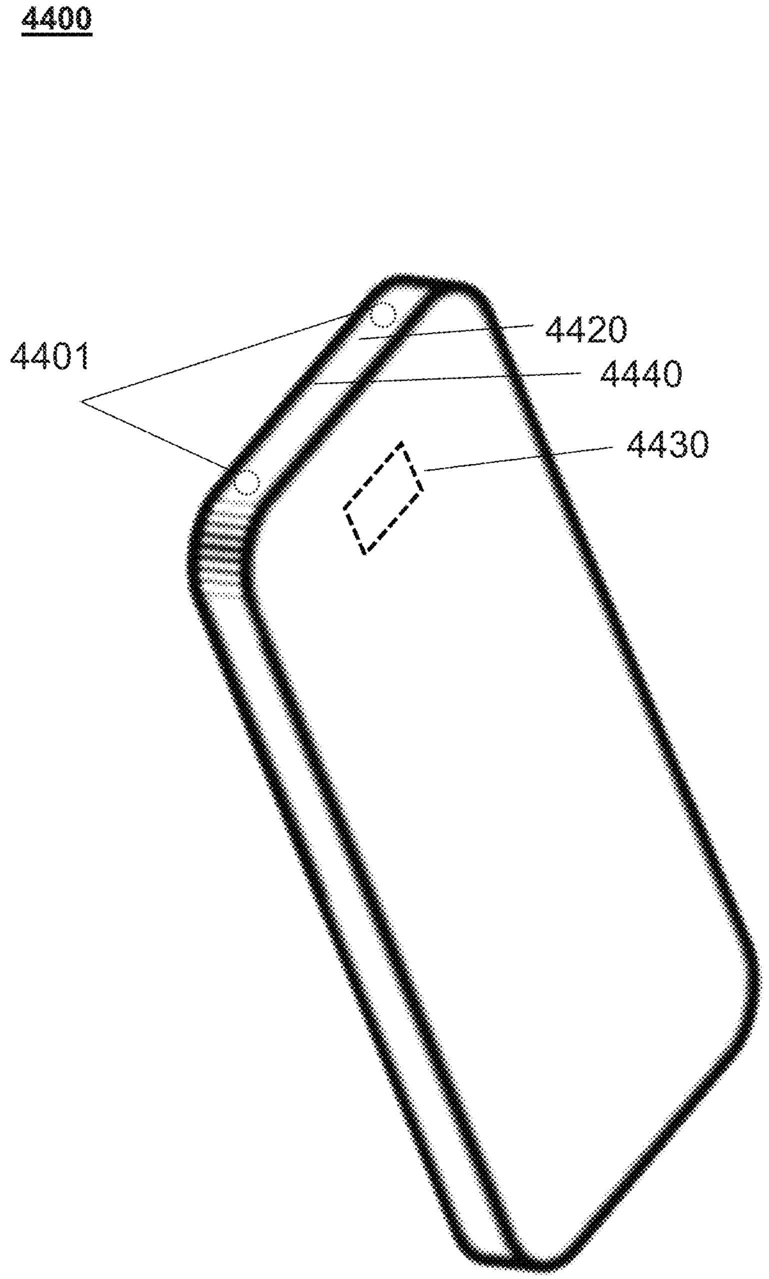
FIG. 44 is a schematic diagram illustrating a mobile phone with sound guiding holes according to some embodiments of the present disclosure.

It should be noted that the descriptions of the present disclosure do not limit the actual use scenario of the speaker. The speaker may be any apparatus or a part thereof that outputs a sound to a user. For example, the speaker may be applied on a mobile phone. FIG. 44 is a schematic diagram illustrating a mobile phone with sound guiding holes according to some embodiments of the present disclosure. As shown in FIG. 44, a top 4420 of the mobile phone 4400 (i.e., an upper surface of the mobile phone "vertical" to a display screen of the mobile phone) may include a plurality of sound guiding holes as described elsewhere in the present disclosure. Merely by way of example, a sound guiding hole 4401 may include a set of two-point sound sources (or a point sound source array) for outputting the sound. A first sound guiding hole in the sound guiding holes 4401 may be close to a left end of the top 4420, and a second sound guiding hole may be close to a right end of the top 4420. A distance may be formed between the two sound guiding holes. An acoustic driver 4430 may be disposed in a casing of the mobile phone 4400. The sound generated by the acoustic driver 4430 may be transmitted outward through the sound guiding hole 4401.

In some embodiments, two sound guiding holes 4401 may emit a group of sounds with a same (or substantially the same) phase and/or a same (or substantially same) amplitude. When the user places the mobile phone near the ear to answer voice information, the sound guiding hole 4401 may be located on two sides of an ear of the user, which may be equivalent to that an acoustic route difference may be added by two acoustic routes from one of the sound guiding hole 4401 to the ear of the user according to some embodiments of the present disclosure. The sound guiding holes 4401 may emit a relatively strong sound in the near-field to the user, and the ear of the user may barely affect the sound radiated by the sound guiding hole 4401 in the far-field. The sound guiding hole 4401 may reduce the sound leakage to the surroundings due to an interference cancellation of the sounds. In addition, by setting the sound guiding hole 4401 on the top of the mobile phone instead of an upper end of the display screen of the mobile phone, the space for setting the sound guiding hole 4401 on the front of the mobile phone may be saved, the area of the display screen of the mobile phone may be saved, and the appearance of the mobile phone may be optimized.

It should be noted that the above description of setting the sound guiding hole 4401 on the mobile phone is just for the purpose of illustration. Without departing from the principle, those skilled in the art may make adjustment to the structure, and the adjusted structure may still be within the protection scope of the present disclosure. For example, all or part of the sound guiding hole 4401 may be set on other positions of the mobile phone 4400, which may still ensure that the user can hear a relatively large volume when receiving the sound information, and also prevent the leakage of the sound information to the surroundings. For example, the first sound guiding hole may be set on the top 4420 (closer to the ear of the user), and the second sound guiding hole may be set at a back or a side (away from the ear of the user) of the mobile phone 4400. When the user places the first sound guiding hole near the ear to answer the voice information, the casing of the mobile phone 4400 may be served as a "baffle" which may be disposed between the second sound guiding hole and the ear of the user, thereby increasing the acoustic route of the second sound guiding hole to the ear of the user, and increasing the volume of sound heard by the user. For another example, an acoustic driver configured to output sounds with different frequency ranges may be disposed in the casing of the mobile phone 4400. The baffle may be or may not be disposed between the sound guiding holes corresponding to the acoustic driver according to some embodiments of the present disclosure.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A speaker, comprising:

a housing;

one or more acoustic drivers residing inside the housing and configured to generate vibrations, the vibrations producing a sound wave inside the housing and causing a leaked sound wave spreading outside the housing from a portion of the housing;

a plurality of sound guiding holes located on the housing and configured to guide the sound wave inside the housing through at least one of the plurality of sound guiding holes to an outside of the housing, the guided sound wave having a phase different from a phase of the leaked sound wave, the guided sound wave interfering with the leaked sound wave in a target region, and the interference reducing a sound pressure level of the leaked sound wave in the target region, wherein at least one of the one or more acoustic drivers configured to generate a sound and output the sound through at least two of the plurality of sound guiding holes; and the housing includes a supporting structure, the supporting structure being configured to support the at least one acoustic driver and disposing the at least two sound guiding holes on two sides of an auricle of a user, respectively.

2. The speaker of claim 1, wherein the at least one acoustic driver comprises a vibration diaphragm, a front chamber configured to radiate the sound is disposed on the supporting structure in front of the vibration diaphragm, a rear chamber configured to radiate the sound is disposed on the supporting structure behind the vibration diaphragm, the front chamber is acoustically coupled with a first sound guiding hole of the at sound guiding holes, and the rear chamber is acoustically coupled with a second sound guiding hole of the at least two sound guiding holes.

3. The speaker of claim 1, wherein the at least two sound guiding holes output the sound with a phase difference.

4. The speaker of claim 3, wherein the at least two sound guiding holes output the sound with opposite phases.

5. The speaker of claim 1, wherein a distance d between the at least two sound guiding holes is between 1 cm and 12 cm.

6. The speaker of claim 1, wherein the at least two sound guiding holes include two sound guiding holes, the two sound guiding including a first sound guiding hole disposed on a front side of the auricle of the user, and a second sound guiding hole disposed on a rear side of the auricle of the user, and an acoustic route between an ear of the user and the first sound guiding hole disposed on the front side of the auricle of the user is shorter than an acoustic route between the ear of the user and the second sound guiding hole disposed on the rear side of the auricle of the user.

7. The speaker of claim 1, wherein the at least two sound guiding holes include two sound guiding holes, the two sound guiding holes being disposed on a front side and a rear side of an auricle of the user, respectively, and a ratio of a distance between a sound guiding hole disposed on the front side of the auricle of the user and the auricle to a distance between the two sound guiding holes is not greater than 0.5.

8. The speaker of claim 1, wherein the at least one acoustic driver comprises a vibration diaphragm, and acoustic routes between the vibration diaphragm and the at least two sound guiding holes are different.

9. The speaker of claim 8, wherein a ratio of the acoustic routes between the vibration diaphragm and the at least two sound guiding holes is 0.5-2.

10. The speaker of claim 8, wherein sounds generated by the at least one acoustic driver through the at least two sound guiding holes have different sound pressure amplitudes.

11. The speaker of claim 8, wherein structures between the at least two sound guiding holes and the at least one acoustic driver have different acoustic impedance.

12. The speaker of claim 1, further comprising:

at least one second acoustic driver configured to output sound through at least two second sound guiding holes of the plurality of sound guiding holes, and the at least two second sound guiding holes being disposed on a same side of the auricle of the user.

13. The speaker of claim 12, wherein the at least two second sound guiding holes are disposed on a front side of the auricle of the user.

14. The speaker of claim 12, further comprising:

a controller configured to cause the at least one acoustic driver to output a sound within a first frequency range, and cause the at least one second acoustic driver to output a sound within a second frequency range, a frequency within the second frequency range being higher than that within the first frequency range.

15. The speaker of claim 14, wherein a distance between the at least two second sound guiding holes is less than a distance between the at least two sound guiding holes.

16. The speaker of claim 12, wherein the at least two second sound guiding holes output sounds with a phase difference.

17. The speaker of claim 1, further comprising a baffle disposed between the at least two sound guiding holes.

18. The speaker of claim 1, wherein the at least one sound guiding hole includes a damping layer, the damping layer being configured to adjust the phase of the guided sound wave in the target region.

19. The speaker of claim 1, wherein the guided sound wave includes at least two sound waves having different phases.

20. The speaker of claim 1, wherein:

the housing includes a bottom or a sidewall; and the at least one sound guiding hole is located on the bottom or the sidewall of the housing.

* * * * *